(12) United States Patent
Nakamura et al.

(10) Patent No.: US 8,400,890 B2
(45) Date of Patent: Mar. 19, 2013

(54) OPTICAL INFORMATION RECORDING MEDIUM, INFORMATION RECORDING APPARATUS, INFORMATION REPRODUCING APPARATUS, INFORMATION RECORDING METHOD, INFORMATION REPRODUCING METHOD AND METHOD FOR PRODUCING OPTICAL INFORMATION RECORDING MEDIUM

(75) Inventors: Atsushi Nakamura, Osaka (JP); Naoyasu Miyagawa, Hyogo (JP); Kiyotaka Ito, Hyogo (JP); Mamoru Shoji, Okayama (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/920,193

(22) PCT Filed: Mar. 1, 2010

(86) PCT No.: PCT/JP2010/001374
§ 371 (c)(1),
(2), (4) Date: Aug. 30, 2010

(87) PCT Pub. No.: WO2010/100881
PCT Pub. Date: Sep. 10, 2010

(65) Prior Publication Data
US 2011/0051592 A1    Mar. 3, 2011

(30) Foreign Application Priority Data

Mar. 6, 2009 (JP) .................................. 2009-053323

(51) Int. Cl.
*G11B 20/00* (2006.01)

(52) U.S. Cl. .................................................. 369/47.15
(58) Field of Classification Search ............... 369/47.15, 369/53.31, 53.34, 53.44, 283
See application file for complete search history.

(56) References Cited

U.S. PATENT DOCUMENTS 6,788,484 B2 * 9/2004 Honma ........................... 360/51
(Continued)

FOREIGN PATENT DOCUMENTS

| JP | 2000-149262 | 5/2000 |
| JP | 2000-231719 | 8/2000 |

(Continued)

OTHER PUBLICATIONS

International Search Report for corresponding International Application No. PCT/JP2010/001374 mailed Jun. 1, 2010.

(Continued)

*Primary Examiner* — Wayne Young
*Assistant Examiner* — Brenda Bernardi
(74) *Attorney, Agent, or Firm* — Renner, Otto, Boisselle & Sklar, LLP

(57) ABSTRACT

An optical information storage medium according to the present invention has at least one information storage layer. The optical information storage medium has a management area that stores at least one unit containing control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. And the value of the format number changes according to a combination of the write strategy type and the write pre-compensation type.

22 Claims, 20 Drawing Sheets

U.S. PATENT DOCUMENTS

| | | | |
|---|---|---|---|
| 7,248,552 B2 * | 7/2007 | Furumiya et al. | 369/53.13 |
| 7,342,857 B2 * | 3/2008 | Suh et al. | 369/47.51 |
| 7,773,479 B1 * | 8/2010 | Sutardja et al. | 369/59.11 |
| 2001/0005343 A1 | 6/2001 | Shoji et al. | |
| 2004/0222479 A1 | 11/2004 | Uno et al. | |
| 2005/0058047 A1 | 3/2005 | Fujita et al. | |
| 2005/0063266 A1 * | 3/2005 | Kim | 369/47.21 |
| 2007/0165506 A1 | 7/2007 | Nakamura et al. | |
| 2007/0206475 A1 | 9/2007 | Tamaki et al. | |
| 2007/0297309 A1 * | 12/2007 | Yasukawa et al. | 369/59.11 |
| 2008/0151726 A1 | 6/2008 | Yamakawa et al. | |
| 2009/0092016 A1 * | 4/2009 | Kim et al. | 369/47.53 |
| 2009/0109814 A1 * | 4/2009 | Fujita et al. | 369/47.5 |
| 2009/0231970 A1 * | 9/2009 | Verhallen | 369/47.15 |

FOREIGN PATENT DOCUMENTS

| | | |
|---|---|---|
| JP | 2004-362748 | 12/2004 |
| JP | 2005-092942 | 4/2005 |
| JP | 2006-313621 | 11/2006 |
| JP | 2007-502494 | 2/2007 |
| JP | 2007-502499 | 2/2007 |
| JP | 2007-506214 | 3/2007 |
| JP | 2007-109367 | 4/2007 |
| JP | 2007-226916 | 9/2007 |
| JP | 2008-004182 | 1/2008 |
| JP | 2008-159231 | 7/2008 |
| WO | 2005/017882 A2 | 2/2005 |
| WO | 2005/017885 A1 | 2/2005 |
| WO | 2005-029472 A2 | 3/2005 |
| WO | 2005/066940 A1 | 7/2005 |

OTHER PUBLICATIONS

Form PCT/ISA/237 and a partial English translation for corresponding Application No. PCT/JP2010/001374 mailed Jun. 1, 2010.
Co-pending U.S. Appl. No. 12/718,071 filed Mar. 5, 2010.
"Blu-ray Disc Reader", published by Ohmsha, Ltd., Dec. 2006, pp. 247-248 and a partial English translation. (cited in the specification).
Co-pending U.S. Appl. No. 12/577,769 filed Oct. 13, 2009.
Office Action for corresponding Japanese Patent Application No. 2010-533778, dated Oct. 23, 2012, and translation thereof.

* cited by examiner

| Byte # | CONTENTS | NUMBER OF BYTES |
|---|---|---|
| A | Disc INFORMATION IDENTIFIER | 2 |
| B | DI FORMAT NUMBER (INCLUDING WRITE STRATEGY TYPE, WRITE PRE-COMPENSATION TYPE AND WRITE PRE-COMPENSATION STEP INFORMATION) | 1 |
| C | Layer INFORMATION | 1 |
| D | DI Unit sequence number IN DI BLOCK | 1 |
| L | CONTINUITY FLAG | 1 |
| M | WRITE PRE-COMPENSATION PRIORITY ORDER FLAG | 1 |
| E | DISC TYPE IDENTIFICATION INFORMATION | 3 |
| F | VERSION NUMBER | 1 |
| G | WRITING SPEED | 4 |
| H | MAXIMUM READOUT POWER | 4 |
| I | RECORDING POWER | 9 |
| ⋮ | ⋮ | ⋮ |
| J | WRITE STRATEGY PARAMETER (dTF1:2T,3T,4T,⋯) (TF2 :2T,3T,4T,⋯) (TE2:2T,3T,4T,⋯) (dTE1:2T,3T,4T,⋯) (TMP.) ⋮ | XX |
| K | FOOTER INFORMATION | 6 |

(b)

| bit # | CONTENTS | bit | SETTING |
|---|---|---|---|
| b2,b1,b0 | WRITE STRATEGY TYPE INFORMATION | 000b | N-1 |
| | | 001b | N/2 |
| | | 010b | CA1 |
| | | 011b | CA2 |
| b3 | IS PRECEDING SPACE WRITE PRE-COMPENSATION APPLICABLE? | 0 | NO |
| | | 1 | YES |
| b4 | IS FOLLOWING SPACE WRITE PRE-COMPENSATION APPLICABLE? | 0 | NO |
| | | 1 | YES |
| b5 | IS PREVIOUS MARK WRITE PRE-COMPENSATION APPLICABLE? | 0 | NO |
| | | 1 | YES |
| b6 | IS NEXT MARK WRITE PRE-COMPENSATION APPLICABLE? | 0 | NO |
| | | 1 | YES |
| b7 | WRITE PRE-COMPENSATION STEP | 0 | Tw/16 |
| | | 1 | Tw/32 |

FIG.8

| dTF1 | | | 2T mark | | | | 3T mark | | 4T mark | | ≥5T mark | |
|---|---|---|---|---|---|---|---|---|---|---|---|---|
| | | | 2T mark | ≥3T mark | | | x | | x | | x | Next mark |
| | | 2T space | 3T space | 4T space | ≥5T space | | | | | | | Following space |
| | 2T space | 1 | 2 | 3 | 4 | 5 | x | | x | | x | |
| ≥3T mark | | 6 | 7 | 8 | 9 | 10 | 26 | | 30 | | 34 | |
| | 3T space | 11 | 12 | 13 | 14 | 15 | 27 | | 31 | | 35 | |
| x | 4T space | 16 | 17 | 18 | 19 | 20 | 28 | | 32 | | 36 | |
| | ≥5T space | 21 | 22 | 23 | 24 | 25 | 29 | | 33 | | 37 | |
| Previous mark | Preceding space | | | | | | | | | | | |

| TF2 | | | 2T mark | | | | 3T mark | | 4T mark | | ≥5T mark | |
|---|---|---|---|---|---|---|---|---|---|---|---|---|
| | | | 2T mark | ≥3T mark | | | x | | x | | x | Next mark |
| | | 2T space | 3T space | 4T space | ≥5T space | | | | | | | Following space |
| | 2T space | 1 | 2 | 3 | 4 | 5 | x | | x | | x | |
| ≥3T mark | | 6 | 7 | 8 | 9 | 10 | 26 | | 30 | | 34 | |
| | 3T space | 11 | 12 | 13 | 14 | 15 | 27 | | 31 | | 35 | |
| x | 4T space | 16 | 17 | 18 | 19 | 20 | 28 | | 32 | | 36 | |
| | ≥5T space | 21 | 22 | 23 | 24 | 25 | 29 | | 33 | | 37 | |
| Previous mark | Preceding space | | | | | | | | | | | |

| TE2 | | 3T mark | | | 4T mark | | | ≥5T mark | | | |
|---|---|---|---|---|---|---|---|---|---|---|---|
| | | x | | | x | | | x | | | Next mark |
| | | | | | | | | | | | Following space |
| | 2T space | 3T space | 4T space | ≥5T space | 2T space | 3T space | 4T space | ≥5T space | 2T space | 4T space | ≥5T space |
| x | 1 | 2 | 3 | 4 | 5 | 6 | 7 | 8 | 9 | 10 | 11 | 12 |
| Preceding space | | | | | | | | | | | |

| dTE1 | | | 2T mark | | | | 3T mark | | 4T mark | | ≥5T mark | |
|---|---|---|---|---|---|---|---|---|---|---|---|---|
| | | | 2T mark | ≥3T mark | | | x | | x | | x | Next mark |
| | | 2T space | 3T space | 4T space | ≥5T space | | | | | | | Following space |
| x | 2T space | 1 | 2 | 3 | 4 | 5 | 11 | 12 | 13 | 14 | 15 | 16 | 17 | 18 | 19 | 20 | 21 | 22 |
| | ≥3T space | 6 | 7 | 8 | 9 | 10 | | | | | | |
| Previous mark | Preceding space | | | | | | | | | | | |

X: Don't CARE

| TMP | 1 |
|---|---|

*FIG.9*

| | WRITE PRE-COMPENSA-TION | WRITE PRE-COMPENSATION TYPE INFORMATION | | | | WRITE STRATEGY TYPE INFORMATION | | |
|---|---|---|---|---|---|---|---|---|
| | STEP INFORMATION | NEXT mark | PREVIOUS mark | FOLLOWING space | PRECEDING space | | | |
| 500 | WS | b7 | b6 | b5 | b4 | b3 | b2 | b1 | b0 |
| 501 | N-1 | 0 | 0 | 0 | 0 | 1 | 0 | 0 | 0 |
| 502 | N/2 | 0 | 0 | 0 | 0 | 1 | 0 | 0 | 1 |
| 503 | CA1 | 0 | 0 | 0 | 0 | 1 | 0 | 1 | 0 |
| 504 | CA2 | 0 | 0 | 0 | 0 | 1 | 0 | 1 | 1 |
| 505 | N-1 | 1 | 0 | 0 | 1 | 1 | 0 | 0 | 0 |
| 506 | N/2 | 1 | 0 | 0 | 1 | 1 | 0 | 0 | 1 |
| 507 | CA1 | 1 | 0 | 0 | 1 | 1 | 0 | 1 | 0 |
| 508 | CA2 | 1 | 0 | 0 | 1 | 1 | 0 | 1 | 1 |
| 509 | N-1 | 1 | 0 | 1 | 1 | 1 | 0 | 0 | 0 |
| 510 | N/2 | 1 | 0 | 1 | 1 | 1 | 0 | 0 | 1 |
| 511 | CA1 | 1 | 0 | 1 | 1 | 1 | 0 | 1 | 0 |
| 512 | CA2 | 1 | 0 | 1 | 1 | 1 | 0 | 1 | 1 |
| 513 | N-1 | 1 | 1 | 1 | 1 | 1 | 0 | 0 | 0 |
| 514 | N/2 | 1 | 1 | 1 | 1 | 1 | 0 | 0 | 1 |
| 515 | CA1 | 1 | 1 | 1 | 1 | 1 | 0 | 1 | 0 |
| 516 | CA2 | 1 | 1 | 1 | 1 | 1 | 0 | 1 | 1 |

| bit # | CONTENTS | NO. | bit | SETTING |
|---|---|---|---|---|
| b2,b1,b0 | WRITE STRATEGY TYPE AND WRITE PRE-COMPENSATION TYPE | 0 | 000b | N-1 |
| | | 1 | 001b | N/2 |
| | | 2 | 010b | CA1 |
| | | 3 | 011b | CA2 |
| | | 4 | 100b | N-1 EX |
| | | 5 | 101b | N/2 EX |
| | | 6 | 110b | CA1 EX |
| | | 7 | 111b | CA2EX |

(b)

| bit # | CONTENTS | NO. | bit | SETTING |
|---|---|---|---|---|
| b2,b1,b0 | WRITE STRATEGY TYPE AND WRITE PRE-COMPENSATION TYPE | 0 | 000b | N-1 |
| | | 1 | 001b | N-1 EX |
| | | 2 | 010b | N/2 |
| | | 3 | 011b | N/2 EX |
| | | 4 | 100b | CA1 |
| | | 5 | 101b | CA1 EX |
| | | 6 | 110b | CA2 |
| | | 7 | 111b | CA2 EX |

FIG.12

| WS-N-1 | | WRITE PRE-COMPENSATION TYPE | | | | |
|---|---|---|---|---|---|---|
| | WRITE STRATEGY PARAMETER | NONE | PRECEDING SPACE | FOLLOWING SPACE | PREVIOUS MARK | NEXT MARK |
| 2T | dTF1 | ○ | ○ | ○ | ○ | ○ |
| | TF2 | ○ | ○ | ○ | ○ | ○ |
| | dTE1 | ○ | ○ | ○ | | ○ |
| 3T | dTF1 | ○ | ○ | NA | NA | NA |
| | TF2 | ○ | ○ | NA | NA | NA |
| | dTE2 | ○ | NA | ○ | NA | NA |
| | dTE1 | ○ | NA | ○ | NA | NA |
| 4T | dTF1 | ○ | ○ | NA | NA | NA |
| | TF2 | ○ | ○ | NA | NA | NA |
| | TE3 | ○ | NA | ○ | NA | NA |
| | dTE2 | ○ | NA | ○ | NA | NA |
| | dTE1 | ○ | NA | ○ | NA | NA |
| 5T | dTF1 | ○ | ○ | NA | NA | NA |
| | TF2 | ○ | ○ | NA | NA | NA |
| | TE3 | ○ | NA | ○ | NA | NA |
| | dTE2 | ○ | NA | ○ | NA | NA |
| | dTE1 | ○ | NA | ○ | NA | NA |
| ≥4T | TMP | ○ | NA | NA | NA | NA |

*FIG.13*
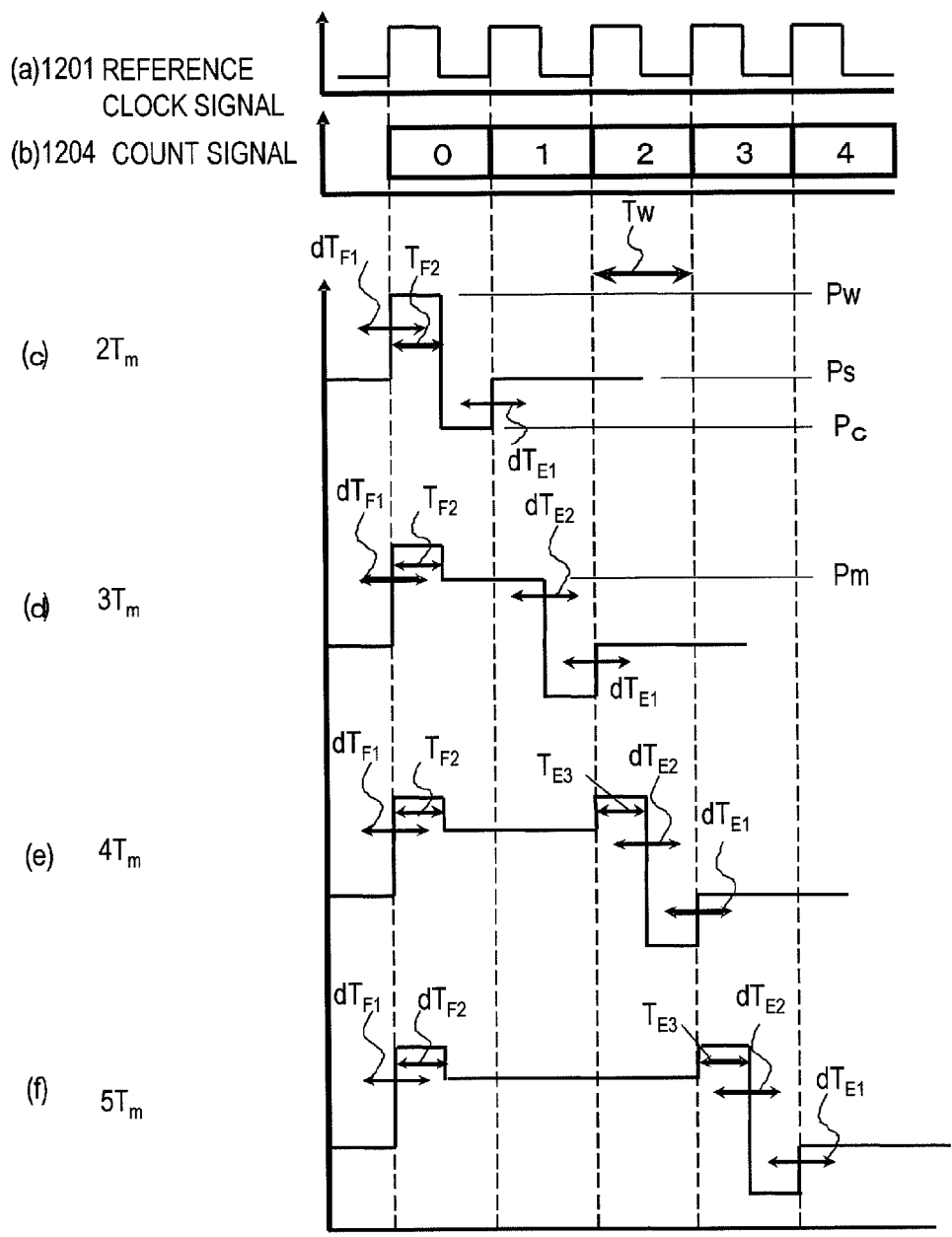
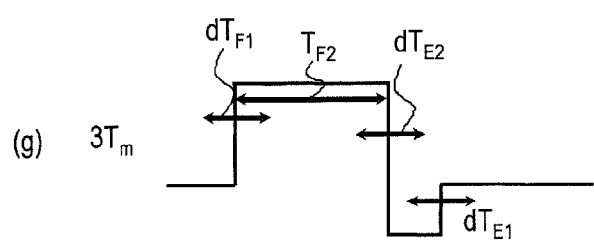

FIG. 14 dTF1

| | | 2Tmark | | | | 3Tmark | 4Tmark | ≥5Tmark | |
|---|---|---|---|---|---|---|---|---|---|
| | | 2Tmark | ≥3Tmark | | | | | | Next mark |
| | | 2Tspace | | 3Tspace | 4Tspace | ≥5Tspace | | | Following space |
| Previous mark | 2Tspace | 1 | 2 | 3 | 4 | 5 | x | x | |
| | ≥3Tmark | 6 | 7 | 8 | 9 | 10 | x | x | |
| x | 3Tspace | 11 | 12 | 13 | 14 | 15 | 26 | 30 | 34 |
| | 4Tspace | 16 | 17 | 18 | 19 | 20 | 27 | 31 | 35 |
| | ≥5Tspace | 21 | 22 | 23 | 24 | 25 | 28 | 32 | 36 |
| | Preceding space | | | | | | 29 | 33 | 37 |

TF2

| | | 2Tmark | | | | 3Tmark | 4Tmark | ≥5Tmark | |
|---|---|---|---|---|---|---|---|---|---|
| | | 2Tmark | ≥3Tmark | | | | | | Next mark |
| | | 2Tspace | | 3Tspace | 4Tspace | ≥5Tspace | | | Following space |
| Previous mark | 2Tspace | 1 | 2 | 3 | 4 | 5 | x | x | |
| | ≥3Tmark | 6 | 7 | 8 | 9 | 10 | x | x | |
| x | 3Tspace | 11 | 12 | 13 | 14 | 15 | 26 | 30 | 34 |
| | 4Tspace | 16 | 17 | 18 | 19 | 20 | 27 | 31 | 35 |
| | ≥5Tspace | 21 | 22 | 23 | 24 | 25 | 28 | 32 | 36 |
| | Preceding space | | | | | | 29 | 33 | 37 |

TE3

| | | | | 3Tmark | 4Tmark | ≥5Tmark | |
|---|---|---|---|---|---|---|---|
| | | | | | x | x | Next mark |
| | | 2Tspace | 3Tspace | 4Tspace | | | Following space |
| x | Preceding space | 1 | 2 | 3 | 4 | | | dTE2

| | | | | 3Tmark | 4Tmark | ≥5Tmark | |
|---|---|---|---|---|---|---|---|
| | | | | x | x | | Next mark |
| | | 2Tspace | 3Tspace | 4Tspace | ≥5Tspace | | Following space |
| x | Preceding space | 5 | 6 | 7 | 8 | | | dTE1

| | | 2Tmark | | | | 3Tmark | 4Tmark | ≥5Tmark | |
|---|---|---|---|---|---|---|---|---|---|
| | | 2Tmark | ≥3Tmark | | | | x | x | Next mark |
| | | 2Tspace | | 3Tspace | 4Tspace | ≥5Tspace | | | Following space |
| x | 2Tspace | 1 | 2 | 3 | 4 | 5 | x | x | |
| | ≥3Tspace | 6 | 7 | 8 | 9 | 10 | x | x | |
| | Preceding space | 11 | 12 | 13 | 14 | | | | |
| | | | | | | | 15 | 16 | 17 | 18 |
| | | | | | | | 19 | 20 | 21 | 22 |

FIG. 15

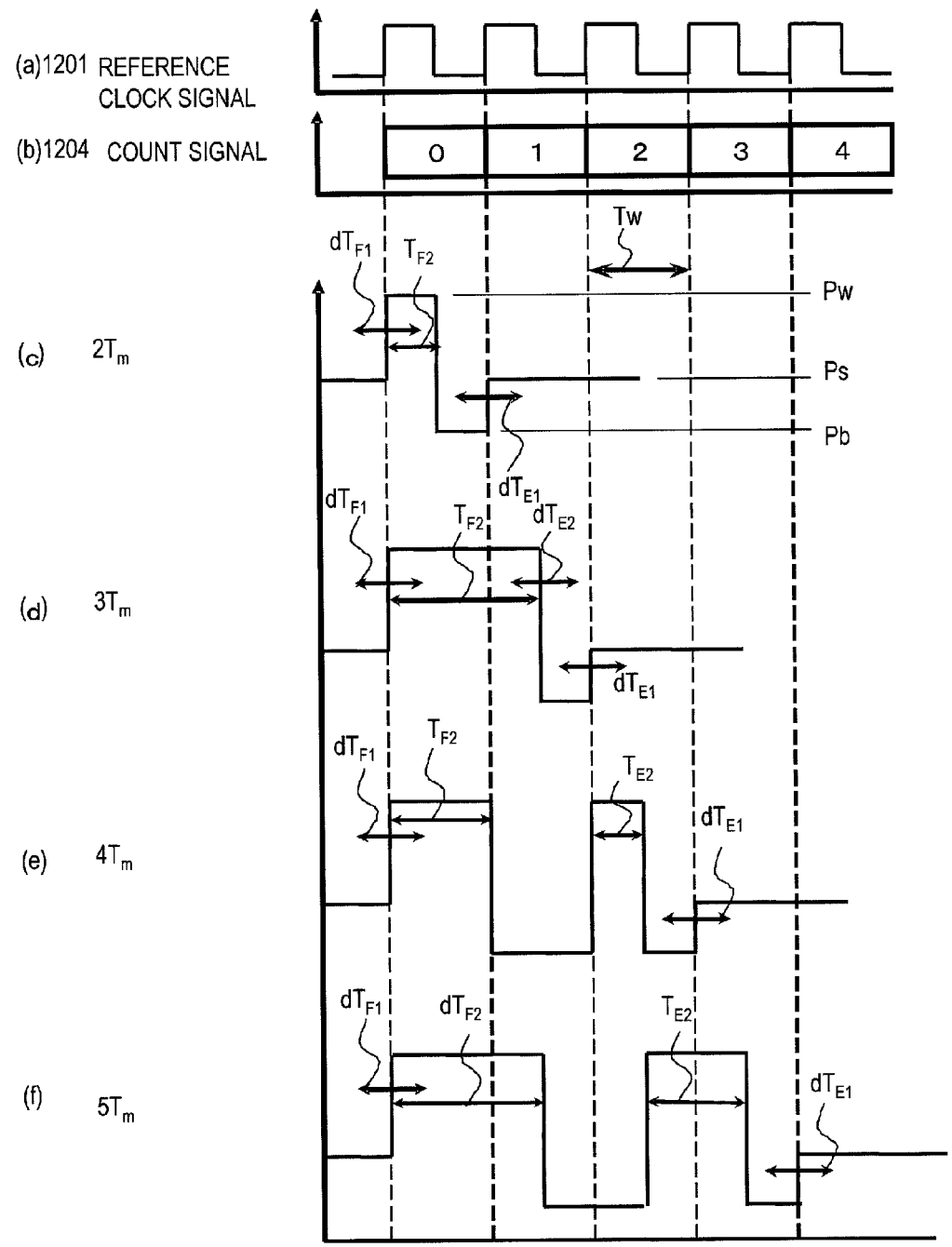

FIG.17
(a)

| | WRITE STRATEGY PARAMETER | WRITE PRE-COMPENSATION TYPE | | | | |
|---|---|---|---|---|---|---|
| | | NONE | PRECEDING SPACE | FOLLOWING SPACE | PREVIOUS MARK | NEXT MARK |
| 2T | dTF1 | ○ | ○ | ○ | ○ | ○ |
| | TF2 | ○ | ○ | ○ | ○ | ○ |
| | dTE1 | ○ | ○ | ○ | NA | ○ |
| 3T | dTF1 | ○ | ○ | NA | NA | NA |
| | TF2 | ○※ | ○※ | NA | NA | NA |
| | dTE2 | ○※ | NA | ○※ | NA | NA |
| | dTE1 | ○ | NA | ○ | NA | NA |
| 4T,6T,8T | dTF1 | ○ | ○ | NA | NA | NA |
| | TF2 | ○ | NA | ○ | NA | NA |
| | TE3 | ○ | NA | ○ | NA | NA |
| | dTE2 | ○ | NA | ○ | NA | NA |
| | dTE1 | ○ | ○ | NA | NA | NA |
| 5T,7T,9T | dTF1 | ○ | ○ | NA | NA | NA |
| | TF2 | ○ | NA | ○ | NA | NA |
| | TE3 | ○ | NA | ○ | NA | NA |
| | dTE2 | ○ | NA | ○ | NA | NA |
| | dTE1 | ○ | NA | NA | NA | NA |
| ≧4T | TMP | ○ | NA | NA | NA | NA |

(b)

| | dTF1 OR TF2 FOR PRECEDING SPACE PRE-COMPENSATION | NO | NO | YES | YES |
|---|---|---|---|---|---|
| | dTE2 FOR FOLLOWING SPACE PRE-COMPENSATION | NO | YES | NO | YES |
| 3T | TF2 | NA | NA | NA | NA |
| | dTE2 | ○ | △ | △ | ○ |

FIG. 18 dTF1

| | | 2Tmark | | | | 3Tmark | | 4T,6T,8Tmark | | 5T,7T,9Tmark | | |
|---|---|---|---|---|---|---|---|---|---|---|---|---|
| | | 2Tmark | ≥3Tmark | | | X | | X | | X | | Next mark |
| | | 2Tspace | | 3Tspace | 4Tspace | ≥5Tspace | | | | | | Following space |
| 2Tmark ≥3Tmark | 2Tspace | 1 | 2 | 3 | 4 | 5 | | | | | | |
| | 3Tspace | 6 | 7 | 8 | 9 | 10 | | | | | | |
| X | 4Tspace | 11 | 12 | 13 | 14 | 15 | 26 | | 30 | | 34 | |
| | ≥5Tspace | 16 | 17 | 18 | 19 | 20 | 27 | | 31 | | 35 | |
| Previous mark | Preceding space | 21 | 22 | 23 | 24 | 25 | 28 | | 32 | | 36 | |
| | | | | | | | 29 | | 33 | | 37 | |

TF2

| | | 2Tmark | | | | 3Tmark | | 4T,6T,8Tmark | | 5T,7T,9Tmark | | |
|---|---|---|---|---|---|---|---|---|---|---|---|---|
| | | 2Tmark | ≥3Tmark | | | X | | X | | X | | Next mark |
| | | 2Tspace | | 3Tspace | 4Tspace | ≥5Tspace | | | | | | Following space |
| 2Tmark ≥3Tmark | 2Tspace | 1 | 2 | 3 | 4 | 5 | | | | | | |
| | 3Tspace | 6 | 7 | 8 | 9 | 10 | | | | | | |
| X | 4Tspace | 11 | 12 | 13 | 14 | 15 | 26 | | 30 | | 34 | |
| | ≥5Tspace | 16 | 17 | 18 | 19 | 20 | 27 | | 31 | | 35 | |
| Previous mark | Preceding space | 21 | 22 | 23 | 24 | 25 | 28 | | 32 | | 36 | |
| | | | | | | | 29 | | 33 | | 37 | |

TE3

| | | | | 3Tmark | | 4T,6T,8Tmark | | 5T,7T,9Tmark | | |
|---|---|---|---|---|---|---|---|---|---|---|
| | | | | X | | X | | X | | Next mark |
| | | 2Tspace | 3Tspace | 4Tspace | ≥5Tspace | | | | | Following space |
| X Previous mark | Preceding space | 1 | 2 | 3 | 4 | | | | | | dTE2

| | | | | 3Tmark | |
|---|---|---|---|---|---|
| | | | | X | |
| | | 2Tspace | 3Tspace | 4Tspace | ≥5Tspace |
| X Previous mark | Preceding space | 1 | 2 | 3 | 4 | dTE1

| | dTs | 2Tmark | | | | 3Tmark | | 4T,6T,8Tmark | | 5T,7T,9Tmark | | |
|---|---|---|---|---|---|---|---|---|---|---|---|---|
| | | 2Tmark | ≥3Tmark | | | X | | X | | X | | Next mark |
| | | 2Tspace | | 3Tspace | 4Tspace | ≥5Tspace | | | | | | Following space |
| | 2Tspace | 1 | 2 | 3 | 4 | 5 | | | | | | |
| X | ≥3Tspace | 6 | 7 | 8 | 9 | 10 | | | | | | |
| Previous mark | Preceding space | | | | | | 11 | 12 | 13 | 14 | 15 | 16 | 17 | 18 | 19 | 20 | 21 | 22 |

X: Don't CARE

TMP: 1

OPTICAL INFORMATION RECORDING MEDIUM, INFORMATION RECORDING APPARATUS, INFORMATION REPRODUCING APPARATUS, INFORMATION RECORDING METHOD, INFORMATION REPRODUCING METHOD AND METHOD FOR PRODUCING OPTICAL INFORMATION RECORDING MEDIUM

TECHNICAL FIELD

The present invention relates to a method for defining control information for use to control a read/write operation on an optical information storage medium (especially a method for defining write strategy and write pre-compensation related control information) and also relates to an optical information storage medium that stores such control information thereon. The present invention further relates to a method of making an optical information storage medium that stores such control information thereon, an information writing method, an information reading method, and an information reading/writing apparatus.

BACKGROUND ART

Recently, standards have been set up and actually applied to various types of write-once or rewritable optical information storage media, including BD-R, BD-RE, DVD-RAM, DVD-R, DVD-RW and CD-RW. Meanwhile, technologies for performing read/write operations on those various optical information storage media compliant with the standards have also been developed and introduced into actual products.

A phase change type optical information storage medium is known as one of those various types of optical information storage media. If a phase change type optical information storage medium is irradiated with a laser beam, of which the intensity is higher than a predetermined value, a part of a recording film that has been irradiated with the laser beam changes its phases from an amorphous one into a crystalline one, thus forming a recording mark there. For example, a combination of spaces and marks, of which the lengths are determined by a signal that has been modulated to represent the information to write, is formed on tracks on the recording film. The amorphous and crystalline phases have mutually different reflectances. That is why if the tracks on which information is stored are scanned with a laser beam, of which the intensity is not so high as to cause a phase change on the recording film, reflected light, of which the intensity varies so as to represent the spaces and marks, can be obtained. As a result, the information stored on the optical information storage medium can be retrieved.

The recording film of a rewritable optical information storage medium may be made of GeSbTe as a recording film material, for example. Patent Document No. 1 teaches using a Te—O-M based material (where M is at least one element selected from the group consisting of metallic elements, metalloid elements and semiconductor elements) as a recording film material for a write-once optical information storage medium. The Te—O-M based material is a compound material, which includes Te, O and M and in which fine particles of Te, Te-M and M are randomly dispersed in a $TeO_2$ matrix of the as-deposited material. When the recording film of such a material is irradiated with a laser beam, the portion of the recording film irradiated with the laser beam will melt to precipitate Te or Te-M crystals with large particle sizes. As a result, the reflectance of that portion that has been irradiated with the laser beam varies and the variation in the intensity of the reflected light can be detected as a signal. In this manner, a so-called "write-once operation", which allows the user to perform a write operation only once, can get done.

Other than such a phase change type, also known is a method for forming a recording mark by stacking two thin films, made of mutually different inorganic materials, one upon the other, heating and melting together the two thin films with a laser beam, and blending and alloying them. Furthermore, also known is a method of making the recording film of an organic dye material. According to such a method, the organic dye is thermally decomposed with the heat generated by the laser beam radiated, thereby lowering the refractive index of the thermally decomposed portion of the recording film. As a result, compared to the other portions, which have not been irradiated with the laser beam and in which the organic dye has not been decomposed, the path length of the irradiated portion appears to have shortened with respect to the laser beam. Consequently, the irradiated and non-irradiated portions act just like the concave and convex pits of a read-only CD, for example, with respect to the incident light, and therefore, information can be read and written. In performing a mark edge recording operation on such a write-once optical information storage medium, the medium is irradiated with a laser beam consisting of multiple pulse trains (i.e., so-called "multiple pulses"), thereby causing a physical variation in portions of the recording film that have been irradiated with the laser beam and forming recording marks on the recording film of the storage layer. When a read operation is performed, on the other hand, information is retrieved as a variation in the intensity of the reflected light, which can be detected by a variation in reflectance.

Generally speaking, in a situation where marks and spaces to record need to be shortened to increase the storage density, if the length of a space that precedes a recording mark, among other things, is too short, then thermal interference will occur. That is to say, the heat generated at the rear end of mark recorded could conduct through the space portion and affect a rise in temperature at the frontend of the next mark. Or the heat generated at the frontend of the recorded mark could affect the cooling process at the rear end of the previous mark. Also, even if marks and spaces with accurate lengths have been formed on the tracks, the edge location of a short mark or space to be detected during a read operation could deviate from its ideal value according to the frequency characteristic of a reading optical system to be determined by the light beam spot size. This is a problem. Such a deviation of the detected edge location from the ideal value is generally called an "intersymbol interference". The smaller the relative sizes of marks and space with respect to the light beam spot, the more significant the intersymbol interference. In that case, when a read operation is performed, the jitter and the bit error rate of the read signal will both increase. This is also a problem.

To minimize such intersymbol interference in conventional DVDs and BDs, the position of the first one of multiple pulses to be applied to form a mark is sometimes shifted according to the relation between the length of the mark in question and that of the space that precedes that mark. Or the position of the last one of multiple pulses to be applied to form a mark may be shifted according to the relation between the length of the mark in question and that of the space that follows that mark. Such a control of a write pulse position is usually called an "adaptive write pre-compensation". By getting such adaptive write pre-compensation done, a write operation can be performed with the thermal interference of a recording mark compensated for in advance. Methods of making such adaptive write pre-compensation are disclosed in Patent Documents Nos. 2, 3 and 4.

Patent Document No. 2 discloses a rewritable optical information storage medium that stores in advance a write pulse standard condition. The write pulse standard condition specifies appropriate write pulse positions with respect to multiple possible combinations of various mark and space lengths. The storage medium also stores, in a predetermined area, method and location information for retrieving and modifying the standard write pulse condition and determining the best write pulse condition.

Patent Document No. 3 discloses a writing method in which respective marks to record are classified according to their own lengths and the lengths of their preceding and following spaces. According to Patent Document No. 3, the write pulse signal is controlled with the edge position of the second last one of multiple pulses in a write pulse train to record those marks shifted according to a result of the classification.

Recently, as the storage densities of optical information storage media have been increasing year by year, the lengths of recording marks are now getting closer and closer to the limit of optical resolution. As a result, the intersymbol interference is increasing and the signal to noise ratio (SNR) is decreasing more and more significantly. To cope with such a situation, someone proposed a method for determining a most likely signal sequence based on the waveform of a read signal obtained from an optical information storage medium by so-called PRML (partial response maximum likelihood) signal processing method, which is one of most likelihood decoding methods. For example, according to Non-Patent Document No. 1, if a PR (1, 2, 2, 1) ML method is adopted in combination with an optical system that uses a laser beam with a wavelength of 405 nm and an objective lens with an NA (numerical aperture) of 0.85 to read/write information from/on a BD with a diameter of 12 nm and a storage capacity of 25 GB (gigabytes) per side, a required system margin should be achieved. Also, that document also says that to write information on a BD with a storage capacity of 30 GB or 33.3 GB per side using the same optical system, the mark lengths should be decreased, the linear density should be increased, and the PR (1, 2, 2, 1) ML method should be adopted to process a read signal in that case.

Patent Document No. 4 discloses a writing control method for optimizing write parameters for use to write information by PRML, instead of the jitter of a read signal. According to such a method, a signal waveform is estimated by applying the PRML method to the waveform of a read signal, and the write parameters are optimized so as to minimize the probability of occurrence of errors by the signal waveform stayed.

Also, Patent Document No. 5 discloses that control information (such as write strategy type information) to get a read/write operation done properly on an optical information storage medium should be stored in an information unit in a predetermined area on the optical information storage medium. The document also says that different kinds of write strategy type information should be stored in advance on an information unit basis.

Citation List

Patent Literature

Patent Document No. 1: Japanese Patent Application Laid-Open Publication No. 2004-362748
Patent Document No. 2: Japanese Patent Application Laid-Open Publication No. 2000-231719
Patent Document No. 3: PCT International Application Publication No. 2005/066940
Patent Document No. 4: Japanese Patent Application Laid-Open Publication No. 2008-159231
Patent Document No. 5: Japanese Patent Application Laid-Open Publication No. 2006-313621

Non-Patent Literature

Non-Patent Document No. 1: "Illustrated Blu-ray Disc Reader" published by Ohmsha, Ltd., 2006

SUMMARY OF INVENTION

Technical Problem

According to those conventional methods, however, when a write operation needs to be performed at such a high density that passes the limit of optical resolution to be determined by the relation between the light beam spot size of a laser beam and the length of a recording mark, the recording marks cannot be formed sufficiently accurately and the information stored cannot be retrieved just as intended. As a result, a sufficient storage plane density and reliability cannot be achieved. It is therefore an object of the present invention to provide a method for defining control information such as a write strategy and write pre-compensation that contribute to getting high-density writing done. Another object of the present invention is to provide an optical information storage medium that stores such control information thereon, a method of making an optical information storage medium that stores such control information thereon, an information writing method, an information reading method, and an information reading/writing apparatus.

Solution to Problem

An optical information storage medium according to the present invention has at least one information storage layer. The optical information storage medium has a management area that stores at least one unit containing control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. And the value of the format number changes according to a combination of the write strategy type and the write pre-compensation type.

An information writing apparatus according to the present invention is designed to write information on an optical information storage medium. The optical information storage medium has at least one information storage layer and also has a management area that stores at least one unit containing control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. The value of the format number changes according to a combination of the write strategy type and the write pre-compensation type. The information writing apparatus generates the write pulse train by reference to the control information and irradiates the optical information storage medium with a laser beam, of which the waveform is represented by the write pulse train, thereby forming a recording mark on the medium.

An information reading apparatus according to the present invention is designed to reading information from an optical information storage medium. The optical information storage medium has at least one information storage layer and also has a management area that stores at least one unit containing control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. The value of the format number changes according to a combination of the write strategy type and the write pre-compensation type. The information reading apparatus retrieves the control information from the unit that is stored in the management area.

In one preferred embodiment, the write pre-compensation type includes first and second types. According to the first type of write pre-compensation, performed selectively is either a preceding space pre-compensation, which is a write pre-compensation to get done based on a combination of the mark length of a recording mark and the space length of a first space that precedes the recording mark, or a following space pre-compensation, which is a write pre-compensation to get done based on the mark length of the recording mark and the space length of a second space that follows the recording mark. According to the second type of write pre-compensation, both the preceding space pre-compensation and the following space pre-compensation are performed.

In this particular preferred embodiment, the format number is represented by multiple bits, and one of the multiple bits indicates whether the write pre-compensation type is the first type or the second type.

In another preferred embodiment, the write strategy parameter includes a reference value of the magnitude of shift in the edge position, or variation in the pulse width, of the write pulse train to form a recording mark with a predetermined mark length. The magnitude of shift in the edge position or variation in the pulse width in a situation where the write pre-compensation is performed on the recording mark with the predetermined mark length using a combination of the predetermined mark length and the respective lengths of the spaces that precede and follow the recording mark with the predetermined mark length is included, as differential information with respect to the reference value, in the write strategy parameter.

In still another preferred embodiment, the write strategy type includes at least three different write strategy types that are N−1, N/2 and castle.

In yet another preferred embodiment, a write operation is able to be performed on the optical information storage medium with at least one writing speed, and the unit stored in the management area includes the control information for at least one combination of the at least one writing speed and the at least one information storage layer.

In this particular preferred embodiment, the unit includes layer information, which indicates to which of the at least one information storage layer the control information included in the unit applies, and writing speed information, which indicates to which of the at least one writing speed the control information included in the unit applies.

An information writing method according to the present invention is a method for writing information on an optical information storage medium. The optical information storage medium has at least one information storage layer and also has a management area that stores at least one unit containing control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. The value of the format number changes according to a combination of the write strategy type and the write pre-compensation type. The information writing method includes the step of generating the write pulse train by reference to the control information and irradiating the optical information storage medium with a laser beam, of which the waveform is represented by the write pulse train, thereby forming a recording mark on the medium.

An information reading method according to the present invention is a method for reading information from an optical information storage medium. The optical information storage medium has at least one information storage layer and also has a management area that stores at least one unit containing control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. The value of the format number changes according to a combination of the write strategy type and the write pre-compensation type. The information reading method includes the step of retrieving the control information from the unit that is stored in the management area.

A manufacturing method according to the present invention is a method of making an optical information storage medium with at least one information storage layer. The method includes the step of defining a management area to store at least one unit that contains control information about the optical information storage medium. The control information includes a format number, which provides information about at least a write strategy type and a write pre-compensation type, and a write strategy parameter, which provides information about the magnitude of shift in an edge position, or variation in the pulse width, of a write pulse train to form a recording mark. The value of the format number changes according to a combination of the write strategy type and the write pre-compensation type.

In one preferred embodiment, the method includes the step of writing information related to the control information on the management area.

Advantageous Effects of Invention

An optical information storage medium according to the present invention has a control area that stores control information including a format number that provides information about at least a write strategy type and a write pre-compensation type. The value of the format number changes according to a combination of the write strategy type and the write pre-compensation type. That is why just by loading the format number, the types of the write strategy and write pre-compensation to adopt in performing a write operation on that optical information storage medium can be determined. In addition, when the writing condition is being learned, the number of test write patterns to be written tentatively can be reduced.

That is why even if the given optical information storage medium has so high a storage density that a write pre-compensation method that requires to set a lot of parameters to get write pre-compensation done should be used, the best writing condition can be learned both accurately and quickly during the write operation.

Specifically, according to the adaptive write pre-compensation to adopt in the present invention, a write pre-compensation table is drawn up in advance by classifying various combinations of mark and space lengths. In this case, each combination consists of the length of a mark in question, for which a write pulse train will be generated, and the lengths of its preceding and following spaces. When a write operation is performed on the optical information storage medium of the present invention, the write pulse signal is controlled with the write strategy type information and the pulse edge position of the write pulse train modified based on the result of that classification. In the optical information storage medium of the present invention, the format number, which provides information about at least the write strategy type and the write pre-compensation type for a predetermined information storage layer on a writing speed basis, is stored in a predetermined area. That is why when a write operation is performed on this optical information storage medium, the best writing condition can be learned both accurately and quickly.

More specifically, suppose a high-density write operation needs to be performed using an optical system with a laser wavelength of 405 nm and an objective lens NA of 0.85 so that a Blu-ray Disc (BD) with a diameter of 12 cm and a storage capacity of 30 GB or 33.4 GB per side has a shortest mark length of approximately 0.124 µm to 0.111 µm. In that case, the front and rear end positions of a mark can be controlled more strictly with the intersymbol interference or thermal interference well taken into account, even though the interference will be a problem when a write operation is performed at such a high linear density that exceeds the limit of OTF (optical transfer function) to be determined by the shortest mark length and light beam spot size. As a result, the read/write operation can get done with more reliability, a high-density, huge-capacity storage medium is realized, and the sizes of the information storage device and storage medium can be both reduced as well.

In the case of a write-once optical information storage medium, among other things, only a limited number of clusters are available in the OPC area. That is why if test write operations were performed a number of times in vain, the OPC area would be wasted and chances of using up the OPC area would increase. Thus, by storing the format number or write pre-compensation flag of the present invention, which provides information about at least the write strategy type and the write pre-compensation type, in the DI unit in advance, the write pre-compensation can get done accurately and efficiently by an optical disc apparatus. As a result, the chances of missing write opportunities by using up the limited number of clusters in the OPC area can be reduced effectively.

Furthermore, if write pre-compensation type information is stored in advance in a predetermined area on the optical disc medium, the front or rear end position of a mark to be left on the tracks of the optical disc medium can be controlled accurately. In this case, the write pre-compensation type information indicates whether the write pre-compensation needs to be done on the preceding space length or the following space length at each of the leading and trailing edges of a mono pulse write pulse train of the second shortest mark length (3T) that has been modulated with the peak power.

Figure 2:
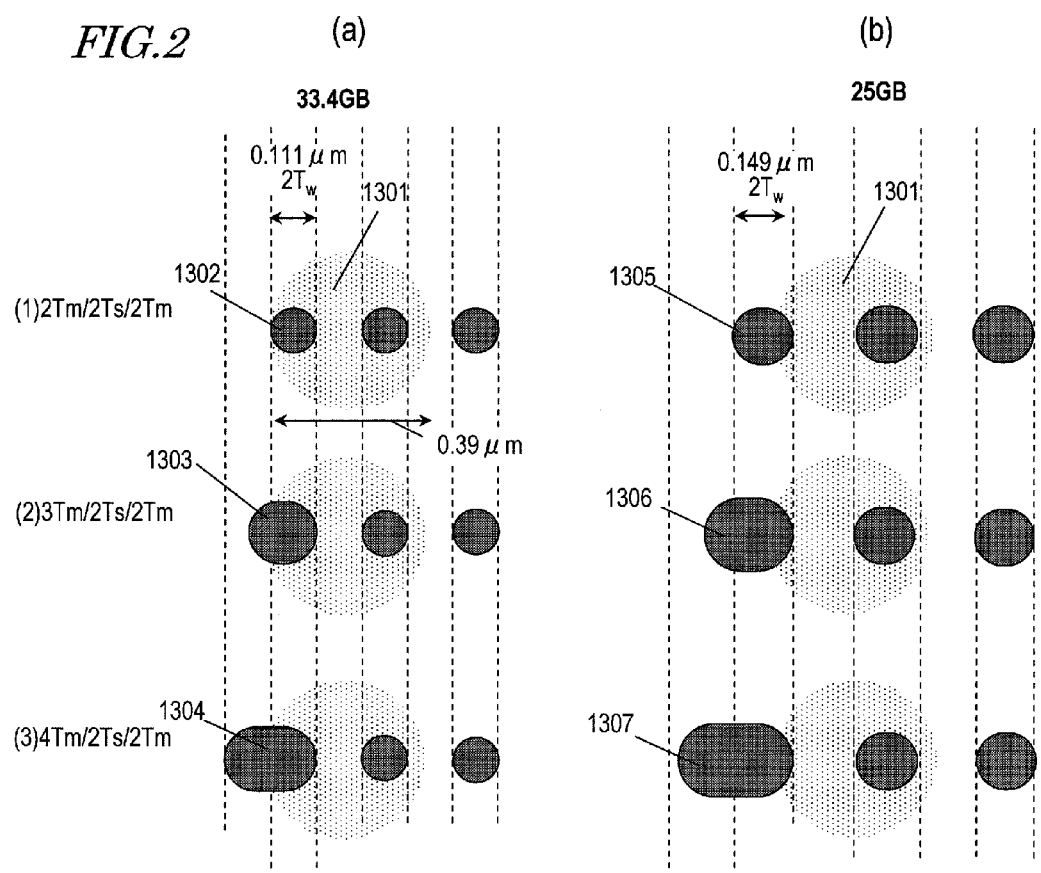

Portions (a) and (b) of FIG. 2 schematically illustrate relations between the spot size of a light beam and the physical sizes of recording marks on an optical information storage medium.

Figure 3:
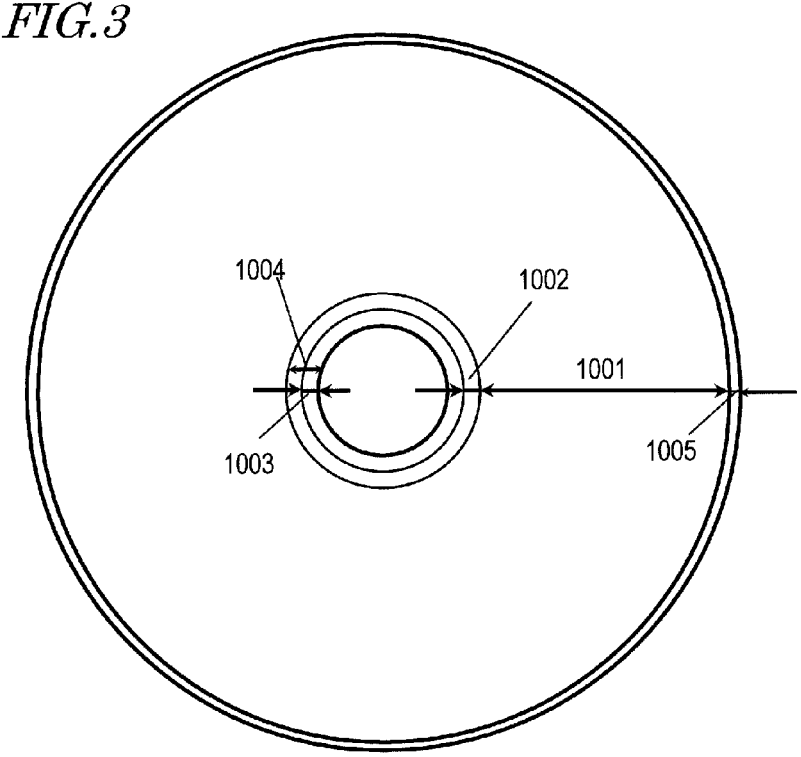

FIG. 3 illustrates a layout of respective areas on an optical information storage medium as a preferred embodiment of the present invention.

Figure 4:
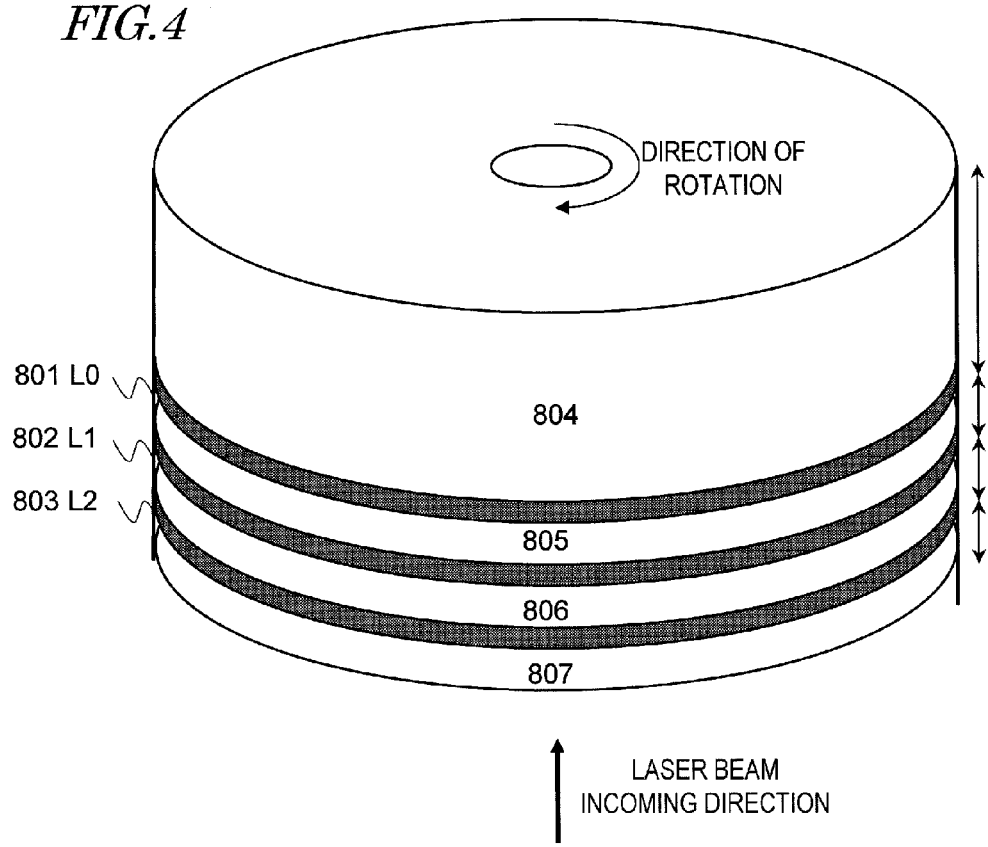

FIG. 4 is a schematic representation illustrating the structure of an optical information storage medium as a preferred embodiment of the present invention.

Figure 5:
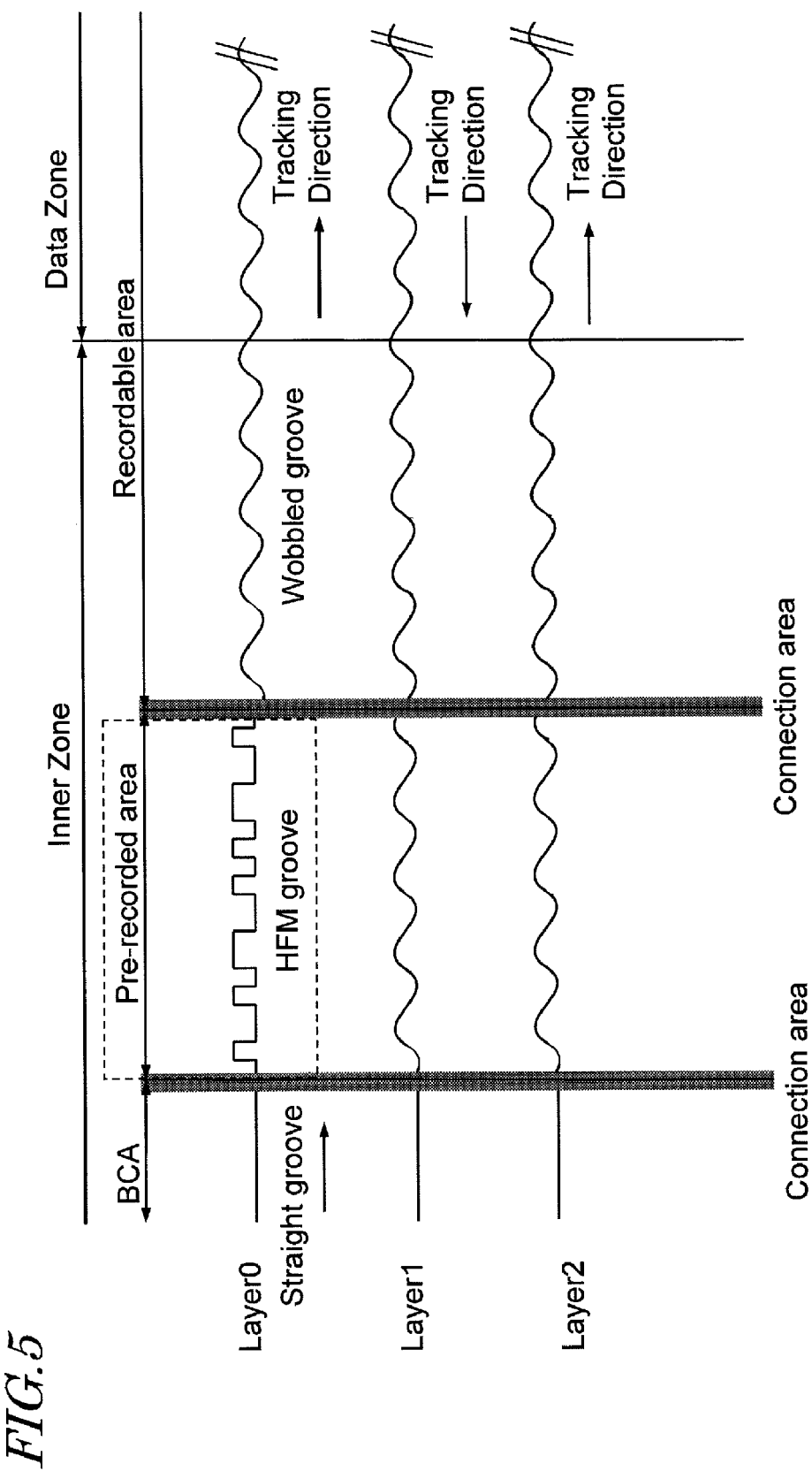

FIG. 5 illustrates a track layout for each information storage layer in the optical information storage medium according to the preferred embodiment of the present invention and also illustrates how the tracks are arranged on a cross section of the storage medium.

Figure 6:
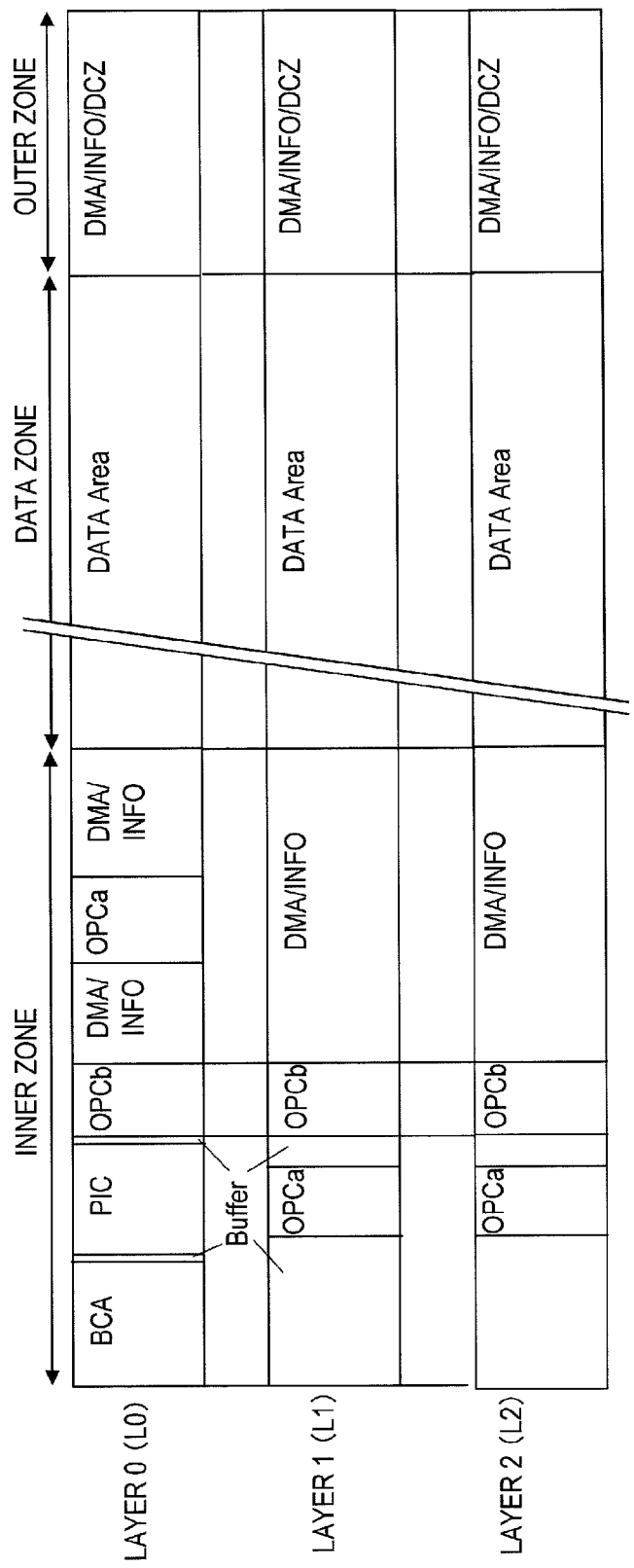

FIG. 6 illustrates an exemplary physical format for the respective information storage layers of the optical information storage medium according to the preferred embodiment of the present invention.

Portion (a) of FIG. 7 shows an exemplary makeup for one disc information (DI) unit of the optical information storage medium according to the preferred embodiment of the present invention and portion (b) of FIG. 7 shows the makeup of the DI format number.

FIG. 8 shows how write pre-compensation types are classified according to an N−1 type write strategy in the optical information storage medium according to the preferred embodiment of the present invention.

FIG. 9 shows the specific bits allocated to the DI format numbers in an optical information storage medium according to the preferred embodiment of the present invention.

FIGS. 10($a$) and 10($b$) show makeup of alternative DI format numbers for an optical information storage medium according to the preferred embodiment of the present invention.

Figure 11:
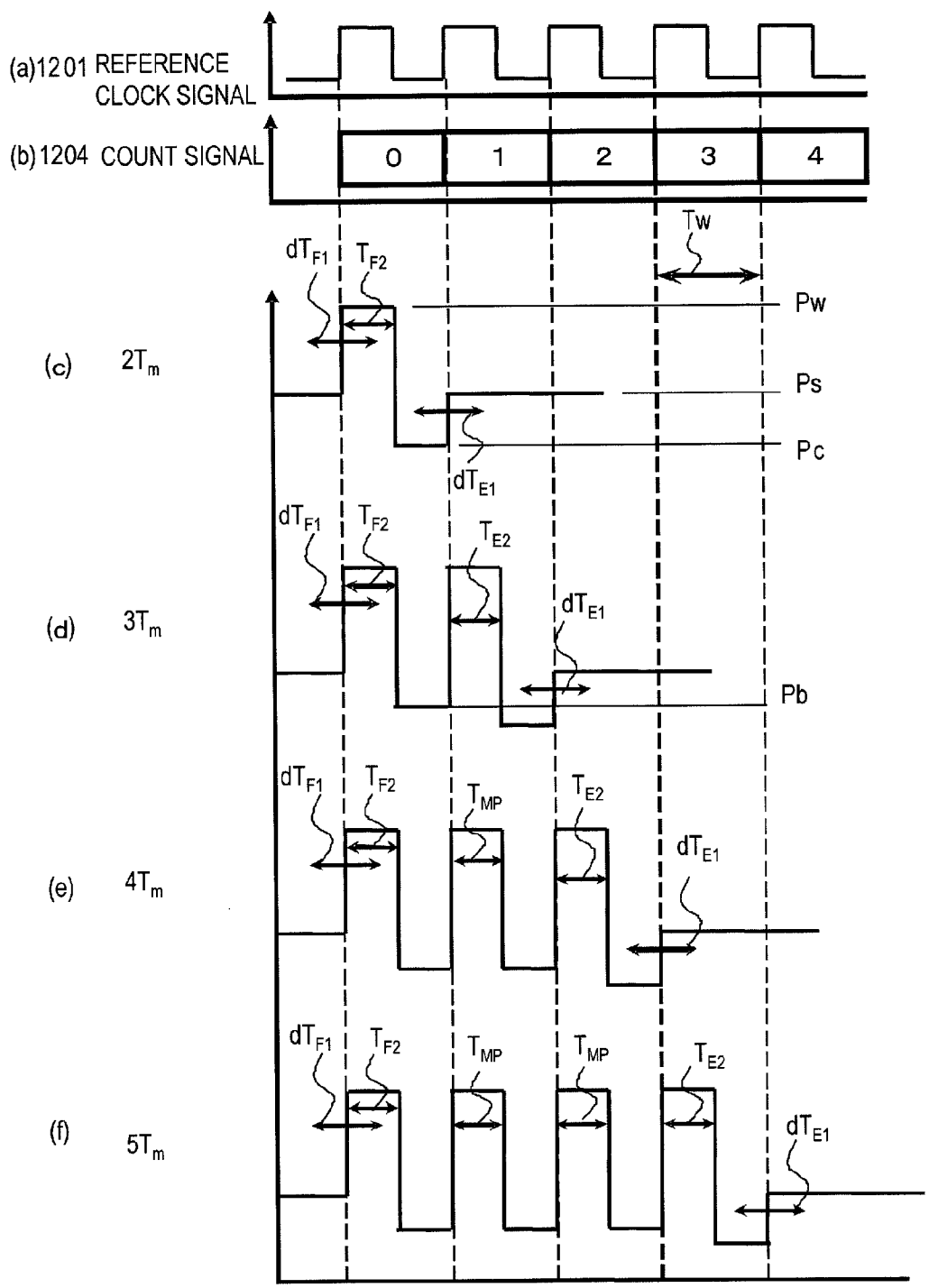

Portions (a) through (f) of FIG. 11 illustrate a timing diagram schematically showing the relation between the mark length and the waveform of a write pulse train according to the N−1 type write strategy in an optical information storage medium according to the preferred embodiment of the present invention.

FIG. 12 shows possible combinations of the write strategy parameter values shown in FIG. 11 with the respective write pre-compensation types.

Portions (a) through (g) of FIG. 13 illustrate a timing diagram schematically showing the relation between the mark length and the waveform of a write pulse train according to the castle type write strategy in an optical information storage medium according to the preferred embodiment of the present invention.

FIG. 14 shows how write pre-compensation types are classified according to the castle type write strategy in the optical information storage medium according to the preferred embodiment of the present invention.

Figure 15:
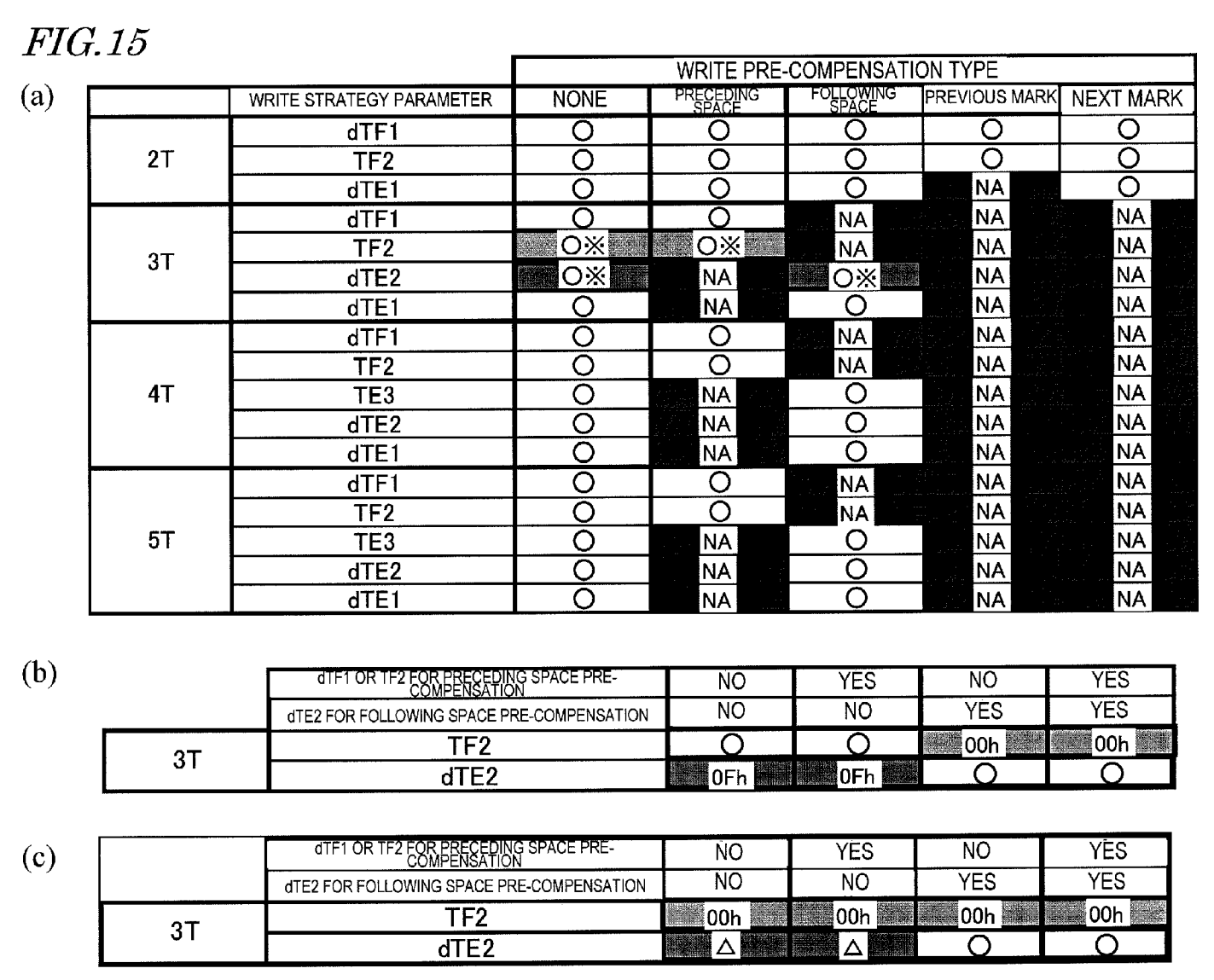

FIG. 15 shows possible combinations of the write strategy parameter values shown in FIG. 13 with the respective write pre-compensation types.

Portions (a) through (f) of FIG. 16 illustrate a timing diagram schematically showing the relation between the mark length and the waveform of a write pulse train according to the N/2 type write strategy in an optical information storage medium according to the preferred embodiment of the present invention.

FIGS. 17($a$) and 17($b$) show possible combinations of the write strategy parameter values shown in FIG. 16 with the respective write pre-compensation types.

FIG. 18 shows how write pre-compensation types are classified according to the N/2 type write strategy in the optical information storage medium according to the preferred embodiment of the present invention.

Figure 19:
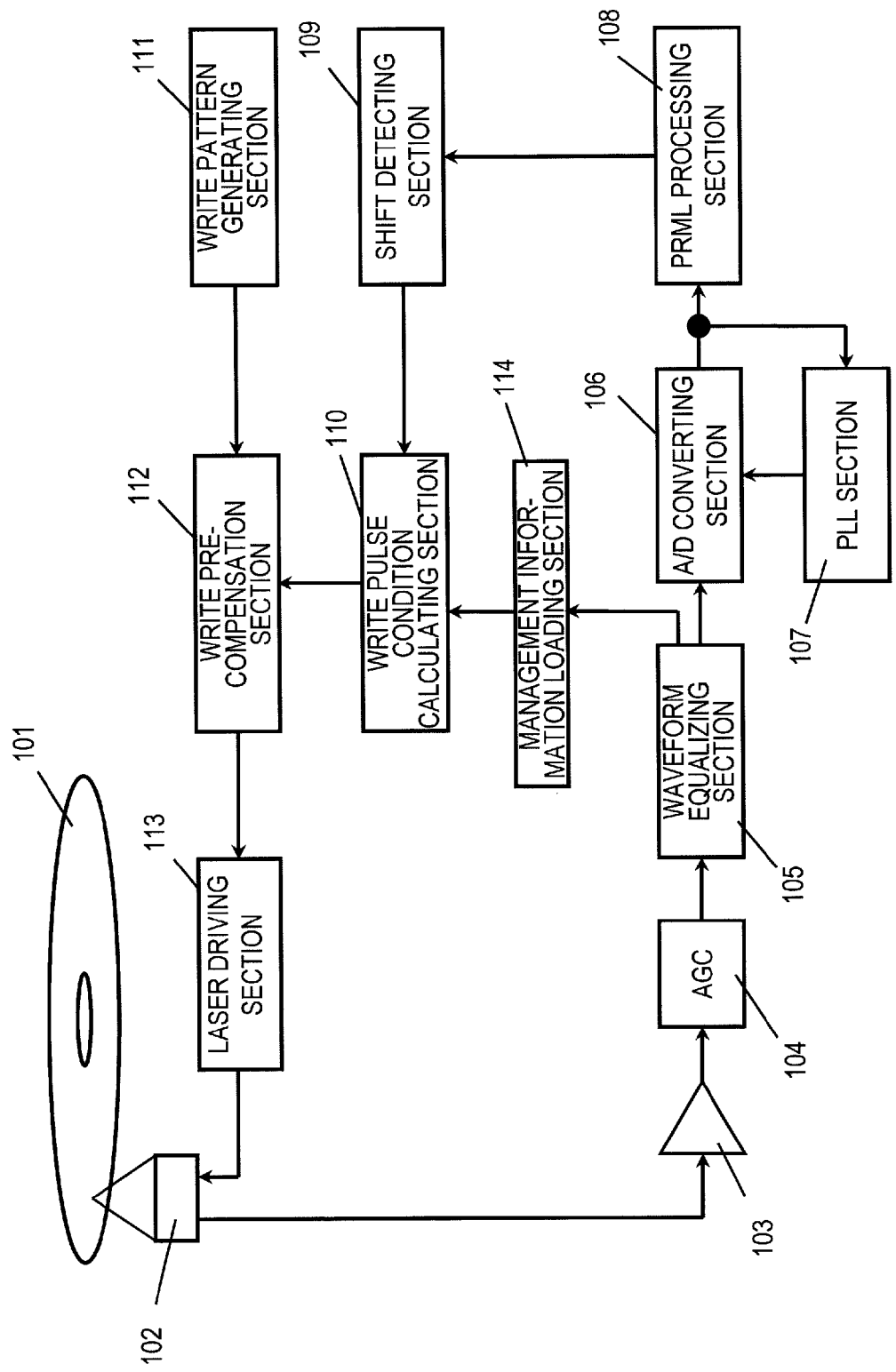

FIG. 19 is a block diagram illustrating a configuration for an information reading apparatus as a preferred embodiment of the present invention.

Figure 20:
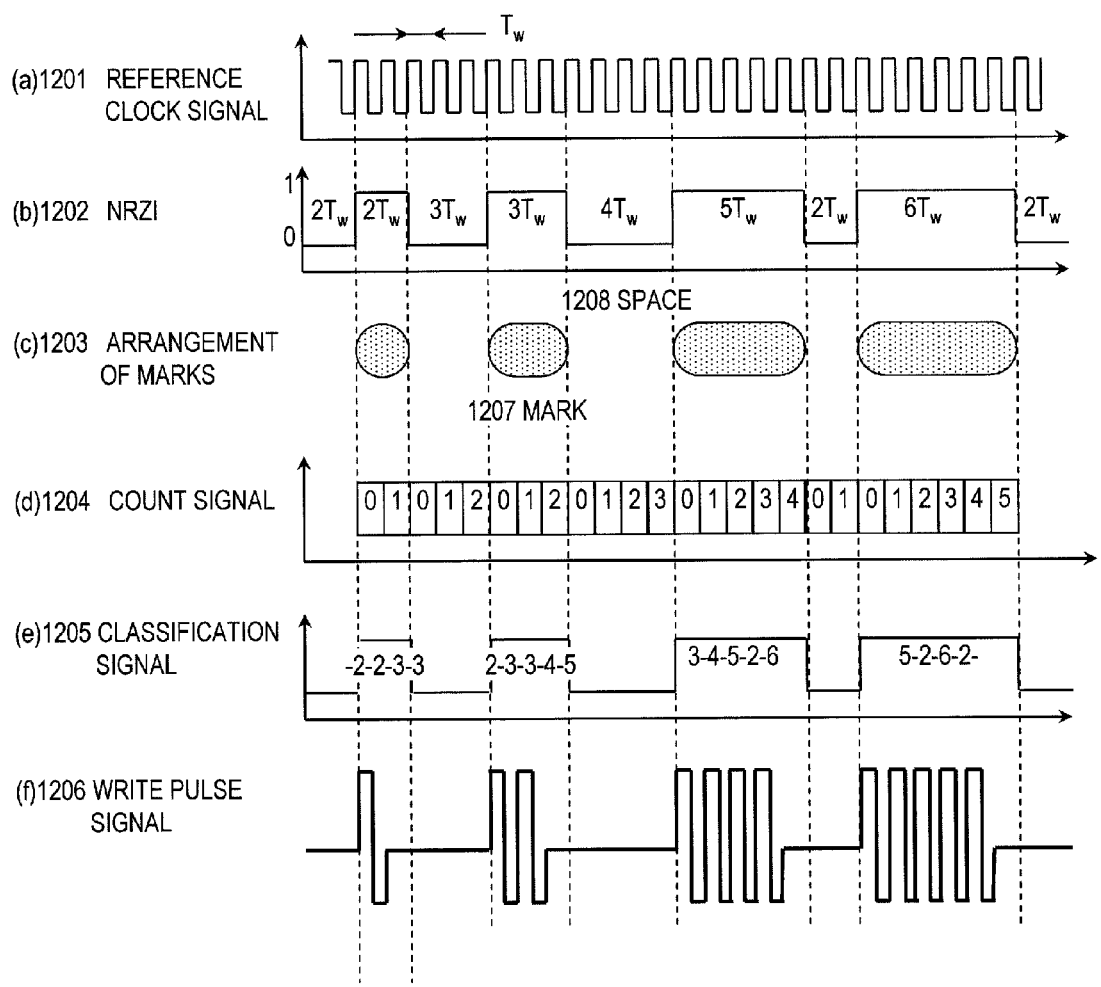

Portions (a) through (f) of FIG. 20 illustrate a timing diagram showing how to carry out the writing method of the present invention.

Figure 21:
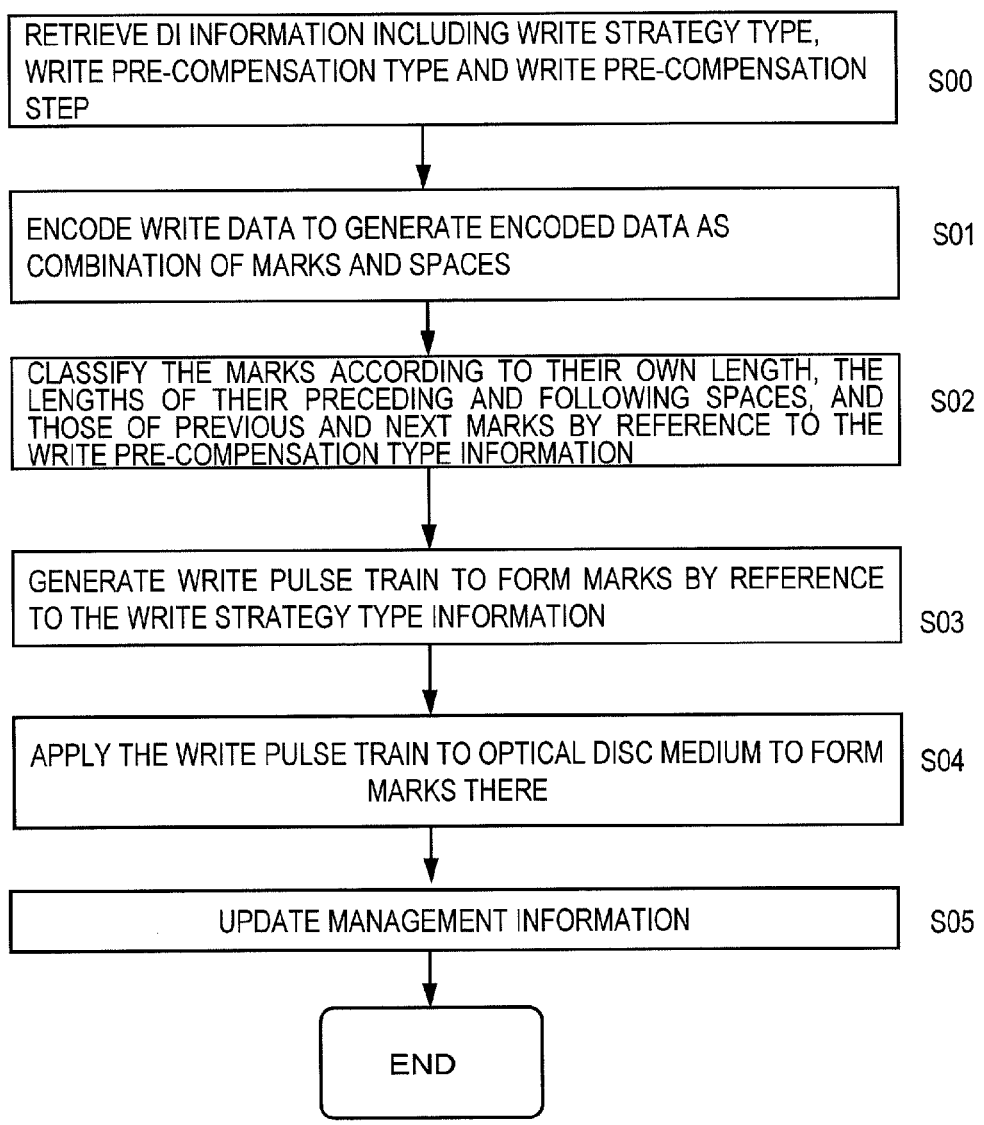

FIG. 21 is a flowchart showing the procedure of the writing method of the present invention.

Figure 22:
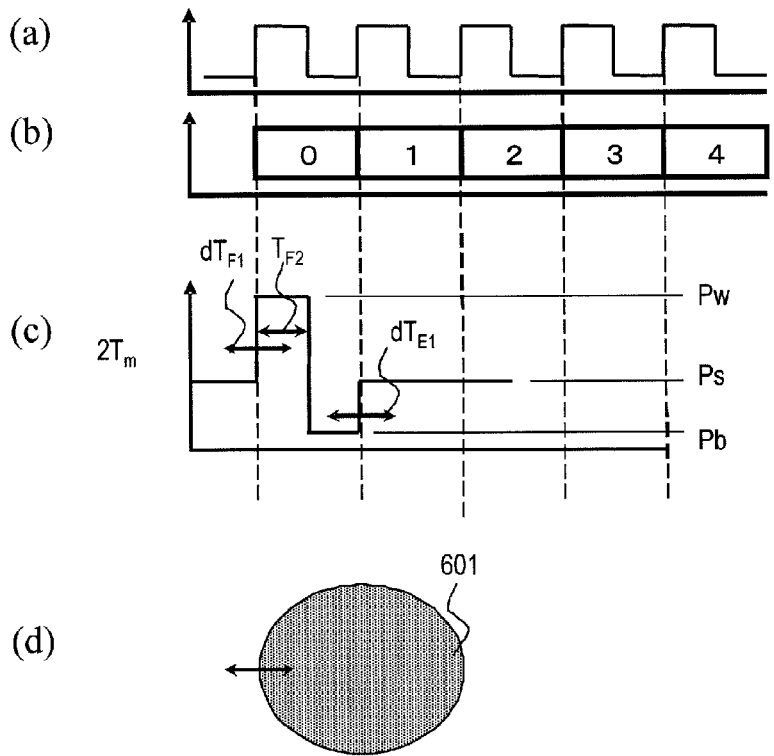

Portions (a) through (d) of FIG. 22 illustrate how a write pulse train for use in the writing method of the present invention may be controlled.

Figure 23:
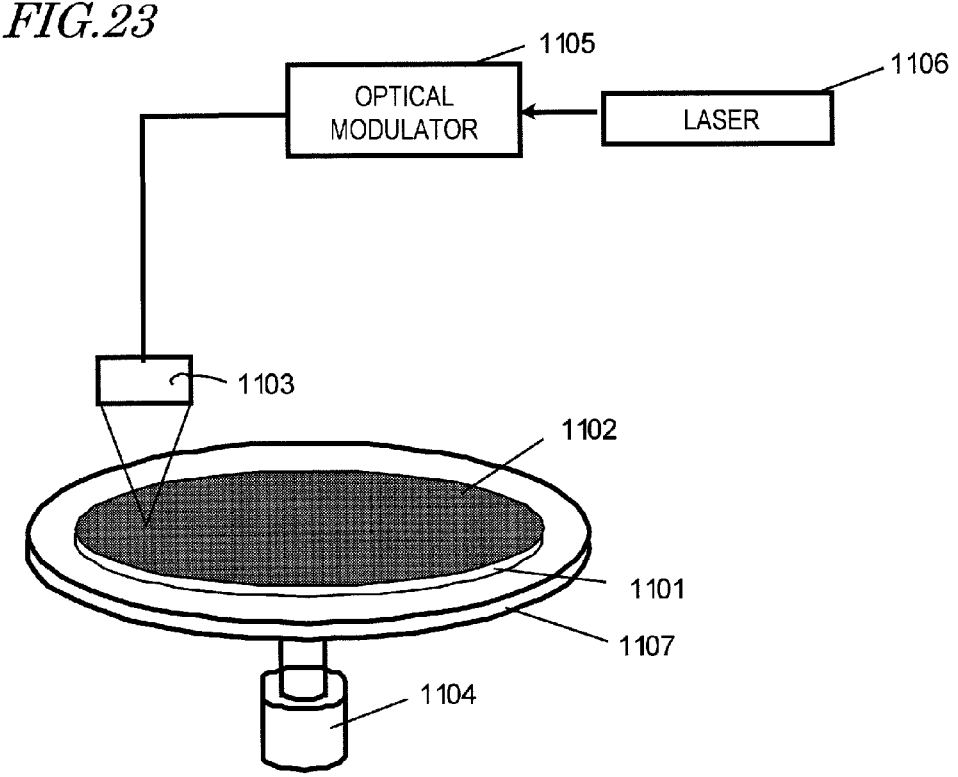

FIG. 23 illustrates a preferred embodiment of a manufacturing system according to the present invention.

DESCRIPTION OF EMBODIMENTS

To reduce the optical intersymbol interference or thermal interference that is a problem when a write operation needs to be performed at a high density, adaptive write pre-compensation is done according to the present invention on the edges of a write pulse train to be applied to form a mark in question based on the length(s) of preceding and/or following space(s) or a combination of the length(s) of preceding and/or following space(s) and the length(s) of previous and/or next mark(s). In this manner, the present invention provides reading and writing methods and information reading and writing apparatus that can form recording marks of quality and that can increase the system margin of the optical disc. And the present invention also provides an optical information storage medium that stores thereon write strategy and write pre-compensation related control information, which can be used effectively to carry out such reading and writing methods.

According to the conventional methods of determining how to get a write pre-compensation done as disclosed in Patent Documents Nos. 2, 3 and 4, by reference to the location information about a combination of the length of a mark to record and those of preceding and following spaces, the leading edge of a write pulse train is controlled based on the respective lengths of the mark to record and the preceding space in combination. On the other hand, the trailing edge of the write pulse train is controlled based on the respective lengths of the mark to record and the following space in combination. According to such a write pre-compensation method, however, if a mark or a pit that is much smaller than the light beam spot size needs to be recorded or scanned, the edge positions of the mark recorded cannot be adjusted precisely enough to avoid increasing the intersymbol interference. These documents fail to disclose that if the mark length is even less than the optical resolution to be determined by the size of the mark and the light beam spot size, the write pre-compensation should be done based on the lengths of the preceding and following spaces with or without those of the previous and next marks in determining the position to record the mark in question.

Meanwhile, the optical information storage medium that stores disc control information as disclosed in Patent Document No. 5 defines a data structure for the control information using N−1, N/2 or any other write strategy type as a piece of the control information. However, this document also fails to disclose that if the mark length is even less than the optical resolution to be determined by the size of the mark and the light beam spot size, it is necessary to store control information to get the write pre-compensation done based on the lengths of the preceding and following spaces with or without those of the previous and next marks in determining the position to record the mark in question.

Furthermore, according to Patent Documents Nos. 1 to 5, unless every bit of write strategy type information and every write strategy parameter, indicating the edge positions and pulse widths of a write pulse train applied to record a mark, are retrieved, the write pre-compensation type, which is classified according to the combination of the length of the recording mark and those of the preceding and following spaces or the combination of the respective lengths of the previous and next marks, cannot be recognized. That is to say, it is not until every write strategy parameter has been extracted from various types of control information stored on the disc and has had its value checked that it is determined whether or not an adaptive write pre-compensation needs to be done based on the space lengths. That is why it takes a lot of time to get every parameter retrieved and get computations done. Added to that, if there are multiple different write pre-compensation types, no information that indicates which of those various types of write pre-compensation is most effective or has the highest priority is stored on the disc.

Furthermore, according to the conventional write pre-compensation methods, if a write pulse train has three edges (i.e., a write pulse train consisting of a mono pulse and an additional cooling pulse), those documents disclose that the leading edge of the first pulse of the write pulse train is adjusted according to the preceding space length and the trailing edge of the last pulse is adjusted according to the following space length. But those documents just disclose that the edges of the second pulse or the second last pulse are adjusted according to the length of either the preceding space or the following space.

Hereinafter, preferred embodiments of an optical information storage medium, an apparatus and method for writing information, an apparatus and method for reading information and an optical information storage medium manufacturing method according to the present invention will be described. In the following description of preferred embodiments, the optical information storage medium of the present invention is supposed to be a write-once phase change type optical information storage medium (such as a BD-R). However, the optical information storage medium of the present invention does not have to be a write-once one or a phase-change one. Rather, the present invention is broadly applicable to any other recordable or rewritable optical information storage medium on which information is written by forming a mark or a recording pit, having a different physical property from the unrecorded portion, with optical energy injected into the medium.

Main optical conditions to adopt in this preferred embodiment are as follows. The laser beam for use to perform a read/write operation has a wavelength of 400 nm to 410 nm, e.g., 405 nm. The objective lens has an NA of 0.84 to 0.86, e.g., 0.85. The optical information storage medium has a track pitch of 0.32 μm. The cover layer on which the laser beam is incident has a thickness of 50 μm to 110 μm. The shortest ones (2T) of recording marks and spaces to be formed on the tracks have a length of 0.111 μm to 0.124 μm, e.g., about 0.111 μm. The write data is supposed to be modulated by 17PP modulation.

More exactly, the length of the shortest marks and spaces may be defined to be 0.11175 μm, which is three-quarters of 0.1490 μm that is the shortest mark length of a BD. In the following description of preferred embodiments, however, the shortest mark and spaces (2T) are supposed to have a length of 0.111 µm as described above. Nonetheless, the present invention is never limited to this specific numerical value.

In a situation where a write operation is performed at such a linear density that will result in the shortest mark length of 0.111 µm, the optical information storage medium with a diameter of 12 cm will have a storage capacity of approximately 33.4 GB per information storage layer. If three information storage layers are stacked one upon the other, the overall storage capacity will be approximately 100 GB. On the other hand, if four information storage layers are stacked one upon the other, the overall storage capacity will be approximately 134 GB. Meanwhile, in a situation where a write operation is performed at such a linear density that will result in the shortest mark length of 0.116 µm, the optical information storage medium with a diameter of 12 cm will have a storage capacity of approximately 32 GB per information storage layer. If three information storage layers are stacked one upon the other, the overall storage capacity will be approximately 96 GB. On the other hand, if four information storage layers are stacked one upon the other, the overall storage capacity will be approximately 128 GB. Furthermore, in a situation where a write operation is performed at such a linear density that will result in the shortest mark length of 0.124 µm, the optical information storage medium with a diameter of 12 cm will have a storage capacity of approximately 30 GB per information storage layer. If three information storage layers are stacked one upon the other, the overall storage capacity will be approximately 90 GB. On the other hand, if four information storage layers are stacked one upon the other, the overall storage capacity will be approximately 120 GB.

In the following description of preferred embodiments, in a multilayer optical information storage medium with three or more information storage layers, among other things, the writing speed is supposed to be represented by a channel rate of 132 MHz (corresponding to Tw=7.58 ns), which is twice as high as the standard writing speed for BDs. However, the optical information storage medium of the present invention has only to include at least one information storage layer and could even include four or more information storage layers.

As described above, the information writing apparatus for writing information on the optical information storage medium of this preferred embodiment and the information reading apparatus for reading information from the optical information storage medium include an optical pickup including a semiconductor laser diode that emits a laser beam with a wavelength of 405 nm and an objective lens with an NA of 0.85. In performing a read operation, the laser power is set to be approximately 1.4 mW. Also, the optical information storage medium has a structure in which three information storage layers are stacked on upon the other.

Figure 1:
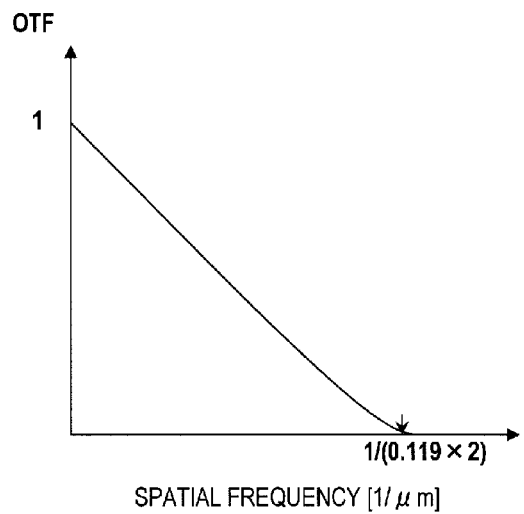
FIG. 1 shows how the OTF changes with the spatial frequency in an optical system.

If the diameter of a range in which a Gaussian beam has a peak intensity of $1/e^2$ is called an "effective spot size", the effective spot size of the laser beam is represented by $0.82 \times (\lambda/NA)$. And in the information reading apparatus and the information writing apparatus described above, the laser beam has an effective spot size of approximately 0.39 µm. For such an optical system, the shortest recording mark with a length of approximately 0.111 µm is way below the limit of optical resolution, at or above which marks can be recognized with the laser beam spot of the size described above. The shorter a recording mark, the smaller the amplitude of a read signal generated by scanning the recording mark with the light beam. And at the optical resolution limit, the amplitude of the read signal goes zero. The inverse number of that recording mark length is spatial frequency. And the relation between the spatial frequency and the signal amplitude is called an OTF (optical transfer function). As the spatial frequency rises, the signal amplitude decreases linearly and eventually goes zero at a certain frequency, which is called an "OTF cutoff frequency". The relation between the OTF and the spatial frequency in the optical system described above is shown in FIG. 1. In the optical system described above, the OTF cutoff frequency is determined by the wavelength λ and the NA of the objective lens and is calculated by $\lambda/NA \times 0.5$. That is to say, if λ=405 nm and NA=0.85, one cutoff period will be 0.237 µm and the shortest mark length will be 0.1185 µm, which is a half as long as one cutoff period. That is why if the shortest mark length is either 0.111 µm or 0.116 µm, recording marks, of which the spatial frequency is higher than the cutoff frequency of optically readable recording marks, should be dealt with, thus making it very difficult to perform a read/write operation.

Furthermore, the limit of the OTF cutoff frequency is also affected by a variation in the performance of the optical pickup due to a manufacturing error, for example, and by the degree of deformation and specific shape of the marks. Other than the specific numerical values (i.e., λ=405 nm and NA=0.85) to use in this preferred embodiment, the spot size can also be maximized even when λ=410 nm and NA=0.84. Supposing the magnitude of error due to the manufacturing error is 5%, a half of one OTF cutoff period will be $\lambda/NA \times 0.26 = 0.128$ µm. That is why if marks with the shortest mark length of approximately 0.128 µm or less are recorded or scanned, the optical intersymbol interference is non-negligible.

Portions (a) and (b) of FIG. 2 schematically illustrate relations between the effective spot size of a light beam and the physical sizes of recording marks. In portions (a) and (b) of FIG. 2, recording marks 1302, 1303, 1304, 1305, 1306 and 1307 with mutually different lengths have been formed on an information storage layer, and the sizes of these recording marks and the size (e.g., 0.39 µm) of a light beam spot 1301 in a Gaussian beam shape are shown in comparison. Specifically, portions (a) and (b) of FIG. 2 illustrate how recording marks may be arranged as a combination of 2T mark, 2T space and 2T mark, a combination of 3T mark, 2T space and 2T mark, and a combination of 4T mark, 2T space and 2T mark (from top to bottom) in two different situations where the shortest mark and space lengths (2T) are approximately 0.111 µm and approximately 0.149 µm, respectively. In those situations, a BD with a diameter of 12 cm achieves storage capacities of 33.4 GB and 25 GB, respectively.

As shown in portion (a) of FIG. 2, if the shortest mark and space lengths (2T) are approximately 0.111 µm, the effective spot size of the light beam corresponds to approximately 7T. That is why if a 2T mark and a 2T space are adjacent to each other, a left-hand-side portion of the light beam spot to scan the 2T mark overlaps with the 2T mark, 3T mark or 4T mark that is adjacent to the 2T space. As a result, the read signal is affected by not just the preceding space but also the previous mark, thus producing optical intersymbol interference. On the other hand, if the shortest mark and space lengths (2T) are 0.149 µm, the previous mark is always outside of the effective spot size of the light beam spot, no matter whether the previous mark is a 2T, a 3T or a 4T, and is never affected by the previous mark. For that reason, during the read operation, optical intersymbol interference is just produced depending on the lengths of the preceding and following spaces. The same phenomenon will also occur if a 2T mark being scanned is followed by a 2T space.

In view of these considerations, if the linear density of recording marks exceeds a particular value, which is determined by the relation between the spot size of the light beam and the shortest mark length, an expanded adaptive write pre-compensation is preferably performed based on not just the lengths of the spaces that precede and follow a mark in question but also the lengths of the previous and next marks, unlike the conventional adaptive write pre-compensation to get done on the edges of a write pulse on a mark and space length basis. Then, not only the thermal interference to be an issue when a high-density write operation is performed but also the optical intersymbol interference can be compensated for at the same time.

(Embodiment 1)

Hereinafter, a Specific Preferred Embodiment of an optical information storage medium according to the present invention will be described. FIG. 3 illustrates a planar structure of an information storage layer of the optical information storage medium of this preferred embodiment. The optical information storage medium includes an inner zone 1004, a data area 1001, and an outer zone 1005, which are arranged in this order from the inner edge of the disc toward its outer edge. The inner zone 1004 includes a PIC (permanent information and control data) area 1003 and an OPC and DMA (which will be referred to herein as "OPC/DMA") area 1002. The OPC area is an area on which a test write operation is performed to determine the best recording power and write pulse train condition for the optical information storage medium or each information storage layer before data is actually written on the data area 1001. The OPC area is sometimes also called a "learning area", a "test write area" or a "power calibration area". The OPC area is also used to perform a test write operation thereon to compensate for a variation in recording power or write pulse train when the characteristic of an individual optical disc apparatus varies or when the temperature changes steeply or when some environmental change such as deposition of dust or dirt occurs.

The PIC area 1003 is a read-only area and stores thereon disc management information, including control information that is required when a write operation is performed, by modulating the guide groove with high frequencies in the tracking direction. The disc management information includes OPC parameters to be used to determine the best recording power, the write strategy type representing the type of the write pulse train, recommended timing of generation and length of a laser pulse and other write pulse conditions and write strategy parameters, readout power, the information storage layer to which those pieces of information are applied, the write linear velocity, and medium type IDs such as the disc version number and the manufacturer's code. Although not shown in FIG. 3, an area called "BCA (burst cutting area)" is arranged inside the PIC area. In the BCA, data is written in a form similar to a barcode consisting of bar-shaped recording marks that are arranged concentrically. This data includes a medium's own identifying number and is used for the purpose of copyright protection.

The data area 1001 is an area of the optical disc on which user's specified data is written, and is also called a "user data area".

The outer zone does not include any read-only PIC area but does include a test write area and an OPC/DMA area containing management information for the data stored.

FIG. 4 is a perspective view schematically illustrating the structure of an optical information storage medium according to this preferred embodiment. In the following description, the layer numbers of information storage layers are supposed to begin with zero to make the layer numbers agree with their common names or abbreviations. The optical information storage medium of this preferred embodiment includes a substrate 804, a zeroth information storage layer 801, a first information storage layer 802, a second information storage layer 803, and a cover layer (protective coating) 807. The zeroth, first, and second information storage layers 801, 802 and 803 are often called "Layer 0", "Layer 1" and "Layer 2", respectively, and are sometimes identified simply by "L0", "L1" and "L2".

Among these L0, L1 and L2 layers, L0 is located closest to the substrate 804 and L2 is located closest to the cover layer 807. The laser beam for use to perform a read/write operation comes from under the cover layer 807.

The substrate 804 may have a thickness of approximately 1.1 mm, for example, and the cover layer 807 may have a thickness of at least 53 μm. The respective information storage layers are spaced apart from each other by transparent spacer layers 805 and 806. In this preferred embodiment, the cover layer 807 may have a thickness of 57 μm, the spacer layer 806 between the L2 and L1 layers may have a thickness of 18 μm, and the spacer layer 805 between the L1 and L0 layers may have a thickness of 25 μm, for example. The interval between each pair of adjacent information storage layers in which the spacer layer 805 or 806 is interposed is preferably determined so as to reduce the interference between the light rays that have been diffracted by the respective information storage layers (i.e., to minimize their interlayer interference). It should be noted that the thickness of the spacer layers mentioned above is just an example and does not always have to be adopted.

FIG. 5 illustrates a track layout for each information storage layer in the optical information storage medium of this preferred embodiment. FIG. 5 also illustrates almost exactly how the respective information storage layers need to be stacked one upon the other, i.e., schematically illustrates how the tracks are arranged on a cross section of the optical information storage medium. The zeroth information storage layer L0 includes the BCA area described above and stores the medium's own unique ID. The first and second information storage layers L1 and L2 also have an area corresponding to the BCA area but do not store the unique ID there. This is because even if BCA information such as the unique ID were additionally written on the first and second information storage layers L1 and L2, the write operation could not be performed with good reliability. Stated otherwise, by writing the BCA information on no information storage layer but the L0 layer, the degree of reliability of the BCA information on the L0 layer can be increased.

The next area is the PIC area. As described above, the PIC area is a non-rewritable read-only area in which disc management information was stored in advance by the disc manufacturer when this optical disc was made. That is to say, the BCA and PIC areas are read-only areas. In the PIC area, stored is disc management information called "DI (disc information)", which is a collection of various kinds of information including the version number, the layer number, the maximum writing speed, the disc type such as write-once or rewritable, the recommended recording power for each information storage layer, various parameters required for OPC, write pulse conditions, the write strategy and information for use to make copy protection.

If the light beam spot formed by an information writing or reading apparatus has varying shapes, then a different writing condition is imposed on each apparatus to form the best recording marks. The write-related control information that is stored in the management area is the DI representing typical results that were obtained when the medium was made. The information writing or reading apparatus retrieves that control information and uses it as an initial value for optimizing the write-related parameters.

In the optical information storage medium of this preferred embodiment, the read-only PIC area, on which disc management information and other kinds of information were stored in advance when the medium was made, is arranged on only the zeroth information storage layer L0. Then, the information writing or reading apparatus can retrieve the disc management information of every information storage layer L0, L1 and L2 at a time. As a result, the disc loading process can be done in a shorter time.

Next, arranged are an OPC area on which the information writing apparatus performs a test write operation to find the best recording power or write pulse condition and a disc management area (DMA).

As described above, the OPC area is a test write area on which a test write operation is performed to calibrate the varied recording power or write pulse condition if the temperature has varied to a certain degree or more during the disc loading process in which the information writing apparatus is loaded with the optical information storage medium or during some operation.

The DMA is an area in which disc management information or defect information is stored.

The data area is an area on which the user actually writes his or her desired data. The data area may be arranged in the radial range of 24.0 mm to 58.0 mm, for example. If there is any inaccessible portion (where no read or write operation can be performed due to the presence of a defect, for example) in the data area when this optical information storage medium is used in a PC, for instance, then a spare area is sometimes provided as a replacement for the inaccessible portion (which may be a sector or a cluster). The spare area arranged closer to the inner edge than the data area from/on which user data is read or written will be referred to herein as "ISA (inner spare area)", while the spare area arranged closer to the outer edge than the data area from/on which user data is read or written will be referred to herein as "OSA (outer spare area)". When a write operation should be performed in real time at high transfer rates (e.g., when video needs to be recorded or played), no spare areas could be provided in some cases.

The range outside of a radial location of 58.0 mm is called an "outer zone", which also includes an OPC area and a disc management area (DMA) that are similar to the counterparts of the inner zone. The outer zone also includes a buffer area so that the optical pickup can overrun while performing a seek operation.

FIG. 6 illustrates an exemplary physical format for the respective information storage layers of the optical information storage medium of this preferred embodiment. Just like FIG. 5, FIG. 6 also illustrates almost exactly how the structures of the respective information storage layers are stacked one upon the other. As shown in FIG. 6, each of the L0, L1 and L2 layers has two test write areas (which will be referred to herein as "OPCa area" and "OPCb area", respectively). The respective OPCa areas of the L0, L1 and L2 layers are arranged at mutually different radial locations, so are the respective OPCb areas thereof. Nevertheless, the OPCa areas of the L1 and L2 layers are arranged so as to partially overlap with the PIC area of the L0 layer. As used herein, to "overlap" means that multiple areas on two or more different information storage layers have the same radial location. Also, the respective OPCa areas of the L1 and L2 layers are arranged so as to overlap with each other almost entirely, and the same can be said about their OPCb areas. On the OPCa area of the L1 and L2 layers, a write operation is sometimes performed with excessive recording power. That is why to prevent the information stored in its adjacent areas from being destroyed by the heat generated by the excessive recording power, each OPCa area of the L1 and L2 layers is interposed between two rather large buffer areas, which overlap with the PIC area of the L0 layer.

When the PIC area of the L0 layer is scanned, the light beam may need to pass the respective OPCa areas of the L1 and L2 layers, and is scattered or diffracted in the meantime. As for portions of the PIC area that are arranged to overlap with the buffer areas, information stored in those portions of the PIC area can be retrieved without debasing the quality of the read signal so much. In the PIC area, the disc management data of the respective information storage layers is stored on a block-by-block basis. That is to say, the same unit block is written a number of times within the PIC area. That is why even if the disc management data cannot be retrieved from every portion of the PIC area, the disc management data just needs to be retrieved safely from at least those portions of the PIC area that overlap with the buffer areas of the L1 and L2 layers. In this manner, by arranging the PIC area that overlaps with the respective OPC areas of the L1 and L2 layers and by surrounding the OPC area of the L1 and L2 layers with sufficiently large buffer areas, the space of the lead-in zone can be used efficiently enough to provide sufficiently broad OPC areas.

Also, the PIC area has a track pitch of 0.35 µm, which is broader than that (0.32 µm) of the data area. That is why even if a test write operation were performed with excessive recording power on the respective OPCa areas of the L1 and L2 layers, which are arranged closer to the light source than the PIC area is, the disc management information could still be retrieved from the PIC area with more reliability than the retrieval of information that has been added or is alterable. For that reason, although the PIC area of the L0 layer and the respective OPCa areas of the L1 and L2 layers are arranged so as to overlap with each other, the disc management information stored in the PIC area can still be retrieved without sacrificing reliability significantly. On top of that, if the PIC area and the OPCa areas are arranged so as to overlap with each other, the space left in the lead in zone can be used more efficiently. That is to say, a sufficiently wide space can be left for the OPC areas.

Hereinafter, the disc information (DI) that is stored as control information in the PIC area will be described in detail. Each of the clusters that form the control information in the optical information storage medium of this preferred embodiment is a minimum write unit. A set of 544 clusters forms one fragment, which is a higher order write unit. And a set of seven fragments forms the PIC area. The DI is stored in the top cluster of the first fragment IFO. The DI is split into multiple DI units according to the writing speed applied (which may be 2×, 4× and so on) and for the respective information storage layers, and those DI units are stored separately from each other. The same set of DI units is repeatedly stored in the top cluster of each of the other fragments, thus coping with potential loss of the disc information.

Each single DI unit includes information indicating to which information storage layer (which may be L0, L1 or L2 layer, for example) and which writing speed (such as 2× or 4×) the control information of that DI unit applies. Each DI unit also includes information indicating which write strategy type information (which may be N−1 type, N/2 type, Castle A type, Castle B type, L type or Mono type, for example) and which write pre-compensation type information (such as preceding space pre-compensation, following space pre-compensation, previous mark pre-compensation or next mark pre-compensation) apply to that information storage layer and that writing speed. And those pieces of information are stored in predetermined bytes. That is why the PIC area needs to include at least as many DI units as the number of multiple different combinations of the information storage layers and the writing speeds that can be used for writing. That is to say, in the PIC area that is a management area, stored is a DI unit including control information about at least one possible combination of at least one write strategy and at least one information storage layer.

The control information stored in these DI units is retrieved by an information writing apparatus and used when the information writing apparatus writes information on an optical information storage medium. According to this preferred embodiment, if the optical information storage medium includes multiple information storage layers, each single DI unit includes, as various kinds of control information, (1) information about the layer number of an information storage layer to which the information of that DI unit applies, (2) information about the type of the given disc (which may be a write-once disc or as rewritable disc, for example), (3) information about the writing speed that the information storage layer can support, (4) a format number, which provides information about at least (a) the write strategy type and (b) write pre-compensation type on a writing speed basis, and (5) write strategy parameters.

Hereinafter, a method for writing control information on the optical information storage medium of this preferred embodiment and the makeup of the DI units that store the control information will be described in detail with reference to the accompanying drawings.

Portion (a) of FIG. 7 shows an exemplary makeup for one DI unit to be stored in a predetermined area on the optical information storage medium of this preferred embodiment. A format number, which provides information about at least the writing speed, the write strategy type and the write pre-compensation type as defined by the format, is stored in a predetermined number of bytes within this DI unit. As shown in portion (a) of FIG. 7, Byte A at the top of this DI unit includes a DI unit identifier in two bytes so as to indicate that this is the very first byte of the DI unit. Byte B of the DI unit includes information indicating the write strategy type and the write pre-compensation type in one byte. Byte B may also include information about the minimum step of the write pre-compensation. If the write strategy type, the write pre-compensation type, and the minimum step of the write pre-compensation are determined, then the total number of bytes of the write strategy parameters and the format of the DI unit to be described later are determined. That is why this byte is called a "DI format number". A more detailed makeup of this DI format number B will be described later.

Byte C of the DI unit includes Layer information indicating to which information storage layer the control information stored in this DI unit is applied. Specifically, if this control information is applied to the L0 layer, Byte C says "00h". If this control information is applied to the L1 layer, Byte C says "01h". And if this control information is applied to the L2 layer, Byte C says "02h".

Byte D of the DI unit includes a DI unit sequence number in one byte. That is to say, a one-byte sequence number, which indicates the position of the current DI unit as counted from the top, is stored. Those sequence numbers are assigned sequentially to the respective DI units. For example, the sequence number "00h" indicates that this is the first DI unit, and the sequence number "01h" indicates that this is the second DI unit.

Byte L of the DI unit includes a continuity flag in one byte. This one byte of information consists of a bit indicating that the write strategy parameter information (to be described later) cannot be stored entirely in a single DI unit and that the rest of the write strategy parameter information that has not been stored in the former DI unit is stored continuously in the next DI unit and bits indicating the position of the current one of the DI units separately stored. For example, among the eight bits (b7, b6, ... and b0) that form one byte of information, b7 (=1, for example) may be used as a bit indicating that the rest of the write strategy parameter set is stored in the next DI unit, and b6 through b0 may be used as sequential information bits indicating the position of the current one of multiple DI units stored separately. Even if the write strategy parameter set cannot be stored in a single DI unit, the rest of the information can also be stored in the next DI unit by using this flag. That is to say, one write strategy parameter set is completed by two more DI units. As a result, there is no need to increase or decrease the size of DI units according to the number of write strategy parameters. That is to say, the size of the DI units can be kept constant.

Byte M of the DI unit includes a piece of priority order information of one byte, indicating which type of write pre-compensation should be given a top priority while the optical disc apparatus is making a write pre-compensation to learn write strategy parameters by performing a test write operation. More specifically, among various types of write pre-compensations including a preceding space pre-compensation, a following space pre-compensation, a previous mark pre-compensation and a next mark pre-compensation, a flag that indicates not only if any of these types of write pre-compensation needs to be performed at all but also the order of priority in which the optical disc apparatus needs to make those write pre-compensations for leaning purposes is determined and stored in this Byte M. For example, if the flag prompts the optical disc apparatus to make write pre-compensations in the priority order of preceding space pre-compensation, following space pre-compensation, previous mark pre-compensation and next mark pre-compensation, "01h", "02h", "03h" and "04h" may be allocated to respective bytes of preceding space pre-compensation, following space pre-compensation, previous mark pre-compensation and next mark pre-compensation. Optionally, these flags may be limited to individual mark lengths. For instance, if the flag specifies that the write pre-compensations on a 2T mark be performed in the priority order described above, "21h", "22h", "23h" and "24h" may be allocated to preceding space pre-compensation, following space pre-compensation, previous mark pre-compensation and next mark pre-compensation, respectively. In that case, the mark length is specified with the upper four bits and the priority order of the write pre-compensations is specified with the lower four bits. Also, if Byte M says "00h", then the optical disc apparatus may decide that the write pre-compensation type is "disabled" or that the priority order is not determined. With such a byte indicating the priority order of write pre-compensations to be made allocated to the DI unit, even if the information writing apparatus has carried out write pre-compensation learning of the type that is given the top priority only to find the resultant recording performance dissatisfactory, then the write pre-compensation learning of the type that is given the second highest priority may be carried out. That is to say, the write pre-compensation learning can be performed following the order of priority. As a result, the write pre-compensation learning can be done more accurately. On top of that, the information writing apparatus does not have to carry out every type of write pre-compensation learning but may perform only a required type of write pre-compensation selectively. Consequently, the write pre-compensation learning can be done much more efficiently.

Byte E of the DI unit includes information about the type of the given optical disc in three bytes. For example, if the given optical disc is a rewritable one, Byte E says "00 00 00h". On the other hand, if the given optical disc is a write-once one, then Byte E says "00 00 01h". Byte F of the DI unit includes version number information indicating what version of the format the given optical disc is compliant with.

Byte G of the DI unit includes writing speed information indicating to what writing speed the control information stored in this DI unit is applied. Byte G may be defined in the following manner. Specifically, if Byte G says "02h", it means that this DI unit specifies a 2× writing condition. On the other hand, if Byte G says "04h", it means that this DI unit specifies a 4× writing condition. Optionally, instead of the ratio of the writing speed to the standard writing speed of 1×, either the linear velocity or the rotational frequency of the optical disc itself may be stored. For example, if the control information stored in this DI unit is applied to a writing linear velocity of 4 m/sec, Byte G may say "04h". But if the control information stored in this DI unit is applied to a writing linear velocity of 8 m/sec, Byte G may say "08h", for instance.

Byte H of this DI unit includes information about the maximum readout power on the condition on which this DI unit is applied.

Byte I of this DI unit includes information about the recording power on the condition on which this DI unit is applied. The recording power may be stored as respective power levels representing peak power, space power (or erase power), bottom power and cooling power according to the degree of modulation of the laser power or as respective ratios of other lower powers to the peak power. The number of different levels or the specific types of the laser powers modulated vary according to the write strategy type. That is to say, a different set of recording power parameters is provided for one write strategy type to another.

Byte J of the DI unit includes write strategy parameters that have been determined in advance based on the DI format number stored as Byte B. In portion (a) of FIG. 7, the number of bytes included in this Byte J is supposed to be "XX". Actually, however, the total number of bytes has already been determined by the DI format number.

As described above, the DI format number is defined as a combination of the write strategy type, the write pre-compensation type, and the information about the minimum step of the write pre-compensation.

As will be described in detail later, this Byte J includes information about the variable edge positions (dTF1, dTF2, dTE1, and dTE2) of a write pulse train or information about the variable pulse widths (TF2, TE3 and TMP) of the write pulse train on a recording mark basis for the respective write strategy types. These pieces of information will be referred to herein as "write strategy parameters". It is determined in advance by a format table, for example, on a write strategy basis to which portions of a write pulse train these write strategy parameters are applied.

The number of write strategy parameters to be stored is determined by possible combinations of the write strategy types and the write pre-compensation types. For example, as parameters about the position of the first leading edge dTF1 of the write pulse train, one byte is allocated to each of four different mark lengths of 2T, 3T, 4T and 5T or more. Also, if the preceding space pre-compensation is valid, parameters can be changed with preceding space lengths of 2T, 3T, 4T and 5T or more combined with each of those different recording mark lengths. That is why a total of 16 (=4×4) different write pre-compensation values can be allocated to the leading edge dTF1. And those 16 write pre-compensation values are stored as parameters about the position of the leading edge dTF1 in one byte. In the same way, the other parameters (such as TF2 and dTE1) are also classified according to the write pre-compensation type and the write pre-compensation values thus obtained are stored in one byte. FIG. 8 shows the write strategy parameters of the N−1 type write strategy as an example. As shown in FIG. 8, as for dTF1 and TF2 of a write pulse train to record a 2T mark, the write pre-compensation is supposed to be carried out by combining preceding and following space lengths of 2T, 3T, 4T and 5T or more with previous and next mark lengths of 2T and 3T or more. On the other hand, the write pre-compensation on the mark lengths of 3T, 4T and 5T or more is supposed to be carried out in combination with the preceding space lengths of 2T, 3T, 4T and 5T or more. In FIG. 8, 37, 37, 12, and 22 different parameters are stored in one byte apiece as dTF1, TF2, TE2 and dTE1, respectively, only one parameter is stored in one byte as TMP, and a grand total of 109 different parameters are stored, thereby forming write strategy parameters.

The unit of storage of the write strategy parameters may be absolute time such as 0.5 nsec, or could be the ratio to a reference clock (Tw) or as an integral multiple of the minimum step information of write pre-compensation. For example, if the minimum step of write pre-compensation is defined to be one sixteenth of a reference time (Tw), an integral multiple of Tw/16 is stored as a write strategy parameter value. Or if the minimum step of write pre-compensation is defined to be one thirty-second of a reference time (Tw), an integral multiple of Tw/32 is stored as a write strategy parameter value.

Byte K of the DI unit includes information about the manufacturer's code, medium type ID, manufacturing company's name, product serial number and date and place of manufacture of this optical information storage medium.

The arrangement of respective bytes of this DI unit is only an example and does not have to be the one shown in FIG. 7. Nevertheless, the write strategy parameters stored as Byte J are determined by the DI format number stored as Byte B. That is why the write strategy parameters are preferably arranged so as to be retrieved after the DI format number.

Furthermore, those DI units are arranged preferentially in the order of writing speeds, in the order of information storage layers next, and then sorted in the order of recommended write strategy or write pre-compensation position type. However, this is just an example. Alternatively, those DI units could be arranged preferentially in the order of information storage layers and then in the order of writing speeds.

Hereinafter, the DI format number stored in Byte B of the DI unit will be described in detail with reference to portion (b) of FIG. 7, which shows the makeup of the DI format number (i.e., Byte B). Specifically, portion (b) of FIG. 7 shows various pieces of information to be stored in one byte of Byte B on a bit-by-bit basis, i.e., in eight bits of (b7, . . . , b0) when arranged from their MSB.

As shown in portion (b) of FIG. 7, the setting of write strategy type (i.e., write strategy type information) is allocated to the least significant three bits. According to this preferred embodiment, N−1, N/2, Castle 1 (CA1) and Castle (CA2) write strategy types that are defined by the format table are supposed to be available. In this case, if the least significant three bits (b2, b1, b0) are "000b", those bits represent the N−1 write strategy type, "001b" represents the N/2 write strategy type, "010b" represents the Castle 1 (CA1) write strategy type, and "011b" represents the Castle 2 (CA2) write strategy type. As used herein, the CA1 type may be defined to be a strategy type, of which the write pulse has an L-shape, while the CA2 type may be defined to be a castle strategy type with two pulses that have been modulated with the peak power. Alternatively, the CA1 type may also be defined to be a strategy type in which a write pulse to record a 3T mark has an L-shape among various write strategy parameters, while the CA2 type may also be defined to be a strategy type in which a write pulse to record a 3T mark is a mono-pulse. That is to say, as far as a castle type write strategy is concerned, the write strategy types may be further classified depending on whether a 3T mark needs to have an L-shape waveform or a mono-pulse (M) waveform. And those two strategy types could be distinguished from each other by the bit b3 described above.

Write pre-compensation type information is allocated to the next four bits (b6, b5, b4, b3). As used herein, the "write pre-compensation type information" is a piece of information that indicates what range of marks and spaces needs to be used in combination to make a write pre-compensation on a mark with a certain length to be recorded on an information storage layer (e.g., adjacent space(s), adjacent mark(s) and their combinations). That is to say, the "write pre-compensation type information" may indicate that the shifts of the pulse edge position of a write pulse train that has been modulated into pulses to form the mark need to be classified according to (1) the combination of the length of the mark in question and its preceding space length (i.e., preceding space pre-compensation), (2) the combination of the length of the mark in question and its following space length (i.e., following space pre-compensation), (3) the combination of the length of the mark in question and its previous mark length (i.e., previous mark pre-compensation), or (4) the combination of the length of the mark in question and its next mark length (i.e., next mark pre-compensation).

In other words, the write pre-compensation type information may indicate the first type in which performed selectively is either a preceding space pre-compensation, which is a write pre-compensation to get done based on a combination of the mark length of a recording mark in question and the space length of the space that precedes the recording mark, or a following space pre-compensation, which is a write pre-compensation to get done based on the mark length of the recording mark in question and the space length of the space that follows the recording mark. The write pre-compensation type information may also indicate the second type in which both the preceding space pre-compensation and the following space pre-compensation are performed.

In a situation where information is written on a high-density, multilayer information storage medium such as the optical information storage medium of this preferred embodiment, the quality of the information written or that of a read signal obtained by reading the information written is significantly affected by the medium property of its information storage layers. That is why to get a write operation done properly on such an optical information storage medium, a recording mark needs to be formed so as to have its edges located at accurate positions by using not just write strategy types but also various kinds of write pre-compensation methods. Specifically, by performing the write pre-compensation with all or two or three of the four write pre-compensation types combined with each other according to the writing speed or the property of the information storage layer, the frontend or rear end of the recording mark can be located at a proper position more accurately. As a result, the quality of the read signal can be improved.

To the last one bit b7, allocated is information about the minimum step of write pre-compensation (which will be referred to herein as "write pre-compensation step information") representing the minimum unit to shift a pulse edge when a write pre-compensation is performed. More specifically, if b7 is "0b", it means that the minimum step of shift in the edge position dTF1 of the write strategy parameter is defined to be one-sixteenth of the reference time Tw (i.e., Tw/16). In that case, an integral multiple of the minimum step Tw/16 is stored as the magnitude of pulse shift of the write strategy parameter. Also, if the information storage layer has such a property that requires the write pre-compensation to be done more accurately, then the minimum step of the write pre-compensation is further reduced. Specifically, if b7 is "1b", then the minimum step of shift is defined to be one-thirty-second of the reference time Tw (i.e., Tw/32). In that case, an integral multiple of the minimum step Tw/32 is stored as the magnitude of pulse shift of the write strategy parameter.

FIG. 9 shows the makeup of DI format numbers represented by Byte B of the DI unit. Each DI format number of eight bits is determined by a combination of write strategy type information, write pre-compensation type information and write pre-compensation step information. And the sizes (in bytes) of the write strategy parameters to be described later and their contents are defined by the DI format number. For that reason, as described above, the DI format number is preferably written ahead of the locations where the write strategy parameters are stored in the direction in which the write operation is performed.

It should be noted that the "write strategy parameters" (or "write pulse conditions") are pieces of information that describe the items that form the write strategy and their particular numerical values. That is why the "write strategy information" is a generic concept including not just the write strategy parameters but also the write strategy types and the write pre-compensation types mentioned above.

In the DI format number described above, the least significant three bits (b0, b1 and b2) of its eight bits represent the write strategy information and the four bits (b3 to b6) that follow the three represent the write pre-compensation type information. If there are only a few combinations of write strategy types and write pre-compensation types, however, those least significant three bits (b0, b1 and b2) of the DI format number may provide information about both the write strategy type and the write pre-compensation type.

FIG. 10(a) shows the makeup of such DI format numbers. DI format numbers 0, 1, 2 and 3 with mutually different write strategies are defined so as to provide information about the write strategy types N–1, N/2, CA1 and CA2 and information about the write pre-compensation type (which will be referred to herein as a "first write pre-compensation type") as identified by the reference numerals 501, 502, 503 and 504, respectively, in FIG. 9. That is to say, for the DI format numbers 0, 1, 2 and 3, the N–1, N/2, CA1 and CA2 write strategy types are respectively used and only the preceding space is used to make write pre-compensation (i.e., a preceding space pre-compensation is made). Alternatively, only the following space may be used to make a write pre-compensation (i.e., a following space pre-compensation may be made).

The DI format numbers 4, 5, 6 and 7, on the other hand, also use the N–1, N/2, CA1 and CA2 write strategies, respectively, but are defined so as to use an expanded write pre-compensation type, which is different from that of the DI format numbers 0 to 3 (and which will be referred to herein as a "second write pre-compensation type"). In FIG. 10, "EX" is added as a suffix to those write strategy types to indicate that their write pre-compensation type is different from the first write pre-compensation type.

Specifically, DI format numbers 4, 5, 6 and 7 are defined so as to represent the combination of write pre-compensation types as identified by the reference numerals 505, 506, 507 and 508 in FIG. 9. That is to say, those DI format numbers are defined so as to make a write pre-compensation based on the length of the mark in question and the respective lengths of its preceding and following spaces (i.e., preceding space pre-compensation and following space pre-compensation in combination).

Alternatively, the DI format numbers 4, 5, 6 and 7 may also be defined to make a write pre-compensation based on the length of the mark in question and the respective lengths of its preceding and following spaces and the previous mark as in the combination of write pre-compensation types identified by the reference numerals 509, 510, 511 and 512 shown in FIG. 9. Still alternatively, the DI format numbers 4, 5, 6 and 7 may also be defined to make a write pre-compensation based on the length of the mark in question and the respective lengths of its preceding and following spaces and the previous and next marks as in the combination of write pre-compensation types identified by the reference numerals 513, 514, 515 and 516 shown in FIG. 9.

If the least significant three bits (b0, b1 and b2) of the eight bits of each DI format number are used as described above, then the write strategy type can be identified by the second and third least significant bits (b0 and b1) and the write pre-compensation type can be identified by the least significant bit (b3).

In that case, in bit allocations for DI format numbers shown in FIG. 9, the bits b3 to b6 that provide the write pre-compensation type information may either be all zero or have appropriate information according to the write pre-compensation type.

FIG. 10(b) shows still another makeup for DI format numbers. In this case, the write strategy types and the write pre-compensation types are arranged in a different order from the DI format numbers shown in FIG. 10(a). Specifically, the DI format numbers 0 through 7 are associated with N−1, N−1 EX, N/2, N/2 EX, CA1, CA1 EX, CA2 and CA2 EX. By adopting such an arrangement, the write pre-compensation type can be identified by the least significant bit (b0) and the write strategy type can be identified by the second and third least significant bits (b2 and b3).

As described above, according to the DI format number makeup shown in FIGS. 10(a) and 10(b), each DI format number is represented by multiple bits, one of which represents the write pre-compensation type. Specifically, each of the b2 and b0 bits of the DI format number makeup shown in FIGS. 10(a) and 10(b) indicates whether the write pre-compensation type is the first type or the second type. That is to say, each of these bits indicates whether the write pre-compensation is the first type, in which either the preceding space pre-compensation (that uses the mark length of the recording mark in question and the space length of the space that precedes that recording mark in combination) or the following space pre-compensation (that uses the mark length of the recording mark in question and the space length of the space that follows that recording mark in combination) is carried out selectively, or the second type in which both of the preceding and following space pre-compensations are carried out.

It should be noted that Byte B of the DI format number according to this preferred embodiment does not have to have the makeup described above but could also be numbered in any other way according to the combination of the write pre-compensation type and the write strategy type.

Also, according to the preferred embodiment described above, the write strategy type information of each DI unit is determined by a predefined format table, and the number of laser power modulation levels and the movable edge positions and pulse widths of a write pulse train are also determined in advance. That is why the parameters of a different write strategy type should have different movable edge positions and different pulse widths of the write pulse train. That is to say, each write strategy type has its own set of write strategy parameters. Also, in not only a situation where the write pulse train is different in the time axis direction but also a situation where the write pulse train has a different number of modulation power levels when the laser power is modulated into pulses, the write strategy type may also be regarded as a different one. For example, if a peak power level for recording a 2T mark is set to be different from the peak power level for recording a 3T or longer mark, a write strategy associated with the former peak power level may be defined to be a different type from write strategies that use the same peak power level to record a 3T or longer mark.

Furthermore, the N−1 write strategy type adopted in the preferred embodiment described above is supposed to be a write strategy type in which a pulse with the peak power has been modulated into a write pulse train consisting of N−1 pulses with respect to the mark length N of a recording mark. However, not every write pulse train that consists of such a number of pulses has to belong to the same write strategy parameter. Alternatively, those pulse trains may also be defined to be mutually different write pulse types as in the example described above.

Furthermore, in the preferred embodiment described above, the write pre-compensation type is specified as a part of the DI format number by a different bit from the write strategy type in Byte B of the DI format number. Optionally, however, a byte dedicated to representing a write pre-compensation type may be provided for the DI unit. Also, if the information writing apparatus has found, as a result of the write pre-compensation learning, the best write pre-compensation type different from the write pre-compensation type that is stored in the DI unit, then information for updating the write pre-compensation type of Byte B of the DI unit may be stored in a predetermined management area in the inner zone of the optical information storage medium. Then, the optical disc apparatus may perform a test write operation a smaller number of times to set the best writing conditions next time or can get its learning done in a shorter time.

Also, in the preferred embodiment described above, the write strategy types of Byte B are supposed to be classified into N−1, N/2, Castle 1 and Castle 2 types. However, this is only an example and the write strategy type information could also be defined by any other classification. For example, the two castle types may be combined into one.

Still alternatively, the castle types may also be classified into the three types of a Castle type (CA) with two peak power modulated pulses, an L type (L) in which a peak power modulated pulse is followed by a middle power modulated pulse, and a mono-pulse type (M) with no middle power level. Optionally, the write strategy types could also be classified depending on whether the write pulse train of a mark with a particular length (e.g., a 3T mark) is an L type or an M type.

Furthermore, in the preferred embodiment described above, the write pre-compensation type represented by Byte B is supposed to be a piece of information indicating whether each write pre-compensation type is applicable or not. Alternatively, the write pre-compensation type could also be stored as a piece of information indicating whether or not the recording mark length unit or its write pre-compensation type is applicable. Still alternatively, information indicating whether or not there is any write pre-compensation type available may also be stored on a write strategy parameter (such as dTF1, dTE1 or TE2) basis.

Also, if the information writing apparatus finds, as a result of write pre-compensation learning, these pieces of information different from the write strategy parameters that are stored in the DI unit, then the write strategy parameters that have turned out to be the best may be compared to the write strategy parameters included in the DI unit. And updated information indicating whether or not the write pre-compensation type is applicable could be stored in a predetermined area in the inner zone of the optical information storage medium. Or a kind of control information, such as the information indicating whether or not the write pre-compensation type is applicable, could also be stored in the memory of the information writing apparatus. In that case, the test write operation no longer needs to be carried out or just needs to be performed a smaller number of times, to say the least, until the best writing conditions are set next time. As a result, the writing conditions can be optimized in an even shorter time.

Also, if a continuity flag is stored in Byte L of the DI unit of this preferred embodiment and if write strategy parameters are stored separately in respective Bytes J of two or more DI units, then fundamental information (or reference information) of the write strategy parameters could be stored in a first one of the DI units and differential information could be stored in the next one of the DI units. For example, the first DI unit may define the magnitude of edge shift of dTF1 of a 3T mark as an integral multiple of Tw/16 in one byte and the second DI unit may store differential information about the magnitudes of edge shift in respective situations where the 3T mark is preceded by a 2T space, a 3T space, a 4T space or a 5T or longer space. By storing such differential information about space pre-compensation in this manner, the total number of bytes of the write strategy parameters to be stored in the DI unit can be reduced.

Optionally, if write strategy parameters are stored separately in respective Bytes J of two or more DI units, those write strategy parameters could be stored on a write pre-compensation type basis in those DI units. For example, information provided by write strategy parameters about the preceding mark pre-compensation could be stored in the first DI unit and information provided by write strategy parameters about the following mark pre-compensation could be stored in the second DI unit. Alternatively, information about the leading edges of write pulse trains (such as dTF1 and TF2) could be stored in the first DI unit and information about the trailing edges of the write pulse trains (such as dTE1 and dTE2) could be stored in the second DI unit. Still alternatively, information about the pulse widths (such as TF2 and TE3 to be described later) could be stored in the first DI unit and information about the edge positions of the write pulse trains (such as dTF1 and dTE1 to be described later) could be stored in the second DI unit. Still alternatively, with compatibility with conventional optical information storage media taken into account, information about the write strategy parameters of a similar DI format of retailed optical information storage media could be stored in the first DI unit and newly expanded write strategy parameters could be stored separately in the second DI unit.

Furthermore, in the preferred embodiment described above, Byte M representing a write pre-compensation priority order flag is stored in advance in the DI unit. However, the write pre-compensation priority order flag does not always have to be stored in advance in the DI unit. For example, if the information writing apparatus has done write pre-compensation learning using the write strategy parameters that are stored in the DI unit as initial values only to find the best write strategy parameters obtained by that learning different from the ones stored in the DI unit, then control information representing the priority order that indicates which write pre-compensation type is the best to do that learning may be written on either a predetermined write-once area or rewritable area by the learning algorithm of the information writing apparatus. In that case, the test write operation no longer needs to be carried out or just needs to be performed a smaller number of times, to say the least, until the best writing conditions are set next time. As a result, the writing conditions can be optimized in an even shorter time.

Hereinafter, the write strategy types and the write strategy parameters will be described. First of all, the write pulse train of the N−1 write strategy type will be described with reference to the accompanying drawings.

Portions (a) through (f) of FIG. 11 schematically show the relation between the mark length and the waveform of a write pulse signal to be described later. Specifically, portion (a) of FIG. 11 shows a reference clock signal 1201, which sets a reference time for a write operation and of which one period is identified by Tw. Portion (b) of FIG. 11 shows a count signal 1204, which is generated by a counter to be described later and which counts the amount of time that has passed from the beginning of a given mark on the basis of the reference time Tw of the reference clock signal 1201. The time when the count signal goes zero corresponds to the beginning of a mark or a space. Portions (c) through (f) of FIG. 11 show write pulse signals to be applied to form respective recording marks. The levels of the write pulse signals have been modulated between the peak power Pw that is the highest level, the space power Ps that is a space portion irradiation level, the bottom power Pb between two peak power levels, and the cooling power Pc that is a power level in a cooling period after the last pulse.

In this example, the levels of the write pulse signals are supposed to be modulated between the four power levels. However, the levels of the write pulse signals may also be modulated between a total of three levels by setting the cooling pulse power level Pc and the bottom power level Pb equal to each other. Still alternatively, the levels of the write pulse signals may even be modulated between only two levels by setting the cooling power level equal to the space power level. Also, the bottom power level is supposed to be lower than the space power level in FIG. 11 but may also be a power level between the space power level and the peak power level. In a write-once optical information storage medium, the power level to irradiate a space portion is called "space power". In a rewritable optical information storage medium, on the other hand, a recording mark that has been written in advance is erased with the space portion power, and therefore, the space power is sometimes called an "erase power Pe".

Furthermore, in portions (c) through (f) of FIG. 11, the write pulse signal representing a 4Tm mark has only one middle pulse TMP. However, every time the mark length (code length) increases by 1Tm (e.g., to 5Tm, 6Tm and so on), the number of middle pulses also increases one by one. That is to say, a mark to be recorded with a length N consists of pulses with (N−1) peak power levels. That is why the write pulse trains shown in portions (c) through (f) of FIG. 11 are typical examples of the N−1 write strategy type.

Portion (c) of FIG. 11 illustrates a 2T write pulse train, which means that in writing a 2T mark, a pulse with a width of TF2 is applied and the edge position of the first pulse as counted from the leading edge of the write pulse train is shifted by dTF1 (which represents the magnitude of edge shift) with respect to a predetermined reference position. This pulse train also means that the trailing edge of the cooling pulse is shifted by dTE1 (which represents the magnitude of edge shift) with respect to the predetermined reference position. Portion (d) of FIG. 11 illustrates a 3T write pulse train, which means that in writing a 3T mark, the last pulse is added to the 2T mark and the pulse width of the last pulse is changed by TE2. Portion (e) of FIG. 11 illustrates a 4T write pulse train, which means that in writing a 4T mark, a middle pulse is inserted between the first and last pulses of the 3T mark and the pulse width of the middle pulse is changed by TMP.

Portion (f) of FIG. 11 illustrates a 5T write pulse train, which means that in writing a 5T mark, another middle pulse is added to the 4T mark and the pulse width of the middle pulse is changed by TMP. In this case, the two middle pulses have the same pulse width. Although not shown in FIG. 11, a 6T or longer write pulse train can also be defined in a similar manner.

In FIG. 11, the magnitudes of edge shift and the pulse widths of write pulses that are applied in recording 2T, 3T, 4T and 5T or longer marks are represented by the write strategy parameters with the same reference signs (such as dTF1, TF2 and dTE1) for convenience sake. Actually, however, in recording 2T, 3T, 4T and 5T or longer marks, mutually different magnitudes of edge shift (dTF1, TF2, dTE1 and so on) can be set for the write pulses. Also, a number of parameters can be set based on not just the length of a mark to be recorded but also the respective lengths of the preceding and following spaces, those of the previous and next marks, and their combination. By irradiating the optical information storage medium with a laser beam representing a write pulse train that has been defined as described above, a mark can be formed on its information storage layer.

As used herein, the "write strategy parameters" refer to dTF1, TF2, dTE1, TE2, TMP and so on of the marks with the respective lengths shown in portions (c) through (f) of FIG. 11 and those parameters are defined by a combination of the length of a mark to record and the lengths of its preceding and/or following spaces and/or those of the previous and/or next marks. Those write strategy parameters are stored in Byte J of the DI unit shown in portion (a) of FIG. 7.

FIG. 12 shows possible combinations of write strategy parameter values with the respective write pre-compensation types. In FIG. 12, the open circle C) indicates that that write pre-compensation type is available for a write strategy parameter in question. On the other hand, "NA" indicates that that write pre-compensation type is not available for the write strategy parameter in question. If a write pre-compensation type, which is regarded to be effective according to the write pre-compensation type information stored in the DI unit, has been selected, a write strategy parameter to which the write pre-compensation indicated by the open circle has been applied is prepared in the DI unit.

Hereinafter, examples of more specific write strategy parameters will be described. FIG. 8 shows a list of N−1 type write strategy parameters classified. In recording a 2T mark, each of dTF1 and TF2 has four possible parameters that are associated with 2T, 3T, 4T and 5T or longer preceding or following space lengths. And if the preceding or following space length is 2T, then those parameters are further classified depending on whether the previous or next mark length is 2T or 3T or more. In this manner, those parameters are classified into a total of 25 different types (#1 through #25), each of which is defined to be a piece of information of one byte. On the other hand, in recording a 3T, 4T or 5T or longer mark, those parameters are classified into a total of different types (#26 through #37) according to the preceding space length, which may be 2T, 3T, 4T or 5T or more. And each of those 12 different types is defined to be a piece of information of one byte.

Likewise, in recording a 2T mark, dTE1 has four possible parameters that are associated with 2T, 3T, 4T and 5T or longer following space lengths. And if the following space length is 2T, then those parameters are further classified depending on whether the next mark length is 2T or 3T or more. In this manner, those parameters are classified into a total of 10 different types (#1 through #10), each of which is defined to be a piece of information of one byte. On the other hand, in recording a 3T, 4T or 5T or longer mark, those parameters are classified into a total of 12 different types (#11 through #22) according to the following space length, which may be 2T, 3T, 4T or 5T or more. And each of those 12 different types is defined to be a piece of information of one byte. In the same way, as for TE2, in recording a 3T, 4T or 5T or longer mark, those parameters are classified into a total of 12 different types (#1 through #12) according to the following space length, which may be 2T, 3T, 4T or 5T or more. And each of those 12 different types is defined to be a piece of information of one byte. That is to say, these write strategy parameters shown in FIG. 8 are stored in Byte J of the DI unit shown in portion (a) of FIG. 7.

It should be noted that if the write pre-compensation type information tells that little interference will be caused by the previous or next mark or that the write pre-compensation needs to be done using any combination including the preceding or following space, the classification can be simplified by deleting unnecessary ones of those parameters. Then the number of bytes of the write strategy parameters of the DI unit can be reduced.

In the example illustrated in FIG. 8, the preceding and following space lengths are classified into 16 (=4×4) different types by sorting those lengths into 2T, 3T, 4T or 5T or more. However, the preceding and following space lengths may also be classified into 8 (=4×2) different types by sorting those lengths into 2T and 3T or more.

Next, examples of castle type write pulses will be described with reference to the accompanying drawings. Portions (a) through (g) of FIG. 13 schematically show the relation between the mark length and the waveform of a write pulse signal. Specifically, portion (a) of FIG. 13 shows a reference clock signal 1201, which sets a reference time for a write operation and of which one period is identified by Tw. Portion (b) of FIG. 13 shows a count signal 1204, which is generated by the counter and which counts the amount of time that has passed from the beginning of a given mark on the basis of the reference time Tw of the reference clock signal 1201. The time when the count signal goes zero corresponds to the beginning of a mark or a space. Portions (c) through (g) of FIG. 13 show write pulse signals to be applied to form respective recording marks. The levels of the write pulse signals have been modulated between the peak power Pw that is the highest level, the middle power Pm representing an intermediate power level, the space power Ps that is a space portion irradiation level, and the cooling power Pc that is the lowest power level.

In this example, the middle power level Pm is supposed to be higher than the space power level Ps but may also be lower than the space power level. In a write-once optical information storage medium, the power level to irradiate a space portion is called "space power". In a rewritable optical information storage medium, on the other hand, a recording mark that has been written in advance is erased with the space portion power, and therefore, the space power is sometimes called an "erase power Pe". The write pulse trains shown in portions (c) to (g) of FIG. 13 are typical examples of castle write strategy types.

Portion (c) of FIG. 13 illustrates a 2T mark write pulse train, which means that in writing a 2T mark, a pulse with a width of TF2 is applied and the edge position of the first pulse as counted from the leading edge of the write pulse train is shifted by dTF1 (which represents the magnitude of edge shift) with respect to a predetermined reference position. This pulse train also means that the trailing edge of the cooling pulse is shifted by dTE1 (which represents the magnitude of edge shift) with respect to the predetermined reference position.

Portion (d) of FIG. 13 illustrates a 3T mark write pulse train. In writing a 3T mark, a laser beam representing an L-shaped write pulse train is radiated. In that case, a pulse with a width of TF2 is applied and the edge position of the first pulse as counted from the leading edge is shifted by dTF1 (which represents the magnitude of edge shift) with respect to a predetermined reference position. Also, the trailing edge of the middle pulse is shifted by dTE2 (which represents the magnitude of edge shift) with respect to the predetermined reference position. And the trailing edge of the cooling pulse is shifted by dTE1 (which represents the magnitude of edge shift) with respect to the predetermined reference position. As the write pulse train to form a 3T mark, not only the L-shaped write pulse train shown in portion (d) of FIG. 13 but also a mono-pulse-shaped write pulse, of which the middle power level has no pulse width as shown in portion (g) of FIG. 13, may be used as well.

Portion (e) of FIG. 13 illustrates a 4T mark write pulse train. In writing a 4T mark, the optical information storage medium is irradiated with a laser beam representing a U-shaped (i.e., a castle type) write pulse train as shown in FIG. 13. In that case, a pulse with a width of TF2 is applied and the edge position of the first pulse as counted from the leading edge is shifted by dTF1 (which represents the magnitude of edge shift) with respect to a predetermined reference position. Also, the trailing edge of the last pulse with a pulse width TE3 is shifted by dTE2 (which represents the magnitude of edge shift) with respect to the predetermined reference position. And the trailing edge of the cooling pulse is shifted by dTE1 (which represents the magnitude of edge shift) with respect to the predetermined reference position.

Portion (f) of FIG. 13 illustrates a 5T mark write pulse train. In writing a 5T mark, a laser beam representing a U-shaped (i.e., a castle type) write pulse train is radiated. In that case, a pulse with a width of TF2 is applied and the edge position of the first pulse as counted from the leading edge is shifted by dTF1 (which represents the magnitude of edge shift) with respect to a predetermined reference position. Also, the trailing edge of the last pulse with a pulse width TE3 is shifted by dTE2 (which represents the magnitude of edge shift) with respect to the predetermined reference position. And the trailing edge of the cooling pulse is shifted by dTE1 (which represents the magnitude of edge shift) with respect to the predetermined reference position. Although not shown in FIG. 13, a 6T or longer write pulse train can also be defined in a similar manner.

In this example, every 4T or longer mark has the last pulse. However, an L-shaped write pulse train with no last pulse may also be used by setting TE0, which is the pulse width of the last pulse, equal to zero.

In FIG. 13, the magnitudes of edge shift and the pulse widths of write pulse trains that are applied in recording 2T, 3T, 4T and 5T or longer marks are represented by the write strategy parameters with the same reference signs (such as dTF1, TF2 and dTE1) for convenience sake. Actually, however, in recording 2T, 3T, 4T and 5T or longer marks, mutually different write strategy parameters are used. Also, a number of parameters can be set based on not just the length of a mark to be recorded but also the respective lengths of the preceding and following spaces, those of the previous and next marks, and their combination. By irradiating the optical information storage medium with a laser beam representing a write pulse train that has been defined as described above, a mark can be formed on its information storage layer.

As used herein, the "write strategy parameters" refer to dTF1, TF2, dTE1, TE2, and TE3 of the marks with the respective lengths shown in portions (c) through (g) of FIG. 13 and those parameters are defined by a combination of the length of a mark to record and the lengths of its preceding and/or following spaces and/or those of the previous and/or next marks. Those write strategy parameters are stored in Byte J of the DI unit shown in portion (a) of FIG. 7.

Hereinafter, examples of more specific write strategy parameters will be described. FIG. 14 shows a list of castle type write strategy parameters classified. In recording a 2T mark, each of dTF1 and TF2 has four possible parameters that are associated with 2T, 3T, 4T and 5T or longer preceding or following space lengths. And if the preceding or following space length is 2T, then those parameters are further classified depending on whether the previous or next mark length is 2T or 3T or more. In this manner, those parameters are classified into a total of 25 different types (#1 through #25), each of which is defined to be a piece of information of one byte. On the other hand, in recording a 3T, 4T or 5T or longer mark, those parameters are classified into a total of 12 different types (#26 through #37) according to the preceding space length, which may be 2T, 3T, 4T or 5T or more. And each of those 12 different types is defined to be a piece of information of one byte.

Likewise, in recording a 2T mark, dTE1 has four possible parameters that are associated with 2T, 3T, 4T and 5T or longer following space lengths. And if the following space length is 2T, then those parameters are further classified depending on whether the next mark length is 2T or 3T or more. In this manner, those parameters are classified into a total of 10 different types (#1 through #10), each of which is defined to be a piece of information of one byte. On the other hand, in recording a 3T, 4T or 5T or longer mark, those parameters are classified into a total of 12 different types (#11 through #22) according to the following space length, which may be 2T, 3T, 4T or 5T or more. And each of those 12 different types is defined to be a piece of information of one byte. In the same way, as for dTE2, in recording a 3T, 4T or 5T or longer mark, those parameters are classified into a total of 12 different types (#1 through #12) according to the following space length, which may be 2T, 3T, 4T or 5T or more. And each of those 12 different types is defined to be a piece of information of one byte. And as for TE3, in recording a 4T or 5T or longer mark, those parameters are classified into a total of 8 different types (#1 through #8) according to the following space length, which may be 2T, 3T, 4T or 5T or more. And each of those 8 different types is defined to be a piece of information of one byte.

In the example illustrated in FIG. 14, the preceding and following space lengths are classified into 16 (=4×4) different types by sorting those lengths into 2T, 3T, 4T or 5T or more. However, the preceding and following space lengths may also be classified into 8 (=4×2) different types by sorting those lengths into 2T and 3T or more.

As for the L-shaped write pulse shown in portion (d) of FIG. 13, if dTE2 is adjusted according to the following space length so that the trailing edge position is shifted to the left, then the period in which the storage medium is irradiated with the middle power level may shorten. In that case, the minimum pulse interval is preferably set so as to prevent such an L-shaped pulse from changing into a mono-pulse shape. For example, a restriction formula may be defined using related write strategy parameters so that the storage medium is irradiated with the middle power for at least a certain period of time. In that case, even if either a preceding space pre-compensation or a following space pre-compensation has been carried out, a 3T mark can still be controlled so as not to have both L-shaped and mono-pulse write strategy parameters at the same time.

FIG. 15(a) shows possible combinations of write strategy parameter values with the respective write pre-compensation types, which may be one of the four types of "preceding space pre-compensation", "following space pre-compensation", "previous mark pre-compensation" and "next mark pre-compensation". On the other hand, "none" means that none of these four write pre-compensation types is adopted but that the write pre-compensation is supposed to be done based on only the mark lengths. In FIG. 15(a), the open circle ○ indicates that that write pre-compensation type is available for a write strategy parameter in question. On the other hand, "NA" indicates that that write pre-compensation type is not available for the write strategy parameter in question. If a write pre-compensation type, which is regarded to be effective according to the write pre-compensation type information stored in the DI unit, has been selected, a write strategy parameter to which the write pre-compensation indicated by the open circle has been applied is prepared in the DI unit.

FIG. 15(b) shows possible combinations of 3T mark write strategy parameter values with the respective write pre-compensation types in a situation where a 3T write pulse train has a mono-pulse type write strategy in the combinations shown in FIG. 15(a). If the 3T write pulse train is a mono-pulse type, then the write strategy parameters are set as shown in FIG. 15(b) by making the preceding space and following space pre-compensations "effective" or "ineffective" in various combinations. Specifically, if the following space pre-compensation is "effective" for dTE2, one byte of TF2 is set to be "00h". On the other hand, if the following space pre-compensation is ineffective, one byte of dTE2 is set to be "0Fh" as will be described in detail later.

FIG. 15(c) shows possible combinations of 3T mark write strategy parameter values with the respective write pre-compensation types in a situation where a 3T write pulse train has a mono-pulse type write strategy in the combinations shown in FIG. 15(a). If the 3T write pulse train is a mono-pulse type, then the write strategy parameters are set as shown in FIG. 15(c) by making the preceding space and following space pre-compensations "effective" or "ineffective" in various combinations. Specifically, one byte of TF2 is set to be "00h". On the other hand, if the following space pre-compensation is ineffective, one byte is provided for dTE2 to set a value representing the trailing edge position. The open triangle Δ indicates that a write strategy parameter to which a predetermined write pre-compensation is applied is provided but no write pre-compensation is actually performed and just information representing an edge position is stored as will be described in detail later.

That is to say, according to any of the write strategies shown in FIGS. 15(b) and 15(c), if the following space pre-compensation is carried out, TF2 is set to be "00h".

If the 3T write pulse train has an L shape, dTF1 and TF2 shown in portion (d) of FIG. 13 are defined so as to make write pre-compensation based on the preceding space length as shown in the tables for dTF1 and TF2 in FIG. 14. On the other hand, dTE1 and dTE2 shown in portion (d) of FIG. 13 are defined so as to make write pre-compensation based on the following space length as shown in the tables for dTE1 and TE2 in FIGS. 14 and 15(a).

However, even if the 3T write pulse train is a mono-pulse type as shown in portion (g) of FIG. 13, the write pre-compensation ranges applied to dTF1, TF2, dTE1 and dTE2 in the case of the L-shaped pulse described above may also be applied as they are. In that case, TF2 will vary according to not only the preceding space length but also the following space length. That is to say, TF2 will vary according to the combination of the preceding and following space lengths. In such a situation where the combination of variations in TF2 gets complicated, if the write pulse train is a mono-pulse type, write pre-compensation can be done using at least two of the three write strategy parameters that are the edge position information dTF1 and dTE2 of the leading and trailing edges of the mono-pulse and the pulse width information TF2 of the mono-pulse. Thus, according to the write strategy parameters of this preferred embodiment, if the write pre-compensations are combined as shown in FIGS. 15(b) and 15(c), the write pre-compensation is done on the frontend of a recording mark with dTF1 varied according to the preceding space length and is also done on the rear end of the recording mark with dTE2 varied according to the following space length. Specifically, the frontend of a 3T mark is adjusted with write pre-compensation done on the leading edge dTF1 of the write pulse train according to the preceding space length. On the other hand, the rear end of a 3T mark is adjusted with write pre-compensation done on either the trailing edge dTE2 of the write pulse train or the trailing edge dTE1 of the cooling pulse according to the following space length.

According to the combination of write pre-compensations shown in FIG. 15(b), if the 3T mark write pulse train is a mono-pulse and if the following space pre-compensation is effective, a value outside of the effective range that should have been set for TF2 among dTF1, TF2 and dTE2 is used. For example, by employing a value representing an even smaller pulse width than the minimum pulse width or TF2=00h that makes the pulse width of TF2 equal to zero, TF2 is made ineffective and the write pre-compensation value for the 3T mono-pulse is set using the other two write strategy parameters dTF1 and dTE2. In a castle write strategy type, the write strategy type of a 3T mark write pulse train may be either L-shaped or mono-pulse type. However, TF2=00h may be read and used as a flag indicating that the 3T mark write pulse train is a mono-pulse type. More specifically, "00h" may be set for Bytes 26 through 29 of TF2 shown in FIG. 14.

Optionally, the most significant four bits out of one byte (i.e., eight bits) of TF2 may be used as a value that can set the pulse width of TF2, and one of the other least significant four bits may be used as a bit that makes the setting of TF2 ineffective. As in setting "00h" as described above, that one bit may also be used as a flag indicating that the write pulse train of the 3T mark is a mono-pulse type.

Furthermore, if the 3T mark write pulse train is a mono-pulse and if the following space pre-compensation is ineffective, a value outside of the effective range that should have been set may be used (e.g., 0Fh may be used for dTE2 representing the trailing edge position of a write pulse train). For example, by employing dTE2=0Fh representing a value exceeding the magnitude of maximum edge shift, dTE2 is made ineffective and the write pre-compensation value for the 3T mono-pulse is set using the other two write strategy parameters dTF1 and TF2. In a castle write strategy type, the write strategy type of a 3T mark write pulse train may be either L-shaped or mono-pulse type. However, dTE2=0Fh may be read and used as a flag indicating that the 3T mark write pulse train is a mono-pulse type. More specifically, "0Fh" may be set for Bytes 1 through 4 of dTE2 shown in FIG. 14.

Optionally, the most significant four bits out of one byte (i.e., eight bits) of dTE2 may be used as a value that can set the magnitude of edge shift of dTE2, and one of the other least significant four bits may be used as a bit that makes the setting of dTE2 ineffective. As in setting "0Fh" as described above, that one bit may also be used as a flag indicating that the write pulse train of the 3T mark is a mono-pulse type.

Furthermore, if the 3T mark write pulse train is a mono-pulse and if the following space pre-compensation is ineffective, the write strategy parameters may also be used in the combination as shown in FIG. 15(c). For example, by employing TF2=00h that makes the width of TF2 equal to zero, TF2 is made ineffective and "00h" is set for Bytes 26 through 29 of TF2 shown in FIG. 14. As a result, it can be used as a flag indicating that the write pulse train of the 3T mark is a mono-pulse type.

Furthermore, to define the trailing edge of the write pulse train to record a 3T mark, a value representing edge position information is set for dTE2. In this case, the same value is set with respect to every following space length. More specifically, the same value is set for all of Bytes 1 through 4 of dTE2 shown in FIG. 14.

As described above, by setting a predetermined value for either TF2 or dTE2, it can be determined whether a 3T mark has a mono-pulse type write strategy or not.

For the same reasons, the method described above is also applicable to write strategy parameters for use to write a 3T mark with the N/2 type write strategy to be described later.

In the example described above, the 3T mark is supposed to be represented by a mono-pulse. However, similar write pre-compensation is also applicable to a write pulse train representing a mark with any other length, not just a 3T mark.

As described above, those write strategy parameters shown in FIG. 14 are stored in Byte J of the DI unit shown in portion (a) of FIG. 7.

It should be noted that if the write pre-compensation type information tells that little interference will be caused by the previous or next mark or that the write pre-compensation needs to be done using any combination including the preceding or following space, the classification can be simplified by deleting unnecessary ones of those parameters. Then the number of bytes of the write strategy parameters of the DI unit can be reduced.

Next, a write pulse train of N/2 write strategy type will be described with reference to the accompanying drawings.

Portions (a) through (f) of FIG. 16 schematically show the relation between the mark length and the waveform of a write pulse signal to be described later. Specifically, portion (a) of FIG. 16 shows a reference clock signal 1201, which sets a reference time for a write operation and of which one period is identified by Tw. Portion (b) of FIG. 16 shows a count signal 1204, which is generated by the counter to be described later and which counts the amount of time that has passed from the beginning of a given mark on the basis of the reference time Tw of the reference clock signal 1201. The time when the count signal goes zero corresponds to the beginning of a mark or a space. Portions (c) through (f) of FIG. 16 show write pulse signals to be applied to form respective recording marks. The levels of the write pulse signals have been modulated between the peak power Pw that is the highest level, the space power Ps that is a space portion irradiation level, and the bottom power Pb that is the lowest power level. After the last pulse, a cooling pulse is applied at the bottom power level.

In this example, the levels of the write pulse signals are supposed to be modulated between the three power levels. However, the levels of the write pulse signals may also be modulated between a total of four levels by setting the cooling power level Pc of the cooling pulse to be applied after the last pulse and the bottom power level Pb between the middle pulses different from each other. Also, the bottom power level is supposed to be lower than the space power level in FIG. 16 but may also be a power level between the space power level and the peak power level. In a write-once optical disc, the power level to irradiate a space portion is called "space power". In a rewritable optical information storage medium, on the other hand, a recording mark that has been written in advance is erased with the space portion power, and therefore, the space power is sometimes called an "erase power Pe".

Also, in portions (c) through (f) of FIG. 16, the write pulse train of the 2T and 3T marks consists of a single pulse that has been modulated with the peak power. On the other hand, the write pulse train of the marks with 4T and 5T lengths (or code lengths) consists of two pulses that have been modulated with the peak power. Although not shown, 6T and 7T marks consist of three pulses, and 8T and 9T marks consist of four pulses. That is to say, every time the mark length increases by 2T, the number of middle pulses increases by one. That is to say, if the length of a mark to record is N, the number of pulses to be applied at the peak power level is N/2. That is why the write pulse signals shown in FIG. 16 are typical examples of the N/2 write strategy type.

Portion (c) of FIG. 16 illustrates a 2T write pulse train, which means that in writing a 2T mark, a pulse with a width of TF2 is applied and the edge position of the first pulse as counted from the leading edge of the write pulse train is shifted by dTF1 (which represents the magnitude of edge shift) with respect to a predetermined reference position. This pulse train also means that the trailing edge of the cooling pulse is shifted by dTE1 (which represents the magnitude of edge shift) with respect to the predetermined reference position.

Portion (d) of FIG. 16 illustrates a 3T write pulse train. In writing a 3T mark, a pulse with a width of TF2 is applied and the edge position of the first pulse as counted from the leading edge is shifted by dTF1 (which represents the magnitude of edge shift) with respect to a predetermined reference position. It also means that the edge position of the second pulse as counted from the trailing edge of the write pulse train to form a 3T mark is shifted by dTE2 (which represents the magnitude of edge shift) with respect to a predetermined reference position and that the trailing edge of the cooling pulse is shifted by dTE1 (which represents the magnitude of edge shift) with respect to the predetermined reference position.

Portion (e) of FIG. 16 illustrates a 4T write pulse train. In writing a 4T mark, the last pulse is added to the write pulse train to form a 3T mark. In that case, a last pulse with a width of TE2 is applied and the trailing edge of the cooling pulse is shifted by dTE1 (which represents the magnitude of edge shift) with respect to the predetermined reference position.

Portion (f) of FIG. 16 illustrates a 5T write pulse train. In writing a 5T mark, the same number of pulses are applied as in forming a 4T mark, but the reference position for the leading edge of the last pulse has been shifted to the right by Tw/2. Although not shown, the write pulse train of a 6T or longer mark is also defined in a similar manner.

In FIG. 16, the magnitudes of edge shift of write pulses that are applied in recording 2T, 3T, 4T and 5T or longer marks are represented by the same reference signs (such as dTF1, TF2 and dTE1) for convenience sake. Actually, however, in recording 2T, 3T, 4T and 5T or longer marks, the write pulses may also have mutually different magnitudes of edge shift as represented by dTF1, TF2, dTE1 and so on. By irradiating the optical disc medium with a laser beam representing a write pulse train that has been defined as described above, a mark can be formed thereon.

As used herein, the "write strategy parameters" refer to dTF1, TF2, dTE1 and TE2 of the marks with the respective lengths shown in portions (c) through (f) of FIG. 16 and those parameters are defined by a combination of the length of a mark to record and the lengths of its preceding and/or following spaces and/or those of the previous and/or next marks. Those write strategy parameters are stored in Byte J of the DI unit shown in portion (a) of FIG. 7.

FIG. 17(a) shows possible combinations of write strategy parameter values with the respective write pre-compensation types. In FIG. 17(a), the open circle ○ indicates that that write pre-compensation type is available for a write strategy parameter in question. On the other hand, "NA" indicates that that write pre-compensation type is not available for the write strategy parameter in question. If a write pre-compensation type, which is regarded to be effective according to the write pre-compensation type information stored in the DI unit, has been selected, a write strategy parameter to which the write pre-compensation indicated by the open circle has been applied is prepared in the DI unit.

FIG. 17(b) shows other possible combinations of 3T mark write strategy parameter values with the respective write pre-compensation types in the combinations shown in FIG. 17(a). As shown in FIG. 17(b), as the N/2 type 3T mark is a mono-pulse type, the write strategy parameters are set by making the preceding space and following space pre-compensations "effective" or "ineffective" in various combinations. Specifically, no bytes are provided for TF2. On the other hand, if the following space pre-compensation is ineffective, one byte is provided for dTE2 to set a value representing the trailing edge position. The open triangle △ indicates that a write strategy parameter to which a predetermined write pre-compensation is applied is provided but no write pre-compensation is actually performed and just information representing an edge position is stored. Also, as already described for the castle type write strategies, settings similar to the ones for the 3T mono-pulse type shown in FIGS. 15(b) and 15(c) may also be adopted.

Hereinafter, examples of more specific write strategy parameters will be described. FIG. 18 shows a list of write strategy parameters classified. In recording a 2T mark, each of dTF1 and TF2 has four possible parameters that are associated with 2T, 3T, 4T and 5T or longer preceding or following space lengths. And if the preceding or following space length is 2T, then those parameters are further classified depending on whether the previous or next mark length is 2T or 3T or more. In this manner, those parameters are classified into a total of 25 different types (#1 through #25), each of which is defined to be a piece of information of one byte. On the other hand, in recording a 3T, 4T or 5T or longer mark, those parameters are classified into a total of different types (#26 through #37) according to the preceding space length, which may be 2T, 3T, 4T or 5T or more. And each of those 12 different types is defined to be a piece of information of one byte.

Likewise, in recording a 2T mark, dTE1 has four possible parameters that are associated with 2T, 3T, 4T and 5T or longer following space lengths. And if the following space length is 2T, then those parameters are further classified depending on whether the next mark length is 2T or 3T or more. In this manner, those parameters are classified into a total of 10 different types (#1 through #10), each of which is defined to be a piece of information of one byte. On the other hand, in recording a 3T, 4T or 5T or longer mark, those parameters are classified into a total of 12 different types (#11 through #22) according to the following space length, which may be 2T, 3T, 4T or 5T or more. And each of those 12 different types is defined to be a piece of information of one byte. In the same way, as for dTE2, in recording a 3T mark, those parameters are classified into a total of 4 different types (#1 through #4) according to the following space length, which may be 2T, 3T, 4T or 5T or more. And each of those 4 different types is defined to be a piece of information of one byte. And as for TE3, in recording a 4T or longer mark, those parameters are classified into a total of 8 different types (#1 through #8) according to the following space length, which may be 2T, 3T, 4T or 5T or more. And each of those 8 different types is defined to be a piece of information of one byte.

As described above, those write strategy parameters shown in FIG. 18 are stored in Byte J of the DI unit shown in portion (a) of FIG. 7.

It should be noted that if the write pre-compensation type information tells that little interference will be caused by the previous or next mark or that the write pre-compensation needs to be done using any combination including the preceding or following space, the classification can be simplified by deleting unnecessary ones of those parameters. Then the number of bytes of the write strategy parameters of the DI unit can be reduced.

In the example illustrated in FIG. 18, the preceding and following space lengths are classified into 16 (=4×4) different types by sorting those lengths into 2T, 3T, 4T or 5T or more. However, the preceding and following space lengths may also be classified into 8 (=4×2) different types by sorting those lengths into 2T and 3T or more.

Optionally, the write pre-compensation types of the DI format may also be used in the following manner.

For example, as shown in portions (a) and (b) of FIG. 7, a type of write pre-compensation that needs the "preceding space pre-compensation" may be defined by a predetermined bit of the DI format number of the DI unit. A format for write strategy parameters as defined by the DI format number is selected, and the same value may be stored as the values of the write strategy parameters dTF1 and TF2 in the form as defined by the DI format number according to the value of the previous mark. More specifically, if b5 of the DI format number byte B is one, then it can be seen that this is a DI format to which previous mark pre-compensation is adapted, and one byte applicable to the previous mark pre-compensation is provided for dTF1 and TF2 shown in FIG. 14 and stored as Byte J of the write strategy parameters. In this case, however, each of multiple pairs of bytes #1 and #6, #2 and #7, #3 and #8, #4 and #9, #5 and #10 of dTF1 shown in FIG. 14 is supposed to have the same value, and each of multiple pairs of bytes #1 and #6, #2 and #7, #3 and #8, #4 and #9, #5 and #10 of TF2 is also supposed to have the same value. That is to say, although a write pre-compensation type that regards the previous mark pre-compensation as "effective" is defined by the DI format number, some of the write strategy parameters stored in the DI unit may not have been subjected to the previous mark pre-compensation.

In that case, the information writing apparatus may use the write pre-compensation types in the following manner. Suppose it has been confirmed that an optical information storage medium can exhibit desired optical properties when a write pre-compensation type, other than the previous mark pre-compensation, is applied thereto. However, as information writing apparatuses with various levels of performance are available on the market, even such an optical information storage medium could not ensure desired storage quality depending on the combination of that optical information storage medium with an information writing apparatus. In such a situation, the information writing apparatus performs a test write operation as a sort of write pre-compensation learning for finding the best write pre-compensation values using, as initial values, the write strategy parameters that are stored in the DI unit. In that case, it is preferably known in advance what type of write pre-compensation is most effectively applicable to each specific type of optical information storage medium, information storage layer or writing speed. That is why information about the write pre-compensation type to be effectively applicable to write pre-compensation learning is set as the write pre-compensation type of the DI unit. For example, write strategy parameters that do not require any previous mark pre-compensation may be set as the write strategy parameters but the previous mark pre-compensation can still be set to be effective as a write pre-compensation type.

In such a situation, if the desired signal quality cannot be achieved with the write strategy parameters that are stored in the DI unit, write pre-compensation is performed preferentially using a write pre-compensation type that has been made effective in the DI unit.

In this manner, the information writing apparatus can reduce the magnitude of edge shift of a recording mark effectively based on the write pre-compensation type information. More specifically, if the following space pre-compensation is not effective to a given optical information storage medium due to its own property, the DI unit may define the "following space pre-compensation applicability" to be "ineffective" among write pre-compensation types available for a combination of a particular information storage layer and a predetermined writing speed. And when the information writing apparatus retrieves the write pre-compensation types of the DI unit, the apparatus may decide in advance that this is an optical information storage medium for which the following space pre-compensation would not achieve significant effects if a predetermined writing speed is applied to a particular information storage layer of that storage medium. And when making write pre-compensations by performing a test write operation, the apparatus can avoid performing write pre-compensation learning for such a write pre-compensation type that would not achieve significant effects. That is to say, by performing preferentially write pre-compensation learning of the write pre-compensation type that is regarded to be "effective", the edge shift of a recording mark can be adjusted more accurately. On top of that, as write pre-compensation learning of the write pre-compensation type that would not be effective can be omitted in advance, the test write operation needs to be performed on the OPC area a reduced number of times. Particularly in a write-once optical disc, only a limited number of clusters are available in the OPC area. That is why if test write operations were performed a number of times in vain, the clusters in the OPC area would be wasted and chances of using up the OPC area would increase. Thus, by storing the write pre-compensation type and write pre-compensation type flag of this preferred embodiment in desired bits of the DI unit in advance, the chances of missing write opportunities and failing to write data on the optical disc as intended by using up the OPC area can be reduced effectively.

Furthermore, if such an expanded adaptive write pre-compensation were performed based on not just the preceding and following space lengths but also the previous and next mark lengths as described above, then the number of write pre-compensation types to be classified would be so huge that it would take a lot of time to get write pre-compensation conditions set. On top of that, the configuration of the LSI would get too much complicated, which is not beneficial, either. For that reason, it is effective to change the write pre-compensation classifications according to the property of the given optical disc and according to the combination of a required writing speed and a target information storage layer.

Moreover, some optical information storage medium could be affected significantly by thermal interference (i.e., diffusion of heat from the previous mark). If the expanded write pre-compensation is applied to such an optical information storage medium to be affected significantly by the thermal interference produced by the previous mark, the write pre-compensation tables could be classified based on the preceding and following space lengths and the previous mark length. That is to say, by classifying the tables without depending on the length of the next mark, not only the number of write pre-compensation types classified but also the number of write strategy parameters of the DI unit can be reduced. As a result, the LSI can be simplified and the thermal interference can be eliminated efficiently.

On the other hand, if little thermal interference is produced by the previous or next mark, then the write pre-compensation tables can be classified based on not just the length of the previous or next mark but also the lengths of the spaces that precede and follow the mark in question. For example, even if parameters for the leading edge of a write pulse train are classified according to the length of a mark in question and the lengths of the preceding and following spaces or if parameters for the trailing edge of the write pulse train are classified according to the length of the mark in question and the lengths of the preceding and following spaces, the number of write pre-compensation types classified and the number of write strategy parameters of the DI unit can also be reduced. As a result, the configuration of the LSI can be simplified, too.

(Embodiment 2)

Hereinafter, preferred embodiments of an information writing apparatus, an information reading apparatus, a writing method and a reading method according to the present invention will be described. FIG. 19 is a block diagram illustrating an exemplary information reading/writing apparatus that can work as both an information writing apparatus and an information reading apparatus. The information reading/writing apparatus shown in FIG. 19 reads and writes information from/on the optical information storage medium 101 of the first preferred embodiment described above. To get these read/write operations done, the information reading/writing apparatus includes a pickup 102, a preamplifier 103, an AGC (automatic gain control) 104, a waveform equalizing section 105, an A/D converting section 106, a PLL (phase locked loop) section 107, a PRML (partial response maximum likelihood) processing section 108, a shift detecting section 109, a write pulse condition calculating section 110, a write pattern generating section 111, a write pre-compensation section 112, a laser driving section 113 and a management information loading section 114.

First of all, it will be described how to read information from the optical information storage medium 101. The pickup 102 includes a laser diode (LD) that emits a light beam toward the optical information storage medium 101. The laser beam that has been emitted from the laser diode is reflected from an information storage layer of the optical information storage medium 101, and the reflected light is then received by the pickup 102. The received light is transformed by the photodetector of the pickup 102 into an electrical signal, which becomes an analog read signal (RF signal). Next, the analog read signal is amplified by the preamplifier 103 and the AGC 104 to have predetermined amplitude and then supplied to the waveform equalizing section 105.

As already described for the first preferred embodiment, in the PIC area that is a management area of the optical information storage medium 101, stored is control information (such as the DI unit) about the optical information storage medium 101. This information has been recorded by modulating the guide groove in the tracking direction. Thus, by subjecting the RF signal to waveform equalization processing, the management information loading section 114 gets the control information loaded from the PIC area into this apparatus. Specifically, control information such as a format number, which includes information about the write strategy type and information about the write pre-compensation type, is loaded. In addition, the management information loading section 114 also retrieves DMA OPC area management information from the RF signal, too.

Meanwhile, to extract user data from the RF signal, the A/D converting section 106 converts the RF signal from an analog signal into a digital signal, which is sampled by the PLL section 107 synchronously with clock pulses and then supplied to the PRML processing section 108 and the shift detecting section 109. The PRML processing section 108 subjects the digital signal to maximum likelihood decoding by some maximum likelihood decoding method such as Viterbi decoding. As a result, a binary signal showing a result of the maximum likelihood decoding is generated.

Next, it will be described how to write information on the optical information storage medium 101. When a write operation is performed, the DI format number, the write strategy parameters, the recording power and other pieces of control information that have been retrieved by the management information loading section 114 from the DI unit are entered into the write pulse condition calculating section 110 and the write strategy and recording power conditions are retained in a memory. Meanwhile, the write pattern generating section 111 transforms an arbitrary code sequence into an NRZI signal and outputs it. And based on the result of calculations performed by the write pulse condition calculating section 110, the write pre-compensation section 112 sets write pulse conditions. In response to a signal that has been transformed into a write pulse train based on the NRZI signal, the laser driving section 113 drives the laser diode in the pickup 102. As a result, a laser beam, of which the waveform is determined by the write strategy type adopted, is emitted from the pickup 102. And by controlling the recording power of the laser beam, information gets written at a desired location on the target information storage layer of the optical information storage medium 101.

That is to say, a write pulse train is generated based on the control information that has been stored on the optical information storage medium 101 itself, and the optical information storage medium 101 is irradiated with a laser beam, of which the waveform is defined by the write pulse train generated, thereby forming a recording mark on the information storage layer.

According to the information reading apparatus, information reading method, information writing apparatus and information writing method of this preferred embodiment, the write strategy type, the write pre-compensation type, the write pre-compensation step information and other pieces of control information can be recognized all at a time by using the DI format number. As a result, the write pre-compensation and other kinds of processing can get done quickly. On top of that, if there is any write pre-compensation type that would not achieve significant effects, write pre-compensation learning of that write pre-compensation type can be omitted from the beginning, and the test write operation needs to be performed on the OPC area a reduced number of times. Consequently, the chances of missing write opportunities and failing to write data on the optical disc as intended by using up the OPC area can be reduced effectively.

Portions (a) through (f) of FIG. 20 illustrate marks and spaces of a write code sequence generated by this optical information reading/writing apparatus and also illustrate how to generate a write pulse train to form such marks and spaces. Specifically, portion (a) of FIG. 20 shows the reference clock signal 1201 that sets a reference time for a write operation. The reference clock signal 1201 is a series of clock pulses, of which one period is Tw. Portion (b) of FIG. 20 shows an NRZI (non return to zero inverted) signal of the write code sequence that has been generated by the write pattern generating section 111. In this case, Tw (T) is the detection window width, i.e., the minimum unit of variation in mark or space length as represented by the NRZI signal 1202. Portion (c) of FIG. 20 schematically illustrates marks and spaces to be actually formed on the optical information storage medium. In this case, the spot of the laser beam that scans the optical information storage medium goes from left to right on the paper on which this portion (c) of FIG. 20 is drawn. In this case, each mark 1207 corresponds to "Level One" of the NRZI signal 1202 one to one and is formed so as to have a length that is proportional to the length of that Level One period. Portion (d) of FIG. 20 shows a count signal 1204, which is used to count the amount of time that has passed from the beginning of a mark 1207 or a space 1208 on a Tw basis. Portion (e) of FIG. 20 schematically shows a classification signal 1205 in the pulse condition calculating section 110. In this example, classification is done based on the length of each mark, the lengths of spaces that respectively precede and follow the mark, and the lengths of the previous and next marks. For example, "3-4-5-2-6" shown in portion (e) of FIG. 20 indicates that a mark with a mark length of 5Tw is preceded by a space with a length of 4Tw and the previous mark with a length of 3Tw, and is followed by a space with a length of 2Tw and the next mark with a length of 6Tw. In the following description, 2Tw, 3Tw and so on will sometimes be referred to herein as 2T, 3T and so on with w omitted. Specifically, a space length 4Tw will sometimes be referred to herein as 4Ts by replacing w with s and a mark length 2Tw will sometimes be referred to herein as 2Tm by replacing w with m. Portion (f) of FIG. 20 shows a write pulse signal corresponding to the NRZI signal shown in portion (b) of FIG. 20 and also is an exemplary waveform of a laser beam actually emitted for recording purposes. This write pulse signal 1206 is generated by reference to the count signal 1204, the NRZI signal 1202, the classification signal 1205 and the write pre-compensation table data provided by the write pulse condition calculating section 110 and the management information loading section 114.

In this preferred embodiment, the classification signal shown in portion (e) of FIG. 20 is supposed to be classified based on a combination of the five values that consist of the mark length of each mark, the lengths of the spaces that precede and follow the mark, and the lengths of the previous and next marks. In the examples to be described later, however, the classification signal will be classified, according to the write pre-compensation type that has been read from the DI unit, based on a combination of three or four of those fives values, i.e., a combination of the mark length of each mark, the length(s) of its preceding and/or following space(s) and the length(s) of the previous and/or next mark(s).

Hereinafter, it will be described how the reading/writing apparatus of this preferred embodiment performs a write pre-compensation operation. First of all, the management information loading section 114 retrieves the control information of the DI unit from the PIC area of the optical information storage medium 101 and stores write strategy type, write pre-compensation type, write pre-compensation step information and other kinds of information in the memory as described above.

If the write strategy type recognized by the management information loading section 114 is N-1 type, the write pulse train shown in portion (c) through (f) of FIG. 11 is generated. On the other hand, if the write strategy type recognized by the management information loading means is castle (CA) type, then the write pulse train shown in FIG. 13 is generated. And if the write strategy type is recognized to be N/2 type, the write pulse train shown in FIG. 16 is generated.

Hereinafter, adaptive write pre-compensation will be described. According to the adaptive write pre-compensation of this preferred embodiment, as for each mark for which a write pulse train needs to be generated, write pre-compensation tables are classified according to a combination of the length of the mark in question and those of its preceding and following spaces or a combination of the lengths of the preceding and following spaces and that of the previous or next mark. The edge positions and pulse widths of a write pulse train to record each mark are shifted or varied by dTF1, TF2, dTE1 and TE2 based on the result of that classification, thereby generating a write pulse signal and precisely controlling the frontend or rear end position of the mark to be formed on the optical information storage medium. Compared to the conventional technique by which parameters for the frontend position of each mark are classified based on the length of that mark and its preceding space length and parameters for its rear end position are classified based on the length of that mark and its following space length, the frontend or rear end position of a mark can be controlled more precisely with the optical intersymbol interference and thermal interference taken into account.

Particularly, if the mark of interest is 2T (i.e., a shortest mark) and if the preceding space length is also 2T (i.e., a shortest space), then the write pre-compensation tables are classified by reference to the previous mark length, too. The edge positions and pulse widths of a write pulse train to record each mark are shifted or varied by dTF1, TF2, dTE1 and TE2 based on the result of that classification, thereby generating a write pulse signal and precisely controlling the frontend or rear end position of the mark to be formed on the optical disc medium. As a result, the write operation can be performed with the optical intersymbol interference and thermal interference taken into account.

Likewise, if the mark of interest is 2T (i.e., a shortest mark) and if the following space length is also 2T (i.e., a shortest space), then the write pre-compensation tables are classified by reference to the next mark length, too. The edge positions and pulse widths of a write pulse train to record each mark are shifted or varied by dTF1, TF2, dTE1 and TE2 based on the result of that classification, thereby generating a write pulse signal and precisely controlling the frontend or rear end position of the mark to be formed on the optical disc medium. As a result, the write operation can be performed with the optical intersymbol interference and thermal interference taken into account.

If a shortest mark (2T) and a shortest space (2T) appear back to back, then write pre-compensation may be carried out with the previous and next mark lengths classified into the shortest mark length (2T) and other longer mark lengths as described above. Then, the number of write pre-compensation types classified can be reduced, and the optical intersymbol interference or thermal interference can be eliminated efficiently without complicating the configuration of the LSI. That is to say, it is particularly effective to store the DI format number, which provides information about at least the write strategy type and the write pre-compensation type, with or without the write pre-compensation step information, in the DI unit of the optical information storage medium of this preferred embodiment so that write strategy parameters, indicating what write strategy types or write pre-compensation types are needed, are stored in the control area (e.g., the PIC area) on the disc in advance.

Among other things, just by reading the DI format number, the write strategy type, the write pre-compensation type, the write pre-compensation step information and other kinds of information can be obtained at a time, which will contribute to getting the rest of the processing done more quickly.

On top of that, by performing preferentially write pre-compensation learning of the write pre-compensation type that is regarded to be "effective" by reference to the write pre-compensation type information that is stored in the DI unit on the optical information storage medium of this preferred embodiment, the edge shift of a recording mark can be adjusted more accurately. On top of that, as write pre-compensation learning of the write pre-compensation type that would not be effective can be omitted in advance, the test write operation needs to be performed on the OPC area a reduced number of times. Particularly in a write-once optical disc, only a limited number of clusters are available in the OPC area. That is why if test write operations were performed a number of times in vain, the clusters in the OPC area would be wasted and chances of using up the OPC area would increase. Thus, by storing the write pre-compensation type and write pre-compensation type flag of this preferred embodiment in desired bits of the DI unit in advance, the chances of missing write opportunities and failing to write data on the optical disc as intended by using up the OPC area can be reduced effectively.

(Embodiment 3)

Hereinafter, it will be described in further detail with reference to the flowchart shown in FIG. 21 exactly how to make the write pre-compensation of the writing method of the second preferred embodiment described above.

First of all, in Step S00, the control information of the DI unit (including write strategy type information, write pre-compensation type information, and write pre-compensation step information) that has been stored in advance on the optical information storage medium is retrieved.

Meanwhile, the management information storage area (DMA) and other areas are searched to see if anything has ever been written there by the information writing apparatus. And if any control information has ever been written there, that information is also retrieved by the writing apparatus.

Suppose, according to the information retrieved, the write strategy type has turned out to be N-1 type, the write pre-compensation types have turned out to be previous and next mark pre-compensations and preceding and following space pre-compensations, and the write pre-compensation step has turned out to be Tw/16. Hereinafter, it will be described what procedure needs to be followed in that case.

Next, in Step S01, the information to be written is encoded, thereby generating encoded data as a combination of marks and spaces just like the NRZI signal 1202 shown in portion (b) of FIG. 20.

Subsequently, in Step S02, each mark is classified as a combination of its own mark length, its preceding and following space lengths, and previous and next mark lengths by reference to the write pre-compensation type information. For example, in portion (e) of FIG. 20, a 2T mark is classified to be "X-2-2-3-3", a 3T mark is classified to be "2-3-3-4-5", a 5T mark is classified to be "3-4-5-2-6", and a 6T mark is classified to be "5-2-6-2-X", where X represents the code not shown and is actually replaced with a numeral that has been classified according to the code sequence. Also, in each of these combinations, "previous mark length", "preceding space length", "length of a mark of interest to make write pre-compensation", "following space length" and "next mark length" are arranged in this order.

Thereafter, in Step S03, in accordance with the write strategy type information, the pulse edge positions of a write pulse train to form the mark are shifted based on the result of classification, thereby controlling the write pulse train. For example, in portions (c) through (f) of FIG. 11, the position of the leading edge of the write pulse train is shifted by dTF1 and its pulse width is varied by TF2, while the position of the trailing edge thereof is shifted by dTE1 and dTE2.

Next, in Step S04, the OPC area of the optical information storage medium is irradiated with a laser beam, of which the waveform is represented by the write pulse train, thereby performing a test write operation and forming a recording mark. If necessary, the test write operation may be performed a number of times with the write pre-compensation values changed to get test writing done.

And after the test write operation has been performed, the write strategy parameter information and write pre-compensation type information thus determined are written on the management area in Step S05.

Hereinafter, a detailed procedure of write pre-compensation will be described with reference to portions (a) through (d) of FIG. 22 with a mark 601 having a 2T mark length taken as an example.

Portion (a) of FIG. 22 shows a reference clock signal 1201 that provides a reference time for a write operation. Portion (b) of FIG. 22 shows a count signal 1204 generated by a counter. Portion (c) of FIG. 22 shows a write pulse train 1206, of which the write pulse edge positions are shifted by dTF1 and dTE1 with respect to a reference position. Also, TF2 represents the pulse width of the write pulse. And portion (d) of FIG. 22 schematically illustrates the mark 601 with a 2T mark length, which has been recorded with a laser beam, of which the waveform is represented by the write pulse train shown in portion (c) of FIG. 22. The magnitude of shift dTF1 of the edge position of the mark 601 and the variation TF2 in its pulse width are determined based on the result of classification according to the mark length of the mark to record, the preceding and following space lengths, and the previous and next mark lengths as in the classification table shown in FIG. 8.

FIG. 8 shows how the magnitudes of shift TF1, TF2 and dTE1 of the write pulse train are classified. For example, 6 of dTF1 shown in FIG. 8 represents Byte #6 of dTF1 and that one byte stores a value defining an edge shift. That is to say, the sixth byte of dTF1 stores the magnitude of edge shift dTF1 of a write pulse to record a 2T mark in a situation where the following space is a 2T space, the next mark is a 2T mark, the preceding space is also a 2T space, and the previous mark is a 3T or longer mark. The same can be said about TF2, dTE1, TE2 and TM. That is to say, the magnitude of edge shift or the variation in pulse width is stored as one byte of information at a predetermined byte position in accordance with the classification shown in FIG. 8.

Each of the magnitude of edge shift dTF1 and the variation in pulse width TF2 is defined to be any of a total of 35 different types that have been classified according to the mark length of a mark to record (which may be any of the four different lengths of 2T, 3T, 4T and 5T or more), the preceding space length (which may be any of the four different lengths of 2T, 3T, 4T and 5T or more), the length (which may one of the two different lengths of 2T and 3T or more) of the previous mark located just before the 2T preceding space, and the length (which may one of the four different lengths of 2T, 3T, 4T and 5T or more) of the following space located right after the 2T mark. In this example, each of the magnitude of edge shift dTF1 and the variation in pulse width TF2 is defined by the mark length that may be one of four different lengths, the preceding space length that may be one of four different lengths, and the previous mark length that may be one of two different lengths. These classifications have been done by reference to the write pre-compensation classification table that has been defined in advance for the DI format number. If another write pre-compensation type has been selected from the DI unit, however, unnecessary parameters represented by these bytes may be removed from the byte for the write strategy parameters in advance. For example, if the previous mark length is not necessary, Bytes #1 and #6, #2 and #7, #3 and #8, #4 and #9, and #5 and #10 of dTF1 and TF2 may have the same value. Alternatively, two bytes of these two parameters may be integrated into one to reduce the number of bytes of the write strategy parameters.

The magnitude of edge shift dTF1 and the variation in pulse width TF2 may also be defined to be an absolute time of 0.5 nsec, for example, by reference to the write pre-compensation step information or may even be defined to be an integral multiple of Tw/16 or Tw/32 by reference to the reference clock signal. Alternatively, it may also be defined to be an integral multiple of Tw/32, for example.

Optionally, a single reference dTF1, TF2, dTE1, or TE2 value may be set for each of 2T, 3T, 4T and 5T or longer marks, and write pre-compensation values that vary according to the preceding and following space lengths or the previous and next mark lengths may be defined as differential information with respect to the reference value of each of those mark lengths.

That is to say, the write strategy parameters of the DI unit, represented by Byte J shown in portion (a) of FIG. 7, may include a reference value for the magnitude of edge shift or the variation in pulse width of a write pulse train to form a recording mark with a predetermined mark length. Alternatively, if write pre-compensation is made on a recording mark with a predetermined mark length using a combination of the predetermined mark length and the lengths of its preceding and following spaces, the magnitude of edge shift or the variation in pulse width of the write pulse train may be included, as differential information with respect to the reference value, in the write strategy parameters of the DI unit.

For example, in "25" of dTF1 shown in FIG. 8, the magnitude of shift dTF1 of the leading edge of a write pulse train in a situation where the mark length of a mark to record is 2T and where the preceding space length is $\geqq$5T may be stored as a reference value in Byte #25 for dTF1 of the write strategy parameters.

In that case, "20" of dTF1 shown in FIG. 8, i.e., the information to be stored in Byte #20 of dTF1 in a situation where the mark length of a mark to record is 2T and where the preceding space length is 4T, does not have to be the magnitude of shift dTF1 itself but may also be differential information with respect to the reference value.

If the value (representing differential information) stored in Byte #20 in such a situation is zero, then it means that the magnitude of shift represented by the write strategy parameter in Byte #20 is the same as the reference value stored in Byte #25. On the other hand, if the value (representing the differential information) stored in Byte #20 in such a situation is 1/16×Tw, then it means that the magnitude of shift represented by the write strategy parameter in Byte #20 is the sum of the reference value stored in Byte #25 and 1/16×Tw.

In that case, particularly when no write pre-compensation is performed using either the preceding and following space lengths or the previous and next mark lengths, write pre-compensation values can be retrieved from the optical information storage medium quickly just by reading dTF1, TF2, dTE1 and TE2 to be reference values for respective mark lengths without retrieving differential byte information for the preceding and following space pre-compensation. On top of that, the memory resource of the information writing apparatus can also be saved and the configuration of the LSI can be simplified, too. Added to that, by storing the differential information, the number of bytes of the write strategy parameters of the DI unit, as represented by Byte J shown in portion (a) of FIG. 7, can also be reduced.

Next, write patterns will be described. In a write pattern obtained by subjecting user data to 17PP modulation normally used, the longer the code length, the lower the frequency of occurrence (i.e., the probability of occurrence), although it depends to some extent on the user data yet to be modulated. Specifically, the frequencies of occurrence satisfy the relation 2T>3T>4T, . . . >8T (e.g., 2T, 3T, 4T may be about 38%, about 25%, about 16% and so on).

If write operations are performed with the write pulse conditions changed (e.g., using write patterns with mutually different frequencies of occurrence of the code lengths), the marks recorded are scanned and then the difference between two write pulse conditions is detected as the magnitude of edge shift, then the PLL locking phase will vary under considerable influence of a particular code length due to such a variation in the frequency of occurrence of the respective code lengths of the modulation code. Particularly in a situation where a 2T mark, of which the frequency of occurrence is more than one-third, is recorded, if an edge position of the 2T mark shifts, the average phase distribution of the overall recording mark will change and the PLL locking phase will shift. As a result, if the edge position information of a recording mark is detected using clock pulses generated by the PLL, then detection errors of the edge position information or mark phase components will be noticeable in a mark length with a relatively low frequency of occurrence (e.g., a 4T or longer mark length in this preferred embodiment).

That is why according to this preferred embodiment, the write pattern to adjust 2T and 3T marks is preferably a particular pattern in which the code lengths of 2T through 8T have approximately equal frequencies of occurrence and which has been subjected to a DSV control. By using such a particular pattern in which the respective code lengths have approximately equal frequencies of occurrence, each code length will have the same frequency of occurrence of one-seventh. In that case, each of 2T and 3T will have a frequency of occurrence of 1/7 and 4T or longer marks will have a combined frequency of occurrence of 5/7, which forms the majority of all marks. In such a situation, even if the write pulse condition of the 2T and 3T marks is changed, the edge position of the 4T or longer recording marks, of which the write pulse condition is unchanged, never shifts. As a result, there is little PLL phase shift overall, and therefore, the detection error due to the PLL phase shift can be reduced. As for the order of write pre-compensations to make, the write pre-compensations are carried out by reference to the flag representing the write pre-compensation priority order. In the following example, write pre-compensations to make in recording a 2T mark is supposed to be carried out in the priority order of preceding space pre-compensation, following space pre-compensation, previous mark pre-compensation, and next mark pre-compensation.

First of all, a test write operation is performed for the first time using a code sequence not including any shortest mark (2T) as a signal to be written to obtain write pre-compensation values for marks with 3T or longer code lengths, which do not depend on the preceding or following space length. And then a test write operation is performed for the second time to obtain write pre-compensation values for 3T or longer marks, which do depend on the preceding and following space lengths. Next, a test write operation is performed for the third time on a code sequence including a 2T signal, thereby obtaining write pre-compensation values for the 2T signal and other signals that do not depend on the preceding or following space length. Subsequently, a test write operation is performed for the fourth time, thereby obtaining write pre-compensation values, which depend on the preceding space, for a code sequence including the 2T signal. Thereafter, a test write operation is performed for the fifth time, thereby obtaining write pre-compensation values, which depend on the following space, for a code sequence including the 2T signal. And then a test write operation is performed for the sixth time, thereby obtaining write pre-compensation values, which depend on the previous and next marks, for a code sequence including the 2T signal.

In a situation where a read signal has very small amplitude representing a short mark or space as in an optical information storage medium with a storage capacity of 33.4 GB, if a recording mark has failed to be recorded at an accurate position using a 2T signal, then it could be difficult to align the positions of 3T or longer marks and spaces with each other. In writing such a signal to be significantly affected by intersymbol interference, first of all, marks with 3T or longer code lengths are recorded, and write pre-compensation is done accurately on the front and rear ends of the 3T or longer marks and spaces. Thereafter, a signal including the 2T signal is written and write pre-compensation is done accurately on the positions where the 2T marks and spaces have been written. In this manner, the write operation can be done more accurately and more efficiently, and the quality of the read signal can be improved.

Furthermore, when a test write operation is performed, the length and the magnitude of shift of a short recording mark such as a 2T or 3T mark will vary according to the writing condition. And if the tap coefficients of an adaptive equalization filter change every time the mark length or its magnitude of shift varies, then not just the variations that occurred during the write operation but also a shift of the read signal due to such fluctuations during the read operation will combine with each other. For that reason, to accurately adjust the shift to be caused due to a difference in writing condition, when write adjustment is made, the boost value of the read equalizer or the tap coefficient of the adaptive equalization filter is preferably fixed so as to get a test write operation or write pre-compensation done appropriately. Then, the magnitude of shift of each pattern can be adjusted accurately.

Also, according to the preferred embodiment described above, some optical information storage medium could be affected by thermal interference to significantly varying degrees according to the lengths of the spaces that precede and follow a given mark. When a write operation is performed on such an optical information storage medium, the write pulse condition needs to be changed according to not just the mark length but also the lengths of its preceding and following spaces. Nevertheless, if the lengths of the spaces that precede and follow each and every mark were taken into consideration, then the number of possible combinations of write pulse conditions would increase exponentially. In that case, the number of parameters for use to make adjustments by test write operation would increase so steeply that a lot of time would be wasted to get learning done and a huge number of tracks would be consumed in the writing condition learning area. In a write-once optical information storage medium such as a write-once optical disc, the learning process may be performed only a limited number of times because the number of tracks available in the writing condition learning area is limited, too. For that reason, it is not beneficial to consume a huge number of tracks for just a single learning process. In view of these considerations, according to the write pulse condition optimizing method of this preferred embodiment, the write pulse condition is adjusted on a mark length basis. And if the given optical information storage medium requires that no pre-compensation be made based on the lengths of the spaces that precede and follow a given mark, then such unnecessary adjustment steps are omitted and the write pulse condition is adjusted based on the mark length only. By making such write pulse condition adjustment only on a mark length basis as described above, the adjustment can be done in a shorter time and the signal quality of the recording mark can be improved efficiently.

On the other hand, if the given optical information storage medium requires that write pulse condition adjustment be made based the lengths of spaces that precede and follow a given mark and the lengths of the previous and next marks or if the shift of a recording mark cannot be compensated for sufficiently just by adjusting the write pulse condition based on the mark length and its preceding and following space lengths, then the write pulse condition is preferably adjusted using not only the lengths of the spaces that precede and follow a mark but also the lengths of the previous and next marks as well.

Also, by reference to the write pre-compensation type information that has been retrieved from the DI unit, it can be seen which write pre-compensation type would be more effective than any other type and various kinds of information can be extracted from the DI unit and used as to how many mark and space lengths should be classified to get the write pre-compensation done, whether the previous mark pre-compensation needs to be performed or not, whether the next mark pre-compensation needs to be performed or not, and how many write pre-compensation types need to be classified. In that case, the write pulse condition can be adjusted according to the property of the optical information storage medium itself without performing unnecessary adjustment steps at all. Thus, if the number of write pre-compensation types to be classified or the necessity of previous or next mark pre-compensation is known in advance, then the adjustment can be done in a shorter time and the signal quality of the recording mark can be improved efficiently.

Optionally, those various pieces of information that have been obtained as a result of the write pre-compensation learning done by the information writing apparatus, including what write pre-compensation value has been obtained, whether respective write pre-compensation types are needed or not, how many mark lengths and space lengths need to be classified to get the write pre-compensation done, whether the previous mark pre-compensation is needed or not, whether the next mark pre-compensation is needed or not, and how many write pre-compensation types need to be classified, may be stored in the DMA area 1002 (see FIG. 3). In that case, the write pulse condition can be adjusted according to the property of the given storage medium, which varies according to the writing speed or from one information storage layer to another, without performing unnecessary adjustment steps at all when the same storage medium is loaded next time. Thus, if the number of write pre-compensation types to be classified or the necessity of previous or next mark pre-compensation is known in advance, then the adjustment can be done in a shorter time and the signal quality of the recording mark can be improved efficiently.

In the foregoing description of preferred embodiments, the present invention has been described as being applied to a write-once optical information storage medium. However, this is only an example and the present invention is also applicable to a rewritable optical information storage medium.

(Embodiment 4)

Hereinafter, a preferred embodiment of a system for manufacturing the optical information storage medium of the present invention will be described. FIG. 23 schematically illustrates a master cutting machine for the optical information storage medium manufacturing system. As shown in FIG. 23, the master cutting machine includes an objective lens 1103, a motor 1104, an optical modulator 1105, a laser diode 1106, and a turntable 1107.

A glass master 1101 coated with an inorganic photoresist 1102 is mounted on the turntable 1107 and is rotated and driven at a predetermined velocity by the motor 1104.

A laser beam that has been emitted from the laser diode 1106 has its output power modulated by the optical modulator 1105, is condensed to a predetermined size by the objective lens 1103 and irradiates the inorganic photoresist 1102 that has been applied onto the glass master 1101. In this case, the binary recording is done by irradiating or not irradiating it.

As shown in FIG. 5, the DI unit information, including the DI format number to be written on the PIC area, may be recorded as HFM (high frequency modulation) grooves on the optical information storage medium. For that purpose, in making the glass master 1101, the optical modulator 1105 modulates the laser beam with the DI unit information including the DI format number and other kinds of control information that has been described in detail for the first preferred embodiment.

Thereafter, those portions irradiated with the laser beam are melted and a metal such as nickel is deposited thereon by sputtering, thereby obtaining a metallic stamper with wobbled HFM grooves and with a PIC area including DI units. Next, a substrate for an optical information storage medium is made using the metallic stamper as a die and a recording film to be an information storage layer is formed on the substrate. Finally, two substrates, on at least one of which the recording film has been deposited, are bonded together to obtain a single optical information storage medium.

(Embodiment 5)

Hereinafter, a preferred embodiment of a method of making an optical information storage medium according to the present invention will be described. As already described for the fourth preferred embodiment, a PIC area, which is a management area including DI units, is defined on the glass master 1101 using the master cutting machine.

That is to say, a PIC area, including DI units on which stored are the DI format number, containing information about the write pre-compensation types and write strategy types as already described for the first preferred embodiment, and various other kinds of control information such as the layer information and the writing speed shown in portion (a) of FIG. 7, is defined on the glass master 1101 using the master cutting machine.

A metallic stamper is made with this glass master and then an optical information storage medium can be obtained using the metallic stamper as a die.

By carrying out such a manufacturing process, an optical information storage medium, on which DI units, including the DI format number, are stored, can be obtained.

Industrial Applicability

The present invention can be used effectively in a write-once or rewritable optical information storage medium on which information can be stored at a high density and in an information writing apparatus, an information reading apparatus, an information writing method and an information reading method that are compatible with such an optical information storage medium. The present invention is applicable for use to the electronic device industry in general, including digital consumer electronic appliances and information processors that use such an optical information storage medium and those apparatuses and methods.

REFERENCE SIGNS LIST 101 optical information storage medium
102 pickup
103 preamplifier
105 waveform equalizing section
108 PRML processing section
110 write pulse condition calculating section
111 write pattern generating section
112 write pre-compensation section
113 laser driving section
114 management information loading section

The invention claimed is:

1. An optical information storage medium with at least one information storage layer,
    wherein the optical information storage medium has a management area that stores at least one unit containing control information about the optical information storage medium, and
    wherein the control information includes
    a format number, which provides information about at least a write strategy type and a write pre-compensation type, and
    a write strategy parameter, which provides information about the magnitude of shift in a leading edge position, or variation in the pulse width, of a write pulse train to form a recording mark, and
    wherein the value of the format number changes according to a combination of the write strategy type and the write pre-compensation type,
    wherein a preceding space length that is a length of a space preceding the recording mark is classified into M-types (where M is an integer equal to or greater than two) with the first to $M^{th}$ types,
    wherein the write strategy parameter includes a reference value that is information indicating the magnitude of shift in the leading edge position of the write pulse train with respect to the classification of the M-type, and
    wherein the write strategy parameter further includes differential information with respect to the reference value, and the differential information is information that shows the magnitude of shift in the leading edge position of the recording pulse train with respect to another classification that is different from the M-type classification and with the first to $(M-1)^{th}$ types.

2. The optical information storage medium of claim 1, wherein the write pre-compensation type includes first and second types, and
    wherein according to the first type of write pre-compensation, performed selectively is either a preceding space pre-compensation, which is a write pre-compensation to get done by an information writing apparatus based on a combination of the mark length of a recording mark and the space length of a first space that precedes the recording mark, or a following space pre-compensation, which is a write pre-compensation to get done by the information writing apparatus based on the mark length of the recording mark and the space length of a second space that follows the recording mark, and
    wherein according to the second type of write pre-compensation, both the preceding space pre-compensation and the following space pre-compensation are performed.

3. The optical information storage medium of claim 2, wherein the format number is represented by multiple bits, and
    wherein one of the multiple bits indicates whether the write pre-compensation type is the first type or the second type.

4. The optical information storage medium of claim 1, wherein the write strategy type includes at least three different write strategy types that are N-1, N/2 and castle.

5. The optical information storage medium of claim 1, wherein a write operation is able to be performed on the optical information storage medium with at least one writing speed, and
    wherein the unit stored in the management area includes the control information for at least one combination of the at least one writing speed and the at least one information storage layer.

6. The optical information storage medium of claim 5, wherein the unit includes
    layer information, which indicates to which of the at least one information storage layer the control information included in the unit applies, and
    writing speed information, which indicates to which of the at least one writing speed the control information included in the unit applies.

7. An information writing apparatus for writing information on an optical information storage medium,
    wherein the optical information storage medium has at least one information storage layer and also has a management area that stores at least one unit containing control information about the optical information storage medium, and
    wherein the control information includes
    a format number, which provides information about at least a write strategy type and a write pre-compensation type, and
    a write strategy parameter, which provides information about the magnitude of shift in a leading edge position, or variation in the pulse width, of a write pulse train to form a recording mark, and
    wherein the value of the format number changes according to a combination of the write strategy type and the write pre-compensation type,
    wherein a preceding space length that is a length of a space preceding the recording mark is classified into M-types (where M is an integer equal to or greater than two) with the first to $M^{th}$ types, and wherein the information writing apparatus generates the write pulse train by reference to the control information and irradiates the optical information storage medium with a laser beam, of which the waveform is represented by the write pulse train, thereby forming a recording mark on the medium, wherein the write strategy parameter includes a reference value that is information indicating the magnitude of shift in the leading edge position of the write pulse train with respect to the classification of the M-type, and wherein the write strategy parameter further includes differential information with respect to the reference value, and the differential information is information that shows the magnitude of shift in the leading edge position of the recording pulse train with respect to another classification that is different from the M-type classification and with the first to $(M-1)^{th}$ types.

8. The information writing apparatus of claim 7, wherein the write pre-compensation type includes first and second types, and wherein according to the first type of write pre-compensation, performed selectively is either a preceding space pre-compensation, which is a write pre-compensation to get done by an information writing apparatus based on a combination of the mark length of a recording mark and the space length of a first space that precedes the recording mark, or a following space pre-compensation, which is a write pre-compensation to get done by the information writing apparatus based on the mark length of the recording mark and the space length of a second space that follows the recording mark, and wherein according to the second type of write pre-compensation, both the preceding space pre-compensation and the following space pre-compensation are performed.

9. The information writing apparatus of claim 8, wherein the format number is represented by multiple bits, and wherein one of the multiple bits indicates whether the write pre-compensation type is the first type or the second type.

10. The information writing apparatus of claim 7, wherein the write strategy type includes at least three different write strategy types that are N−1, N/2 and castle.

11. The information writing apparatus of claim 7, wherein a write operation is able to be performed on the optical information storage medium with at least one writing speed, and wherein the unit stored in the management area includes the control information for at least one combination of the at least one writing speed and the at least one information storage layer.

12. The information writing apparatus of claim 11, wherein the unit includes layer information, which indicates to which of the at least one information storage layer the control information included in the unit applies, and writing speed information, which indicates to which of the at least one writing speed the control information included in the unit applies.

13. An information reading apparatus for reading information from an optical information storage medium, wherein the optical information storage medium has at least one information storage layer and also has a management area that stores at least one unit containing control information about the optical information storage medium, and wherein the control information includes a format number, which provides information about at least a write strategy type and a write pre-compensation type, and a write strategy parameter, which provides information about the magnitude of shift in a leading edge position, or variation in the pulse width, of a write pulse train to form a recording mark, and wherein the value of the format number changes according to a combination of the write strategy type and the write pre-compensation type, wherein a preceding space length that is a length of a space preceding the recording mark is classified into M-types (where M is an integer equal to or greater than two) with the first to $M^{th}$ types, and wherein the information reading apparatus retrieves the control information from the unit that is stored in the management area, wherein the write strategy parameter includes a reference value that is information indicating the magnitude of shift in leading the edge position of the write pulse train with respect to the classification of the M-type, and wherein the write strategy parameter further includes differential information with respect to the reference value, and the differential information is information that shows the magnitude of shift in the leading edge position of the recording pulse train with respect to another classification that is different from the M-type classification and with the first to $(M-1)^{th}$ types.

14. The information reading apparatus of claim 13, wherein the write pre-compensation type includes first and second types, and wherein according to the first type of write pre-compensation, performed selectively is either a preceding space pre-compensation, which is a write pre-compensation to get done by an information writing apparatus based on a combination of the mark length of a recording mark and the space length of a first space that precedes the recording mark, or a following space pre-compensation, which is a write pre-compensation to get done by the information writing apparatus based on the mark length of the recording mark and the space length of a second space that follows the recording mark, and wherein according to the second type of write pre-compensation, both the preceding space pre-compensation and the following space pre-compensation are performed.

15. The information reading apparatus of claim 14, wherein the format number is represented by multiple bits, and wherein one of the multiple bits indicates whether the write pre-compensation type is the first type or the second type.

16. The information reading apparatus of claim 13, wherein the write strategy type includes at least three different write strategy types that are N−1, N/2 and castle.

17. The information reading apparatus of claim 13, wherein a write operation is able to be performed on the optical information storage medium with at least one writing speed, and wherein the unit stored in the management area includes the control information for at least one combination of the at least one writing speed and the at least one information storage layer.

18. The information reading apparatus of claim 17, wherein the unit includes layer information, which indicates to which of the at least one information storage layer the control information included in the unit applies, and writing speed information, which indicates to which of the at least one writing speed the control information included in the unit applies.

19. An information writing method for writing information on an optical information storage medium, wherein the optical information storage medium has at least one information storage layer and also has a management area that stores at least one unit containing control information about the optical information storage medium, and wherein the control information includes a format number, which provides information about at least a write strategy type and a write pre-compensation type, and a write strategy parameter, which provides information about the magnitude of shift in a leading edge position, or variation in the pulse width, of a write pulse train to form a recording mark, and wherein the value of the format number changes according to a combination of the write strategy type and the write pre-compensation type, wherein a preceding space length that is a length of a space preceding the recording mark is classified into M-types (where M is an integer equal to or greater than two) with the first to $M^{th}$ types, wherein the write strategy parameter includes a reference value that is information indicating the magnitude of shift in the leading edge position of the write pulse train with respect to the classification of the M-type, and wherein the write strategy parameter further includes differential information with respect to the reference value, and the differential information is information that shows the magnitude of shift in the leading edge position of the recording pulse train with respect to another classification that is different from the M-type classification and with the first to $(M-1)^{th}$ types, and wherein the information writing method includes the step of generating the write pulse train by reference to the control information and irradiating the optical information storage medium with a laser beam, of which the waveform is represented by the write pulse train, thereby forming a recording mark on the medium.

20. An information reading method for reading information from an optical information storage medium, wherein the optical information storage medium has at least one information storage layer and also has a management area that stores at least one unit containing control information about the optical information storage medium, and wherein the control information includes a format number, which provides information about at least a write strategy type and a write pre-compensation type, and a write strategy parameter, which provides information about the magnitude of shift in a leading edge position, or variation in the pulse width, of a write pulse train to form a recording mark, and wherein the value of the format number changes according to a combination of the write strategy type and the write pre-compensation type, wherein a preceding space length that is a length of a space preceding the recording mark is classified into M-types (where M is an integer equal to or greater than two) with the first to $M^{th}$ types, wherein the write strategy parameter includes a reference value that is information indicating the magnitude of shift in the leading edge position of the write pulse train with respect to the classification of the M-type, and wherein the write strategy parameter further includes differential information with respect to the reference value, and the differential information is information that shows the magnitude of shift in the leading edge position of the recording pulse train with respect to another classification that is different from the M-type classification and with the first to $(M-1)^{th}$ types, and wherein the information reading method includes the step of retrieving the control information from the unit that is stored in the management area.

21. A method of making an optical information storage medium with at least one information storage layer, wherein the method includes the step of defining a management area to store at least one unit that contains control information about the optical information storage medium, and wherein the control information includes a format number, which provides information about at least a write strategy type and a write pre-compensation type, and a write strategy parameter, which provides information about the magnitude of shift in a leading edge position, or variation in the pulse width, of a write pulse train to form a recording mark, and wherein the value of the format number changes according to a combination of the write strategy type and the write pre-compensation type, wherein a preceding space length that is a length of a space preceding the recording mark is classified into M-types (where M is an integer equal to or greater than two) with the first to $M^{th}$ types, wherein the write strategy parameter includes a reference value that is information indicating the magnitude of shift in the leading edge position of the write pulse train with respect to the classification of the M-type, and wherein the write strategy parameter further includes differential information with respect to the reference value, and the differential information is information that shows the magnitude of shift in the leading edge position of the recording pulse train with respect to another classification that is different from the M-type classification and with the first to $(M-1)^{th}$ types.

22. The method of claim 21, comprising the step of writing information related to the control information on the management area.

* * * * *